(12) United States Patent
Holt

(10) Patent No.: US 7,844,665 B2
(45) Date of Patent: Nov. 30, 2010

(54) MODIFIED COMPUTER ARCHITECTURE HAVING COORDINATED DELETION OF CORRESPONDING REPLICATED MEMORY LOCATIONS AMONG PLURAL COMPUTERS

(75) Inventor: John M. Holt, Lindfield (AU)

(73) Assignee: Waratek Pty Ltd., Lindfield, New South Wales (AU)

( * ) Notice: Subject to any disclaimer, the term of this patent is extended or adjusted under 35 U.S.C. 154(b) by 1109 days.

(21) Appl. No.: 11/111,946

(22) Filed: Apr. 22, 2005

(65) Prior Publication Data

US 2005/0262313 A1 Nov. 24, 2005

Related U.S. Application Data

(63) Continuation-in-part of application No. 10/830,042, filed on Apr. 23, 2004.

(51) Int. Cl.
*G06F 15/16* (2006.01)
(52) U.S. Cl. .................. 709/205; 709/238; 709/204
(58) Field of Classification Search .......... 709/203, 709/204, 205, 238; 717/130
See application file for complete search history.

(56) References Cited

U.S. PATENT DOCUMENTS

| 4,068,298 A | 1/1978 | Dechant et al. |
| 4,780,821 A | 10/1988 | Crossley |
| 4,969,092 A | 11/1990 | Shorter |

(Continued)

FOREIGN PATENT DOCUMENTS

| EP | 0969377 | 1/2000 |
| WO | WO95/08809 | 3/1995 |
| WO | WO98/58330 | 12/1998 |

(Continued)

OTHER PUBLICATIONS

Bal et al., "Object Distribution in Orca Using Compile-Time and Run-Time Techniques", Proc. Conference on Object-Oriented Programming Systems, Languages and Applications, pp. 162-177, Sep. 1993.

(Continued)

*Primary Examiner*—Vivek Srivastava
*Assistant Examiner*—Adnan Mirza
(74) *Attorney, Agent, or Firm*—Pillsbury Winthrop Shaw Pittman LLP

(57) ABSTRACT

The present invention discloses a modified computer architecture (50, 71, 72) which enables an applications program (50) to be run simultaneously on a plurality of computers (M1, . . . Mn). Shared memory at each computer is updated with amendments and/or overwrites so that all memory read requests are satisfied locally. During initial program loading (75), or similar, instructions which result in memory being re-written or manipulated are identified (92). Additional instructions are inserted (103) to cause the equivalent memory locations at all computers to be updated. In addition, the initialization of JAVA language classes and objects is disclosed (162, 163) so all memory locations for all computers are initialized in the same manner. The finalization of JAVA language classes and objects is also disclosed (162, 163) so finalization only occurs when the last class or object present on all machines is no longer required. During initial program loading (75), or similar, instructions which result in the application program (50) acquiring (or releasing) a lock on a particular asset (50A, 50X-50Y) (synchronization) are identified. Additional instructions are inserted (162, 163) to result in a modified synchronization routine with which all computers are updated.

44 Claims, 24 Drawing Sheets

U.S. PATENT DOCUMENTS

| | | | |
|---|---|---|---|
| 5,053,943 A | 10/1991 | Yokoyama | |
| 5,214,776 A | 5/1993 | Bagnoli et al. | |
| 5,291,597 A | 3/1994 | Shorter | |
| 5,418,966 A | 5/1995 | Madduri | |
| 5,434,994 A | 7/1995 | Shaheen et al. | |
| 5,488,723 A | 1/1996 | Baradel et al. | |
| 5,544,345 A | 8/1996 | Carpenter et al. | |
| 5,568,605 A | 10/1996 | Clouston et al. | |
| 5,568,609 A | 10/1996 | Sugiyama et al. | |
| 5,612,865 A | 3/1997 | Dasgupta | |
| 5,692,193 A | 11/1997 | Jagannathan et al. | |
| 5,719,872 A | 2/1998 | Dubberly | |
| 5,754,207 A | 5/1998 | Gragg et al. | |
| 5,802,585 A | 9/1998 | Scales et al. | |
| 5,809,543 A | 9/1998 | Byers et al. | |
| 5,918,248 A | 6/1999 | Newell et al. | |
| 5,960,087 A | 9/1999 | Tribble et al. | |
| 6,010,210 A | 1/2000 | Wilson et al. | |
| 6,017,118 A | 1/2000 | Gasvoda et al. | |
| 6,049,809 A | 4/2000 | Raman et al. | |
| 6,101,527 A | 8/2000 | Lejeune et al. | |
| 6,148,377 A | 11/2000 | Carter et al. | |
| 6,163,801 A | 12/2000 | O'Donnell et al. | |
| 6,192,514 B1 | 2/2001 | Lurndal | |
| 6,216,262 B1 | 4/2001 | Martin | |
| 6,264,316 B1 | 7/2001 | Chino | |
| 6,266,747 B1 | 7/2001 | Dahl et al. | |
| 6,312,115 B1 | 11/2001 | Hara et al. | |
| 6,314,558 B1 | 11/2001 | Angel et al. | |
| 6,318,850 B1 | 11/2001 | Childers et al. | |
| 6,324,587 B1 | 11/2001 | Trenbeath et al. | |
| 6,327,630 B1 | 12/2001 | Carroll et al. | |
| 6,370,625 B1 | 4/2002 | Carmean et al. | |
| 6,386,675 B2 | 5/2002 | Wilson et al. | |
| 6,389,423 B1 | 5/2002 | Sakakura | |
| 6,425,016 B1 | 7/2002 | Banavar et al. | |
| 6,449,734 B1 | 9/2002 | Shrivastava et al. | |
| 6,460,051 B1 | 10/2002 | Larue et al. | |
| 6,496,871 B1 | 12/2002 | Jagannathan et al. | |
| 6,571,278 B1 | 5/2003 | Negishi et al. | |
| 6,574,628 B1 | 6/2003 | Kahn et al. | |
| 6,574,674 B1 | 6/2003 | May et al. | |
| 6,578,068 B1 | 6/2003 | Bowman-Amuah | |
| 6,585,359 B1 | 7/2003 | Gasvoda et al. | |
| 6,611,955 B1 | 8/2003 | Logean et al. | |
| 6,625,751 B1 | 9/2003 | Starovic et al. | |
| 6,633,577 B1 | 10/2003 | Nyu | |
| 6,637,872 B2 | 10/2003 | Ara et al. | |
| 6,662,359 B1 | 12/2003 | Berry et al. | |
| 6,668,260 B2 | 12/2003 | Zoltan | |
| 6,668,312 B2 | 12/2003 | Aubury | |
| 6,682,608 B2 | 1/2004 | Abrams et al. | |
| 6,725,014 B1 | 4/2004 | Voegele | |
| 6,757,896 B1 | 6/2004 | Cohen et al. | |
| 6,760,903 B1 * | 7/2004 | Morshed et al. | 717/130 |
| 6,775,831 B1 | 8/2004 | Carrasco et al. | |
| 6,779,093 B1 | 8/2004 | Gupta | |
| 6,782,492 B1 | 8/2004 | Nakaso | |
| 6,823,511 B1 | 11/2004 | McKenney et al. | |
| 6,826,570 B1 | 11/2004 | Eshel et al. | |
| 6,862,608 B2 | 3/2005 | Buhlman et al. | |
| 6,865,585 B1 | 3/2005 | Dussud | |
| 6,922,685 B2 | 7/2005 | Greene et al. | |
| 6,954,794 B2 | 10/2005 | Rudd et al. | |
| 6,968,372 B1 | 11/2005 | Thompson et al. | |
| 7,004,575 B2 | 2/2006 | Inoue et al. | |
| 7,010,576 B2 | 3/2006 | Bae | |
| 7,020,736 B1 | 3/2006 | Cherukuri | |
| 7,031,989 B2 | 4/2006 | Elmendorf et al. | |
| 7,047,341 B2 | 5/2006 | Jung | |
| 7,047,521 B2 | 5/2006 | Bunnell | |
| 7,058,826 B2 | 6/2006 | Fung | |
| 7,082,604 B2 | 7/2006 | Schneiderman | |
| 7,149,866 B2 | 12/2006 | Blandy | |
| 7,200,734 B2 | 4/2007 | Hyser | |
| 7,206,827 B2 | 4/2007 | Viswanath et al. | |
| 7,380,039 B2 | 5/2008 | Miloushev et al. | |
| 7,412,580 B1 | 8/2008 | Garthwaite | |
| 7,437,516 B2 | 10/2008 | Wintergerst et al. | |
| 7,451,240 B2 | 11/2008 | Wu et al. | |
| 7,549,149 B2 | 6/2009 | Childress et al. | |
| 7,581,069 B2 | 8/2009 | Holt | |
| 7,639,656 B2 | 12/2009 | Dooley | |
| 7,647,454 B2 | 1/2010 | Aguilera | |
| 7,660,960 B2 | 2/2010 | Holt | |
| 7,712,081 B2 | 5/2010 | Biberstein et al. | |
| 7,739,349 B2 | 6/2010 | Holt | |
| 7,761,670 B2 | 7/2010 | Holt | |
| 7,788,314 B2 | 8/2010 | Holt | |
| 2002/0087925 A1 | 7/2002 | Hayden et al. | |
| 2002/0138551 A1 | 9/2002 | Ericson | |
| 2002/0161848 A1 | 10/2002 | Willman et al. | |
| 2002/0169644 A1 | 11/2002 | Greene | |
| 2002/0199172 A1 | 12/2002 | Bunnell | |
| 2003/0004924 A1 | 1/2003 | Williams | |
| 2003/0005407 A1 | 1/2003 | Hines | |
| 2003/0012197 A1 | 1/2003 | Yazaki et al. | |
| 2003/0067912 A1 | 4/2003 | Mead et al. | |
| 2003/0105816 A1 | 6/2003 | Goswani | |
| 2003/0208658 A1 | 11/2003 | Magoshi | |
| 2004/0073828 A1 | 4/2004 | Bronstein | |
| 2004/0093588 A1 | 5/2004 | Gschwind et al. | |
| 2004/0142655 A1 | 7/2004 | Voegele | |
| 2004/0158819 A1 | 8/2004 | Cuomo et al. | |
| 2004/0163077 A1 | 8/2004 | Dimpsey et al. | |
| 2004/0196342 A1 | 10/2004 | Hara et al. | |
| 2005/0010683 A1 | 1/2005 | Moleyar et al. | |
| 2005/0027789 A1 | 2/2005 | Luo et al. | |
| 2005/0039171 A1 | 2/2005 | Avakian et al. | |
| 2005/0086384 A1 | 4/2005 | Ernst | |
| 2005/0108481 A1 | 5/2005 | Iyengar et al. | |
| 2005/0114848 A1 | 5/2005 | Choi et al. | |
| 2005/0228957 A1 | 10/2005 | Satoyama et al. | |
| 2005/0240737 A1 | 10/2005 | Holt | |
| 2005/0240907 A1 | 10/2005 | Renouf | |
| 2005/0257219 A1 | 11/2005 | Holt | |
| 2005/0262313 A1 | 11/2005 | Holt | |
| 2005/0262513 A1 | 11/2005 | Holt | |
| 2006/0015665 A1 | 1/2006 | Illowsky et al. | |
| 2006/0020913 A1 | 1/2006 | Holt | |
| 2006/0041823 A1 | 2/2006 | Wolfgang et al. | |
| 2006/0070051 A1 | 3/2006 | Kuck et al. | |
| 2006/0080389 A1 | 4/2006 | Powers et al. | |
| 2006/0095483 A1 | 5/2006 | Holt | |
| 2006/0143350 A1 | 6/2006 | Miloushev et al. | |
| 2006/0167878 A1 | 7/2006 | Hartman | |
| 2006/0242464 A1 | 10/2006 | Holt | |
| 2006/0253844 A1 | 11/2006 | Holt | |
| 2006/0265703 A1 | 11/2006 | Holt | |
| 2006/0265704 A1 | 11/2006 | Holt | |
| 2006/0265705 A1 | 11/2006 | Holt | |
| 2007/0100828 A1 | 5/2007 | Holt | |
| 2007/0101080 A1 | 5/2007 | Holt | |
| 2007/0126750 A1 | 6/2007 | Holt | |
| 2007/0147168 A1 | 6/2007 | Pinto et al. | |
| 2007/0174734 A1 | 7/2007 | Holt | |
| 2007/0233967 A1 | 10/2007 | Rangarajan et al. | |
| 2008/0072238 A1 | 3/2008 | Monnie et al. | |
| 2008/0114853 A1 | 5/2008 | Holt | |
| 2008/0114896 A1 | 5/2008 | Holt | |
| 2008/0114899 A1 | 5/2008 | Holt | |
| 2008/0114943 A1 | 5/2008 | Holt | |
| 2008/0114944 A1 | 5/2008 | Holt | |
| 2008/0114962 A1 | 5/2008 | Holt | |

| | | | |
|---|---|---|---|
| 2008/0120475 A1 | 5/2008 | Holt | |
| 2008/0120478 A1 | 5/2008 | Holt | |
| 2008/0123642 A1 | 5/2008 | Holt | |
| 2008/0126322 A1 | 5/2008 | Holt | |
| 2008/0126372 A1 | 5/2008 | Holt | |
| 2008/0126502 A1 | 5/2008 | Holt | |
| 2008/0126503 A1 | 5/2008 | Holt | |
| 2008/0126505 A1 | 5/2008 | Holt | |
| 2008/0126506 A1 | 5/2008 | Holt | |
| 2008/0126516 A1 | 5/2008 | Holt | |
| 2008/0126572 A1 | 5/2008 | Holt | |
| 2008/0126703 A1 | 5/2008 | Holt | |
| 2008/0127213 A1 | 5/2008 | Holt | |
| 2008/0127214 A1 | 5/2008 | Holt | |
| 2008/0133690 A1 | 5/2008 | Holt | |
| 2008/0114945 A1 | 6/2008 | Holt | |
| 2008/0126504 A1 | 6/2008 | Holt | |
| 2008/0126721 A1 | 6/2008 | Holt | |
| 2008/0130631 A1 | 6/2008 | Holt | |
| 2008/0130652 A1 | 6/2008 | Holt | |
| 2008/0133688 A1 | 6/2008 | Holt | |
| 2008/0133689 A1 | 6/2008 | Holt | |
| 2008/0133691 A1 | 6/2008 | Holt | |
| 2008/0133692 A1 | 6/2008 | Holt | |
| 2008/0133694 A1 | 6/2008 | Holt | |
| 2008/0133859 A1 | 6/2008 | Holt | |
| 2008/0133861 A1 | 6/2008 | Holt | |
| 2008/0133862 A1 | 6/2008 | Holt | |
| 2008/0133869 A1 | 6/2008 | Holt | |
| 2008/0133870 A1 | 6/2008 | Holt | |
| 2008/0133871 A1 | 6/2008 | Holt | |
| 2008/0133884 A1 | 6/2008 | Holt | |
| 2008/0137662 A1 | 6/2008 | Holt | |
| 2008/0140633 A1 | 6/2008 | Holt | |
| 2008/0140799 A1 | 6/2008 | Holt | |
| 2008/0140801 A1 | 6/2008 | Holt | |
| 2008/0140805 A1 | 6/2008 | Holt | |
| 2008/0140858 A1 | 6/2008 | Holt | |
| 2008/0140863 A1 | 6/2008 | Holt | |
| 2008/0140970 A1 | 6/2008 | Holt | |
| 2008/0140973 A1 | 6/2008 | Holt | |
| 2008/0140975 A1 | 6/2008 | Holt | |
| 2008/0140976 A1 | 6/2008 | Holt | |
| 2008/0140982 A1 | 6/2008 | Holt | |
| 2008/0141092 A1 | 6/2008 | Holt | |
| 2008/0151902 A1 | 6/2008 | Holt | |
| 2008/0155127 A1 | 6/2008 | Holt | |
| 2008/0184071 A1 | 7/2008 | Holt | |
| 2008/0133711 A1 | 8/2008 | Holt | |
| 2008/0189385 A1 | 8/2008 | Holt | |
| 2008/0189700 A1 | 8/2008 | Schmidt et al. | |
| 2008/0195617 A1 | 8/2008 | Holt | |
| 2008/0195682 A1 | 8/2008 | Holt | |
| 2008/0215593 A1 | 9/2008 | Holt | |
| 2008/0215701 A1 | 9/2008 | Holt | |
| 2008/0215703 A1 | 9/2008 | Holt | |
| 2008/0215928 A1 | 9/2008 | Holt | |
| 2008/0120477 A1 | 10/2008 | Holt | |
| 2008/0250213 A1 | 10/2008 | Holt | |
| 2008/0250221 A1 | 10/2008 | Holt | |
| 2009/0198776 A1 | 9/2009 | Holt | |
| 2009/0235034 A1 | 9/2009 | Holt | |
| 2010/0054254 A1 | 3/2010 | Holt | |
| 2010/0121935 A1 | 5/2010 | Holt | |

FOREIGN PATENT DOCUMENTS

| | | |
|---|---|---|
| WO | WO02/44835 | 6/2002 |
| WO | WO-02/44835 A2 | 6/2002 |
| WO | WO03/083614 | 10/2003 |
| WO | WO-03/083614 A2 | 10/2003 |
| WO | WO03084116 | 10/2003 |
| WO | WO2005/103924 | 11/2005 |
| WO | WO-2005/103924 | 11/2005 |
| WO | WO2005/103925 | 11/2005 |
| WO | WO-2005/103925 | 11/2005 |
| WO | WO2005/103926 | 11/2005 |
| WO | WO-2005/103926 A1 | 11/2005 |
| WO | WO2005/103927 | 11/2005 |
| WO | WO-2005/103927 | 11/2005 |
| WO | WO2005/103928 | 11/2005 |
| WO | WO-2005/103928 | 11/2005 |
| WO | WO2006/110937 | 10/2006 |
| WO | WO2006/110957 | 10/2006 |

OTHER PUBLICATIONS

Bressoud, "TFT: A Software System For Application-Transparent Fault Tolerance", Proc. 28th Annual International Symposium on Fault-Tolerant Computing, pp. 128-137,1998.

Bal et al., "Orca: A Language For Parallel Programming of Distributed Systems", IEEE Transactions on Software Engineering, vol. 18, No. 3, pp. 190-205, Mar. 1992.

Bal et al., "Replication Techniques For Speeding Up Parallel Applications On Distributed Systems", Concurrency Practice & Experience, vol. 4, No. 5, pp. 337-355, Aug. 1992.

Bal et al., "A Distributed Implementation of the Shared Data-Object Model", Proc. USENIX Workshop on Experiences with Distributed and Multiprocessor Systems, pp. 1-19, Oct. 1989.

Gothe et al., "The Distributed Ada Run-time System DARTS", Software-Practice and Experience, vol. 21, No. 1, Nov. 1991, pp. 1249-1263.

Bennett et al., "Munin: Distributed Shared Memory Based on Type-Specific Memory Coherence", Dept. Of Elec. and Computer Engineering, pp. 1-9.

Dwarkadas et al., "Evaluation of Release Consistent Softwared Distributed Shared Memory on Emerging Network Technology", Dept. of Computer Science, Rice University, pp. 1-12.

Russ et al., "The Hector Distributed Run-Time Environment", NSF Engineering Research Center, pp. 1-21.

Aridor et al., "cJVM: a Single System Image of aJVM on a Cluster", IBM Research Laboratory in Haifa.

da Silva et al., "An Evaluation of cJava System Architecture", IEEE, Proc. Of 15th Symposium on Computer Architecture and High Performance Computing, 2003, pp. 1-9.

Bal et al., "Experience with Distributed Programming in Orca", Proc. IEEE CS International Conference on Computer Languages, pp. 79-89, Mar. 1990.

Bellew, M; Hsu, M; Tam, V-O., "Update propagation in distributed memory hierarchy", Data Engineering, 1990. Proceedings, Sixth International Conference, pp. 521-528, Feb. 5-9, 1990 (Abstract).

Chen et al. MultiJav: A distributed shared memory system based on multiple Java virtual machines. In Proceedings of the Conference on Parallel and Distributed Processing Techniques and Applications, Las Vegas, Nevada Jun. 1998, Accessed on Aug. 15, 2007 from ,httpL...citeseer.ist.psu.edu/chen98multijav.html.

Dimitriev, "Profiling Java Applications Using Code Hotswapping and Dynamic Call Graph Revelation", Jan. 2004 AC WOSP '04, pp. 139-150.

Haumacher et al. "Transparent Distributed Threads for Java" Proceedings of the International Parallel and Distributed Processing Symposium, 2003 IEEE pp. 1-7.

Radovic, Z. et al. Removing the overhead from software-based shared memory. In Proceedings of the 2001 ACM/IEEE Conference on Supercomputing (CDrom) (Denver, Colorado, Nov. 10-16, 2001). Supercomputing '01. ACM Press, New York. NY 56-56.

On Computer Architecture & High Performance Computing, pp. 1-9 , Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online] , XP008098868 ISSN: 0302-9743 ISBN: 978-3-540-55940-5—Retreived from the internet URL:http//www.springerlink.com/content/5v 028411810p6m700/> ,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing , pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19 , Oct. 1998, Fort Lauderdale, FL.

Bal, et al., "Experience with Distributed Programming in Orca", *IEEE CS International Conference on Computer Languages*, pp. 1-23 , Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium.

Sanchez, et al. "Distributed Garbage Collection for Wide Area Replicated Memory", Proceedings of the 6th Conference on Usenix Conference on Object-Orientated Technologies and Systems [on Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214 , Sep. 13-15, 1995.

Supplementary European Search Report EP 06 79 0317 Dated Mar. 5, 2009.

Strom et al., Concurrency. Control and View Notification Algorithms for Collaborative Replicated Objects, Distributed Computing Systems, May 1997, pp. 194-203.

Factor et al., JavaSplit: A runtime for execution of monolithic java programs on heterogeneous collections of commodity workstations, 2003, In IEEE Fifth Int'l Conference on Cluster Computing.

Factor et al., A distributed runtime for Java: yesterday and today, Parallel and Distributed Processing Symposium, Apr. 2004. pages 159-, 26-30.

PCT International Search report and Written Opinion for PCT International Patent Application No. PCT/AU2005/000578, mailed Jul. 11, 2005.

PCT International Search report and Written Opinion for PCT International Patent Application No. PCT/AU2005/000579, mailed Jul. 11, 2005.

PCT International Search report and Written Opinion for PCT International Patent Application No. PCT/AU2005/000580, mailed Jul. 11, 2005.

PCT International Search report and Written Opinion for PCT International Patent Application No. PCT/AU2005/000581, mailed Jul. 11, 2005.

PCT International Search report and Written Opinion for PCT International Patent Application No. PCT/AU2005/000582, mailed Jul. 11, 2005.

\* cited by examiner

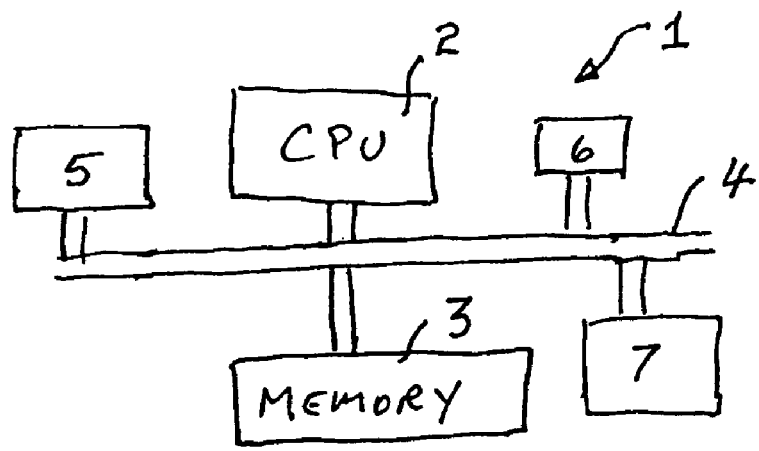
PRIOR ART  Fig. 1
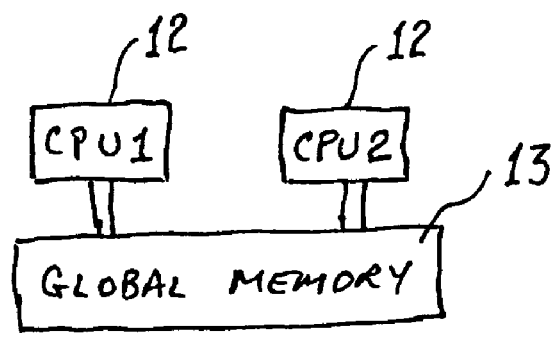
PRIOR ART  Fig. 2
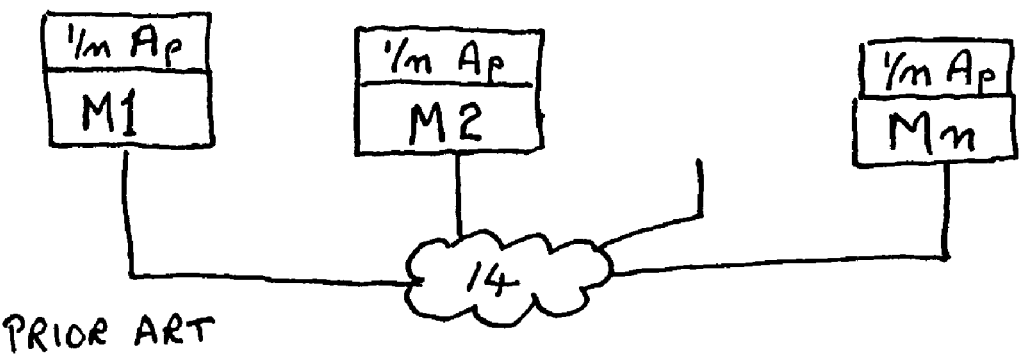
PRIOR ART  Fig. 3

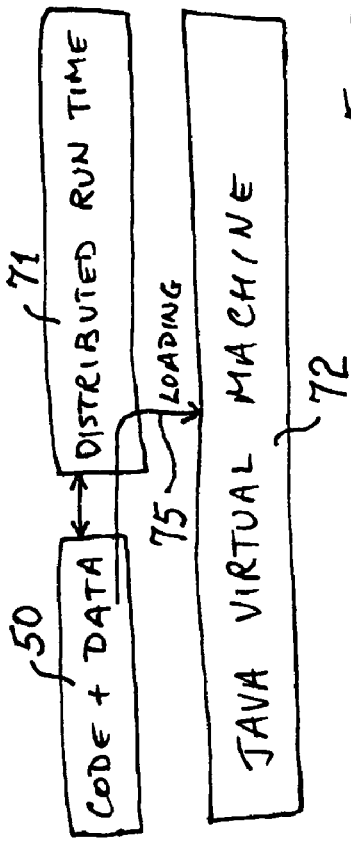
FIG. 7
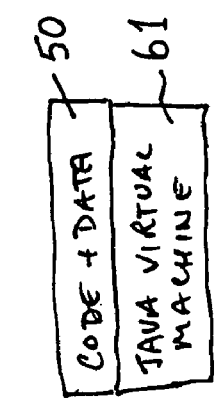
PRIOR ART FIG. 6
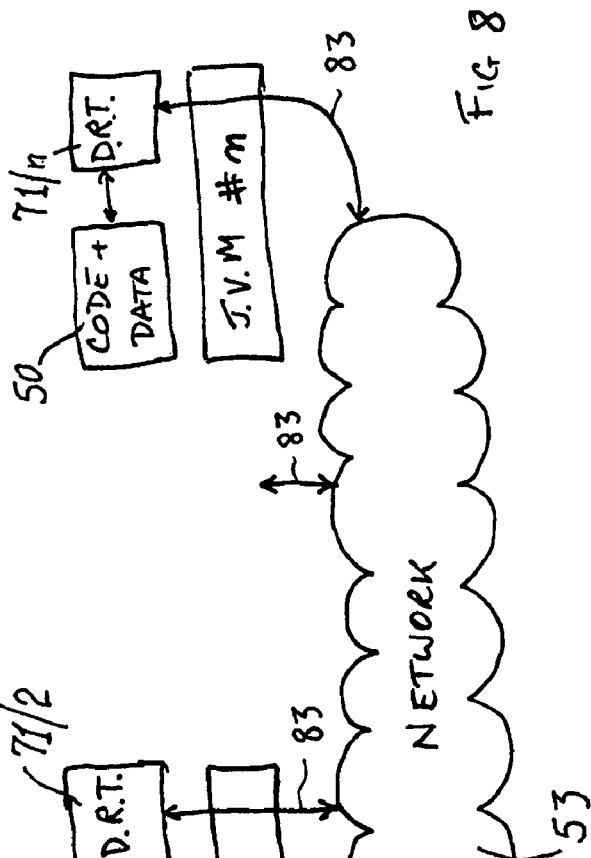
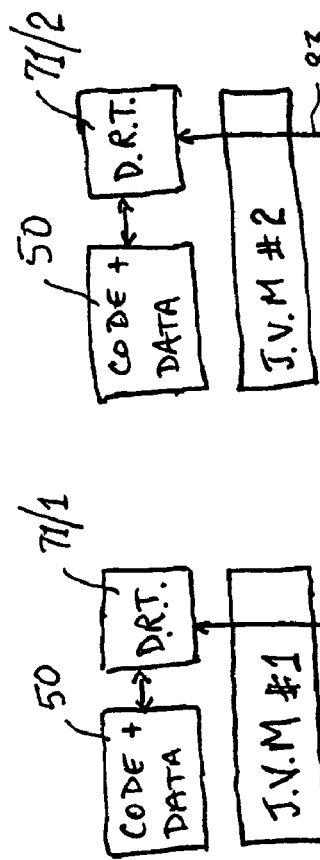
FIG. 8

MODIFIED COMPUTER ARCHITECTURE HAVING COORDINATED DELETION OF CORRESPONDING REPLICATED MEMORY LOCATIONS AMONG PLURAL COMPUTERS

CROSS-REFERENCE TO RELATED APPLICATIONS

This application claims benefit as a continuation-in-part application under 35 USC 120 to co-pending U.S. application Ser. No. 10/830,042, filed on Apr. 23, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to computers and, in particular, to a modified machine architecture which enables the operation of an application program simultaneously on a plurality of computers interconnected via a communications network.

BACKGROUND ART

Ever since the advent of computers, and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory, however, such stratagems invariably increase the administrative overhead of the machine 1.

Naturally, over the years various attempts have been made to increase machine performance. One approach is to use symmetric multiple processors. This prior art approach has been used in so called "super" computers and is schematically indicated in FIG. 2. Here a plurality of CPU's 12 are connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (ie share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 . . . M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, etc.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2 . . . Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

In computer languages such as JAVA and MICROSOFT-.NET there are two major types of constructs with which programmers deal. In the JAVA language these are known as objects and classes. Every time an object is created there is an initialization routine run known as "<init>". Similarly, every time a class is loaded there is an initialization routine known as "<clinit>". Other languages use different terms but utilize a similar concept.

However, there is no equivalent "clean up" or deletion routine to delete an object or class once it is no longer required. Instead, this "clean up" happens unobtrusively in a background mode.

Furthermore, in any computer environment it is necessary to acquire and release a lock to enable the use of such assets, resources or structures to avoid different parts of the application program attempting to use the same resource at the one time. In the JAVA environment this is known as synchronization. This is achieved in JAVA by the "monitor enter" and "monitor exit" instructions or routines. Other languages use different terms but utilize a similar concept.

The present invention discloses a computing environment in which an application program operates simultaneously on a plurality of computers. In such an environment it is necessary to ensure that the abovementioned initialization, clean up and synchronization procedures operate in a consistent and coordinated fashion across all the machines. It is this goal of coordination that is the genesis of the present invention.

In accordance with a first aspect of the present invention there is disclosed a multiple computer system having at least one application program running simultaneously on a plurality of computers interconnected by a communications network, wherein a like plurality of substantially identical objects are created, each in the corresponding computer and each having a substantially identical name, wherein the initial contents of each of said identically named objects is substantially the same, wherein all said identical objects are collectively deleted when each one of said plurality of computers no longer needs to refer to their corresponding object, and wherein said system includes a lock means applicable to all said computers wherein any computer wishing to utilize a named object therein acquires an authorizing lock from said lock means which permits said utilization and which prevents all the other computers from utilizing their corresponding named object until said authorizing lock is relinquished.

In accordance with a second aspect of the present invention there is disclosed a method of running at least one application program on a plurality of computers simultaneously, said computers being interconnected by means of a communications network, said method comprising the steps of:

(i) creating a like plurality of substantially identical objects each in the corresponding computer and each having a substantially identical name, (ii) creating the initial contents of each of said identically named objects substantially the same, (iii) deleting all said identical objects collectively when all of said plurality of computers no longer need to refer to their corresponding object, and (iv) requiring any of said computers wishing to utilize a named object therein to acquire an authorizing lock which permits said utilization and which prevents all the other computers from utilizing their corresponding named object until said authorizing lock is relinquished.

In accordance with a third aspect of the present invention there is disclosed a computer program product comprising a set of program instructions stored in a storage medium and operable to permit a plurality of computers to carry out the abovementioned method.

BRIEF DESCRIPTION OF THE DRAWINGS

Embodiments of the present invention will now be described with reference to the drawings in which:

FIG. 1 is a schematic view of the internal architecture of a conventional computer, FIG. 2 is a schematic illustration showing the internal architecture of known symmetric multiple processors, FIG. 3 is a schematic representation of prior art distributed computing, FIG. 6 is a schematic illustration of a prior art computer arranged to operate JAVA code and thereby constitute a JAVA virtual machine, FIG. 7 is a drawing similar to FIG. 6 but illustrating the initial loading of code in accordance with the preferred embodiment, FIG. 8 is a drawing similar to FIG. 5 but illustrating the interconnection of a plurality of computers each operating JAVA code in the manner illustrated in FIG. 7.

The specification includes Annexures A, B, C and D which provide actual program fragments which implement various aspects of the described embodiments. Annexure A relates to fields and Annexure B relates to initialization. Annexure C relates to finalization. Annexure D relates to synchronization.

DETAILED DESCRIPTION

Figure 4:
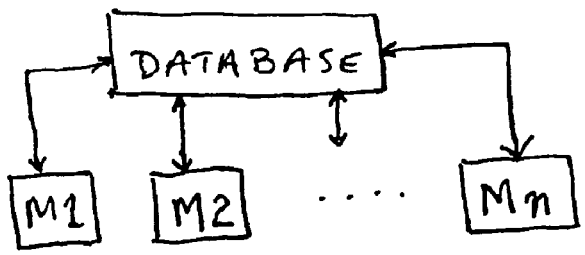
FIG. 4 is a schematic representation of a prior art network computing using clusters.
Figure 5:
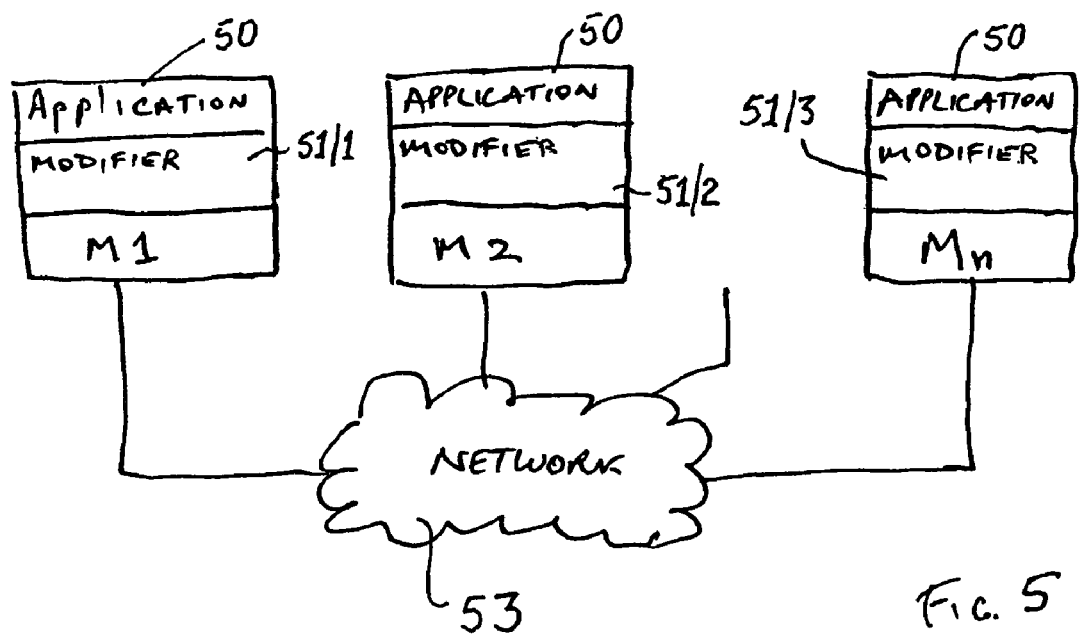
FIG. 5 is a schematic block diagram of a plurality of machines operating the same application program in accordance with a first embodiment of the present invention.

In connection with FIG. 5, in accordance with a preferred embodiment of the present invention a single application program 50 can be operated simultaneously on a number of machines M1, M2 . . . Mn communicating via network 53. As it will become apparent hereafter, each of the machines M1, M2 . . . Mn operates with the same application program 50 on each machine M1, M2 . . . Mn and thus all of the machines M1, M2 . . . Mn have the same application code and data 50. Similarly, each of the machines M1, M2 . . . Mn operates with the same (or substantially the same) modifier 51 on each machine M1, M2 . . . Mn and thus all of the machines M1, M2 . . . Mn have the same (or substantially the same) modifier 51 with the modifier of machine M2 being designated 51/2. In addition, during the loading of, or preceding the execution of, the application 50 on each machine M1, M2 . . . Mn, each application 50 has been modified by the corresponding modifier 51 according to the same rules (or substantially the same rules since minor optimising changes are permitted within each modifier 51/1 . . . 51/n).

As a consequence of the above described arrangement, if each of the machines M1, M2 . . . Mn has, say, a shared memory capability of 10 MB, then the total shared memory available to each application 50 is not, as one might expect, 10n MB but rather only 10 MB. However, how this results in improved operation will become apparent hereafter. Naturally, each machine M1, M2 . . . Mn has an unshared memory capability. The unshared memory capability of the machines M1, M2 . . . Mn are normally approximately equal but need not be.

It is known from the prior art to operate a machine (produced by one of various manufacturers and having an operating system operating in one of various different languages) in a particular language of the application, by creating a virtual machine as schematically illustrated in FIG. 6. The prior art arrangement of FIG. 6 takes the form of the application 50 written in the Java language and executing within a Java Virtual Machine 61. Thus, where the intended language of the application is the language JAVA, a JAVA virtual machine is created which is able to operate code in JAVA irrespective of the machine manufacturer and internal details of the machine. For further details see "The JAVA Virtual Machine Specification" $2^{nd}$ Edition by T. Lindholm & F. Yellin of Sun Microsystems Inc. of the USA.

This well known prior art arrangement of FIG. 6 is modified in accordance with the preferred embodiment of the present invention by the provision of an additional facility which is conveniently termed "distributed run time" or DRT 71 as seen in FIG. 7. In FIG. 7, the application 50 is loaded onto the Java Virtual Machine 72 via the distributed runtime system 71 through the loading procedure indicated by arrow 75. A distributed run time system is available from the Open Software Foundation under the name of Distributed Computing Environment (DCE). In particular, the distributed runtime 71 comes into operation during the loading procedure indicated by arrow 75 of the JAVA application 50 so as to initially create the JAVA virtual machine 72. The sequence of operations during loading will be described hereafter in relation to FIG. 9.

FIG. 8 shows in modified form the arrangement of FIG. 5 utilising JAVA virtual machines, each as illustrated in FIG. 7. It will be apparent that again the same application 50 is loaded onto each machine M1, M2 . . . Mn. However, the communications between each machine M1, M2 . . . Mn, and indicated by arrows 83, although physically routed through the machine hardware, are controlled by the individual DRT's 71/1 . . . 71/n within each machine. Thus, in practice this may be conceptionalised as the DRT's 71/1 . . . 71/n communicating with each other via the network 73 rather than the machines M1, M2 . . . Mn themselves.

Figure 9:
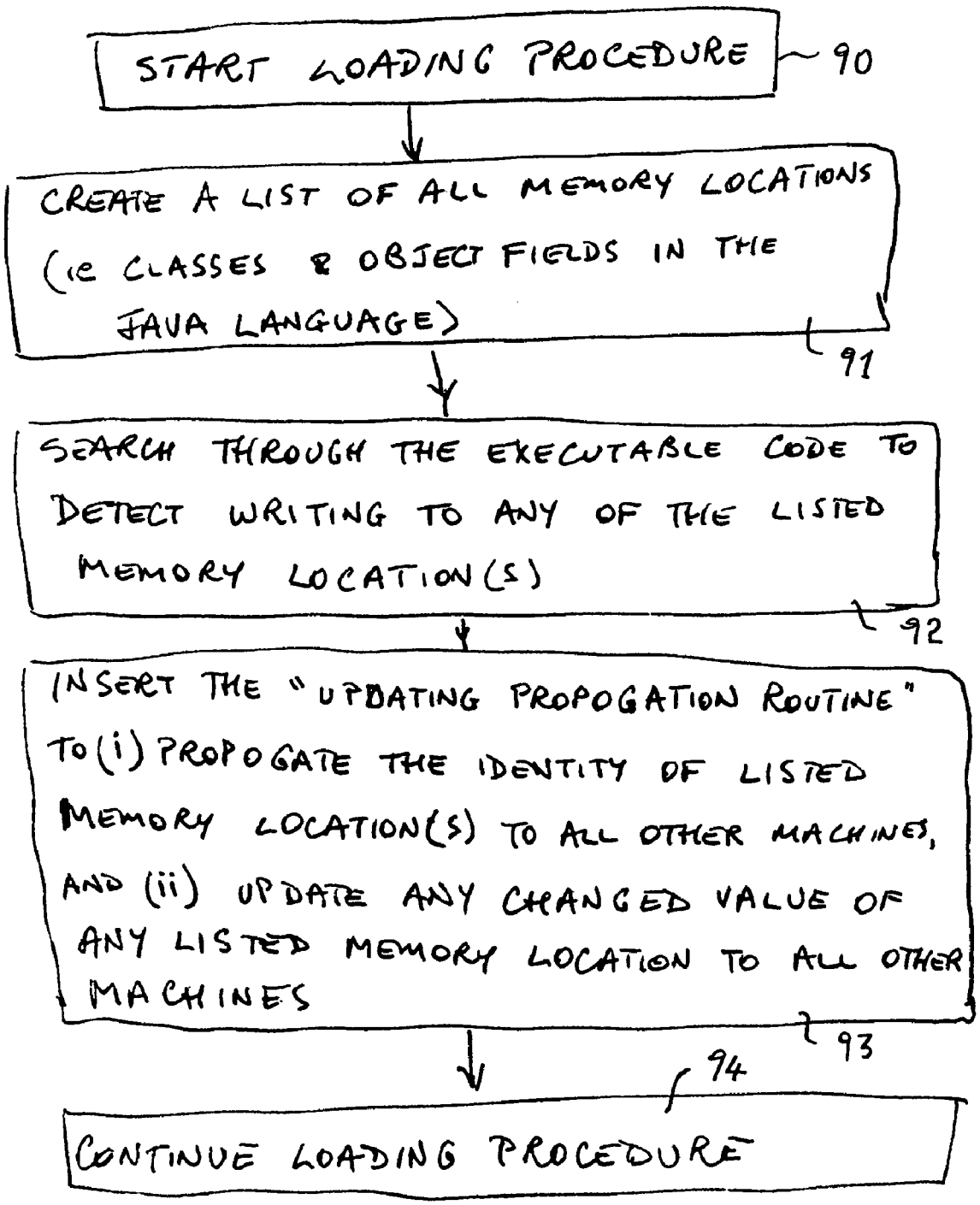
FIG. 9 is a flow chart of the procedure followed during loading of the same application on each machine in the network.

Turning now to FIGS. 7 and 9, during the loading procedure 75, the program 50 being loaded to create each JAVA virtual machine 72 is modified. This modification commences at 90 in FIG. 9 and involves the initial step 91 of detecting all memory locations (termed fields in JAVA—but equivalent terms are used in other languages) in the application 50 being loaded. Such memory locations need to be identified for subsequent processing at steps 92 and 93. The DRT 71 during the loading procedure 75 creates a list of all the memory locations thus identified, the JAVA fields being listed by object and class. Both volatile and synchronous fields are listed.

The next phase (designated 92 in FIG. 9) of the modification procedure is to search through the executable application code in order to locate every processing activity that manipulates or changes field values corresponding to the list generated at step 91 and thus writes to fields so the value at the corresponding memory location is changed. When such an operation (typically putstatic or putfield in the JAVA language) is detected which changes the field value, then an "updating propagation routine" is inserted by step 93 at this place in the program to ensure that all other machines are notified that the value of the field has changed. Thereafter, the loading procedure continues in a normal way as indicated by step 94 in FIG. 9.

Figure 10:
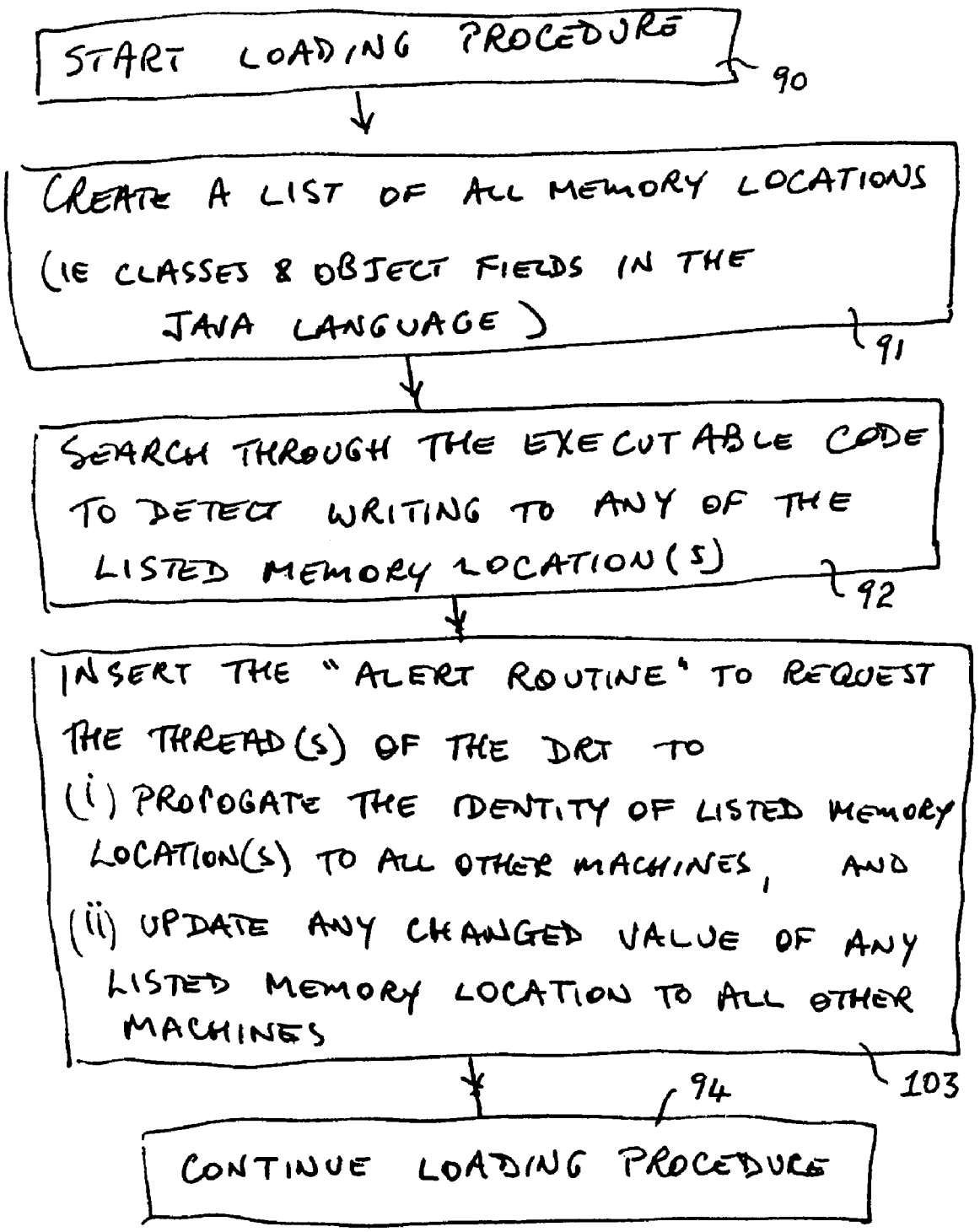
FIG. 10 is a flow chart showing a modified procedure similar to that of FIG. 9.

An alternative form of initial modification during loading is illustrated in FIG. 10. Here the start and listing steps 90 and 91 and the searching step 92 are the same as in FIG. 9. However, rather than insert the "updating propagation routine" as in step 93 in which the processing thread carries out the updating, instead an "alert routine" is inserted at step 103. The "alert routine" instructs a thread or threads not used in processing and allocated to the DRT, to carry out the necessary propagation. This step 103 is a quicker alternative which results in lower overhead.

Figure 11:
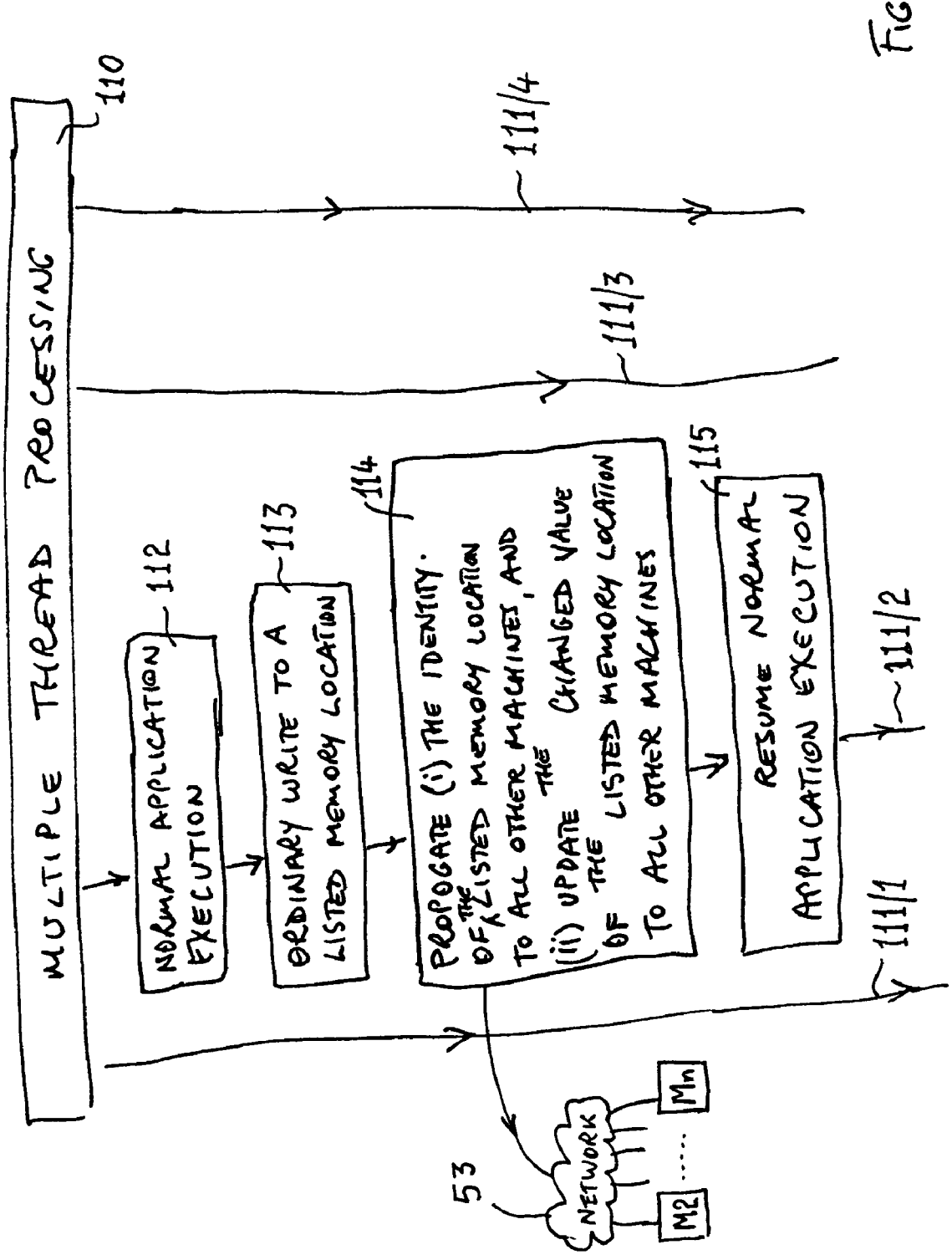
FIG. 11 is a schematic representation of multiple thread processing carried out on the machines of FIG. 8 utilizing a first embodiment of memory updating.
Figure 12:
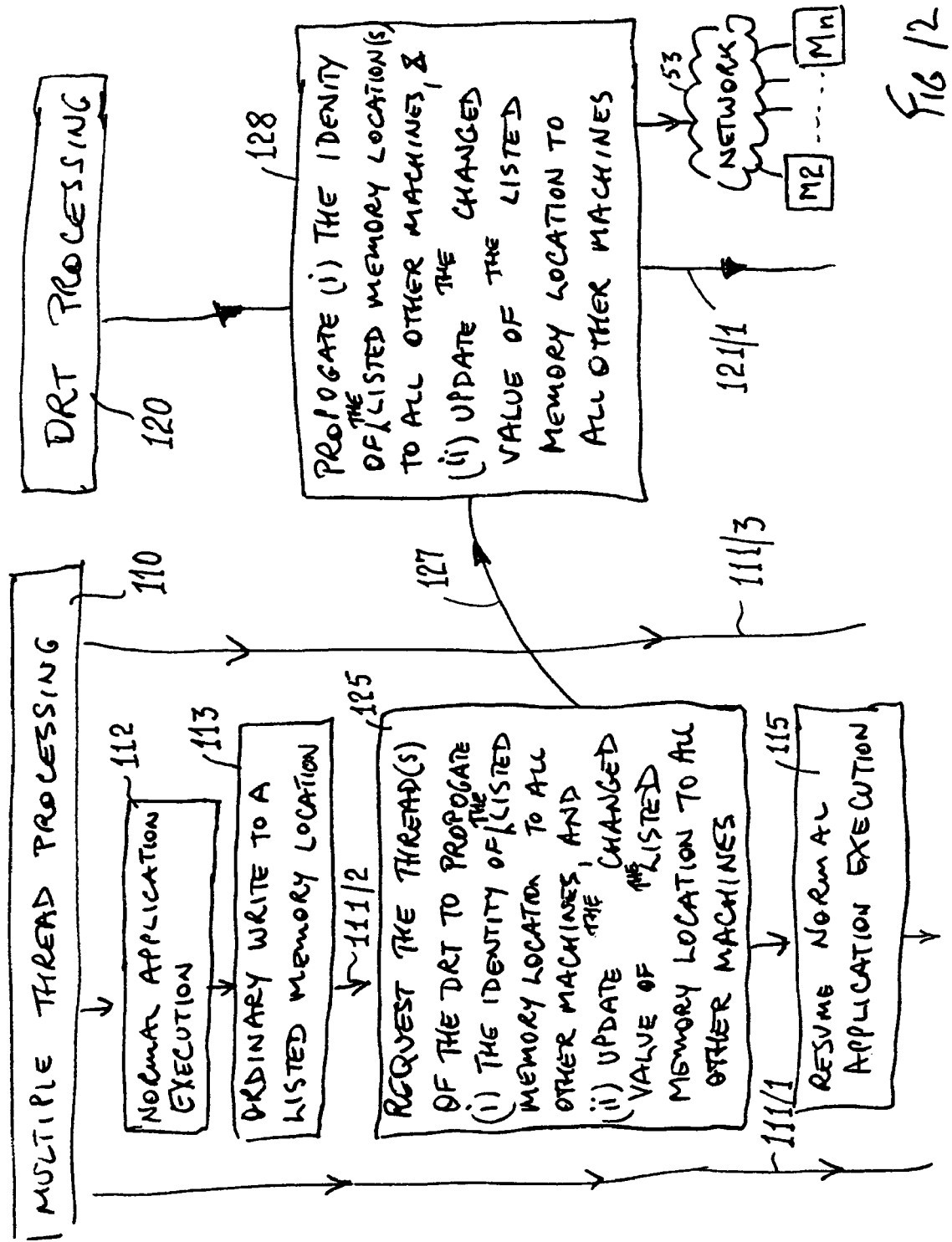
FIG. 12 is a schematic representation similar to FIG. 11 but illustrating an alternative embodiment.

Once this initial modification during the loading procedure has taken place, then either one of the multiple thread processing operations illustrated in FIGS. 11 and 12 takes place. As seen in FIG. 11, multiple thread processing 110 on the machines consisting of threads 111/1 . . . 111/4 is occurring and the processing of the second thread 111/2 (in this example) results in that thread 111/2 becoming aware at step 113 of a change of field value. At this stage the normal processing of that thread 111/2 is halted at step 114, and the same thread 111/2 notifies all other machines M2 . . . Mn via the network 53 of the identity of the changed field and the changed value which occurred at step 113. At the end of that communication procedure, the thread 111/2 then resumes the processing at step 115 until the next instance where there is a change of field value.

In the alternative arrangement illustrated in FIG. 12, once a thread 121/2 has become aware of a change of field value at step 113, it instructs DRT processing 120 (as indicated by step 125 and arrow 127) that another thread(s) 121/1 allocated to the DRT processing 120 is to propagate in accordance with step 128 via the network 53 to all other machines M2 ... Mn the identity of the changed field and the changed value detected at step 113. This is an operation which can be carried out quickly and thus the processing of the initial thread 111/2 is only interrupted momentarily as indicated in step 125 before the thread 111/2 resumes processing in step 115. The other thread 121/1 which has been notified of the change (as indicated by arrow 127) then communicates that change as indicated in step 128 via the network 53 to each of the other machines M2 ... Mn.

This second arrangement of FIG. 12 makes better utilisation of the processing power of the various threads 111/1 ... 111/3 and 121/1 (which are not, in general, subject to equal demands) and gives better scaling with increasing size of "n", (n being an integer greater than or equal to 2 which represents the total number of machines which are connected to the network 53 and which run the application program 50 simultaneously). Irrespective of which arrangement is used, the changed field and identities and values detected at step 113 are propagated to all the other machines M2 ... Mn on the network.

Figure 13:
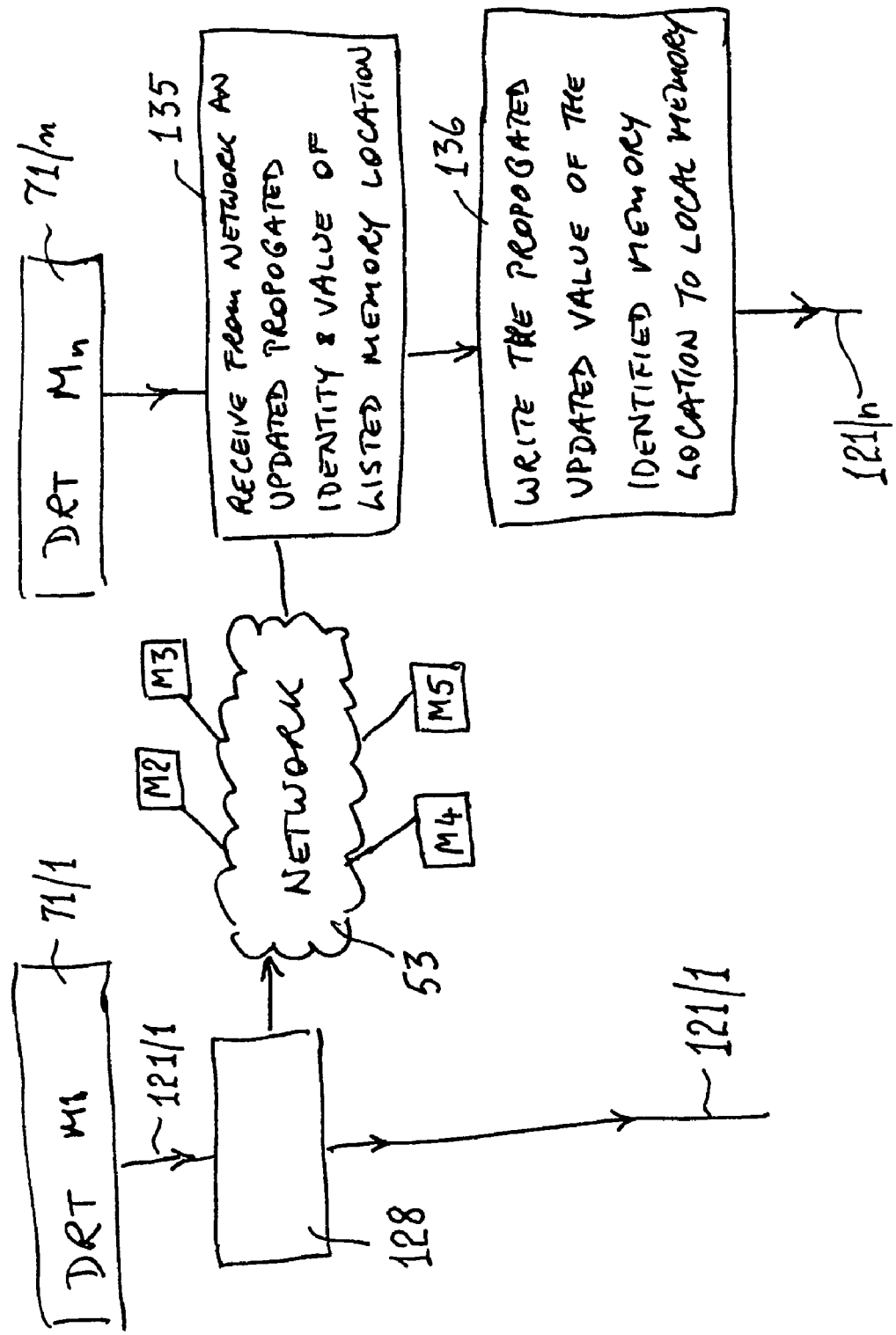
FIG. 13 illustrates multi-thread memory updating for the computers of FIG. 8.

This is illustrated in FIG. 13 where the DRT 71/1 and its thread 121/1 of FIG. 12 (represented by step 128 in FIG. 13) sends via the network 53 the identity and changed value of the listed memory location generated at step 113 of FIG. 12 by processing in machine M1, to each of the other machines M2 ... Mn.

Each of the other machines M2 ... Mn carries out the action indicated by steps 135 and 136 in FIG. 13 for machine Mn by receiving the identity and value pair from the network 53 and writing the new value into the local corresponding memory location.

In the prior art arrangement in FIG. 3 utilising distributed software, memory accesses from one machine's software to memory physically located on another machine are permitted by the network interconnecting the machines. However, such memory accesses can result in delays in processing of the order of $10^6$-$10^7$ cycles of the central processing unit of the machine. This in large part accounts for the diminished performance of the multiple interconnected machines.

However, in the present arrangement as described above in connection with FIG. 8, it will be appreciated that all reading of data is satisfied locally because the current value of all fields is stored on the machine carrying out the processing which generates the demand to read memory. Such local processing can be satisfied within $10^2$-$10^3$ cycles of the central processing unit. Thus, in practice, there is substantially no waiting for memory accesses which involves reads.

However, most application software reads memory frequently but writes to memory relatively infrequently. As a consequence, the rate at which memory is being written or re-written is relatively slow compared to the rate at which memory is being read. Because of this slow demand for writing or re-writing of memory, the fields can be continually updated at a relatively low speed via the inexpensive commodity network 53, yet this low speed is sufficient to meet the application program's demand for writing to memory. The result is that the performance of the FIG. 8 arrangement is vastly superior to that of FIG. 3.

In a further modification in relation to the above, the identities and values of changed fields can be grouped into batches so as to further reduce the demands on the communication speed of the network 53 interconnecting the various machines.

It will also be apparent to those skilled in the art that in a table created by each DRT 71 when initially recording the fields, for each field there is a name or identity which is common throughout the network and which the network recognises. However, in the individual machines the memory location corresponding to a given named field will vary over time since each machine will progressively store changed field values at different locations according to its own internal processes. Thus the table in each of the DRTs will have, in general, different memory locations but each global "field name" will have the same "field value" stored in the different memory locations.

It will also be apparent to those skilled in the art that the abovementioned modification of the application program during loading can be accomplished in up to five ways by:

(i) re-compilation at loading, (ii) by a pre-compilation procedure prior to loading, (iii) compilation prior to loading, (iv) a "just-in-time" compilation, or (v) re-compilation after loading (but, or for example, before execution of the relevant or corresponding application code in a distributed environment).

Traditionally the term "compilation" implies a change in code or language, eg from source to object code or one language to another. Clearly the use of the term "compilation" (and its grammatical equivalents) in the present specification is not so restricted and can also include or embrace modifications within the same code or language.

In the first embodiment, a particular machine, say machine M2, loads the application code on itself, modifies it, and then loads each of the other machines M1, M3 ... Mn (either sequentially or simultaneously) with the modified code. In this arrangement, which may be termed "master/slave", each of machines M1, M3, ... Mn loads what it is given by machine M2.

In a still further embodiment, each machine receives the application code, but modifies it and loads the modified code on that machine. This enables the modification carried out by each machine to be slightly different being optimized based upon its architecture and operating system, yet still coherent with all other similar modifications.

In a further arrangement, a particular machine, say M1, loads the unmodified code and all other machines M2, M3 ... Mn do a modification to delete the original application code and load the modified version.

In all instances, the supply can be branched (ie M2 supplies each of M1, M3, M4, etc directly) or cascaded or sequential (ie M2 applies M1 which then supplies M3 which then supplies M4, and so on).

In a still further arrangement, the machines M1 to Mn, can send all load requests to an additional machine (not illustrated) which is not running the application program, which performs the modification via any of the aforementioned methods, and returns the modified routine to each of the machines M1 to Mn which then load the modified routine locally. In this arrangement, machines M1 to Mn forward all load requests to this additional machine which returns a modified routine to each machine. The modifications performed by this additional machine can include any of the modifications covered under the scope of the present invention.

Persons skilled in the computing arts will be aware of at least four techniques used in creating modifications in computer code. The first is to make the modification in the original (source) language. The second is to convert the original code (in say JAVA) into an intermediate representation (or intermediate language). Once this conversion takes place the modification is made and then the conversion is reversed. This gives the desired result of modified JAVA code.

The third possibility is to convert to machine code (either directly or via the abovementioned intermediate language). Then the machine code is modified before being loaded and executed. The fourth possibility is to convert the original code to an intermediate representation, which is then modified and subsequently converted into machine code.

The present invention encompasses all four modification routes and also a combination of two, three or even all four, of such routes.

Figure 14:
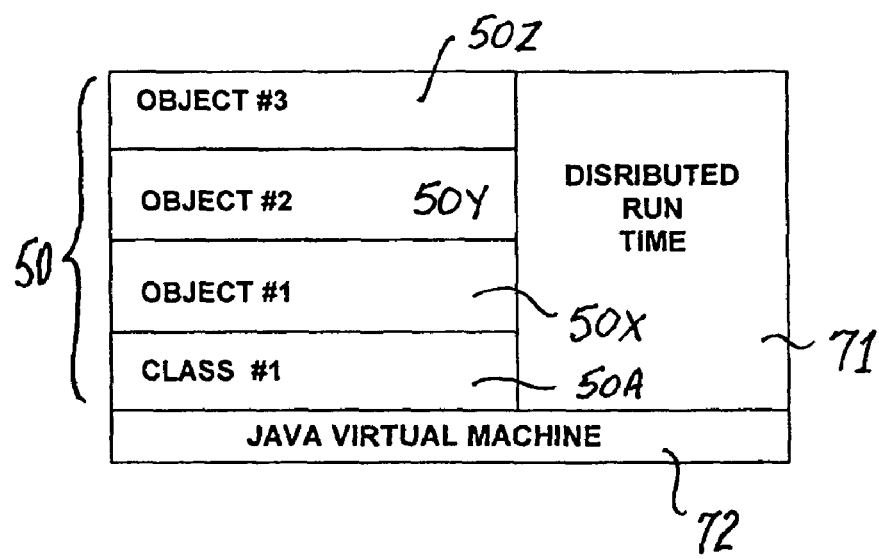
FIG. 14 is a schematic illustration of a prior art computer arranged to operate in JAVA code and thereby constitute a JAVA virtual machine.

Turning now to FIG. 14, there is illustrated a schematic representation of a single prior art computer operated as a JAVA virtual machine. In this way, a machine (produced by any one of various manufacturers and having an operating system operating in any one of various different languages) can operate in the particular language of the application program 50, in this instance the JAVA language. That is, a JAVA virtual machine 72 is able to operate code 50 in the JAVA language, and utilize the JAVA architecture irrespective of the machine manufacturer and the internal details of the machine.

In the JAVA language, the initialization routine <clinit> happens only once when a given class file 50A is loaded. However, the initialization routine <init> happens often, for example every time a new object 50X, 50Y and 50Z is created. In addition, classes are loaded prior to objects so that in the application program illustrated in FIG. 14, having a single class 50A and three objects 50X-50Z, the first class 50A is loaded first, then the first object 50X is loaded, then second object 50Y is loaded and finally third object 50Z is loaded. Where, as in FIG. 14, there is only a single computer or machine 72, then no conflict or inconsistency arises in the running of the initialization routines intended to operate during the loading procedure.

However, in the arrangement illustrated in FIG. 8, (and also in FIGS. 31-33), a plurality of individual computers or machines M1, M2 . . . Mn are provided each of which are interconnected via a communications network 53 and each of which is provided with a modifier 51 and loaded with a common application program 50. Essentially the modifier 51 is to replicate an identical memory structure and contents on each of the individual machines M1, M2 . . . Mn. It follows therefore that in such a computing environment it is necessary to ensure that each of the individual machines M1, M2 . . . Mn is initialized in a consistent fashion. The modifying function of the modifier 51 of FIG. 5 is provided by the DRT 71 in FIG. 8.

In order to ensure consistent initialization, the application program 50 is scrutinized in order to detect program steps which define an initialization routine. This scrutiny can take place either prior to loading, or during the loading procedure 75, or even after the loading procedure 75 (but before execution of the relevant corresponding application code). It may be likened to a compilation procedure with the understanding that the term compilation normally involves a change in code or language, eg from source to object code or one language to another. However, in the present instance the term "compilation" (and its grammatical equivalents) is not so restricted and can also include embrace modifications within the same code or language.

As a consequence, in the abovementioned scrutiny <clinit> routines are initially looked for and when found a modifying code (typically several instructions) is inserted so as to give rise to a modified <clinit> routine. This modified routine is to load the class 50A on one of the machines, for example JVM#1, and tell all the other machines M2 . . . Mn that such a class 50A exists and its present state. There are several different modes whereby this modification and loading can be carried out.

Thus, in one mode, the DRT 71 on the loading machine, in this example JVM#1, asks the DRT's 71/2 . . . 71/n of all the other machines if the first class 50A has already been initialized. If the answer to this question is yes, then the normal initialization procedure is turned off or disabled. If the answer is no, then the normal initialization procedure is operated and the consequential changes brought about during that procedure are transferred to all other machines as indicated by arrows 83 in FIG. 8.

A similar procedure happens on each occasion that an object, say 50X, 50Y or 50Z is to be loaded. Where the DRT 71/1 does not discern, as a result of interrogation, that the particular object, say object 50Y, in question has already been loaded onto the other machines M2 . . . Mn, then the DRT 71/1 runs the object initialization routine, and loads on each of the other machines M2 . . . Mn an equivalent object (which may conveniently be termed a peer object) together with a copy of the initial values. However, if the DRT 71/1 determines that the object 50Y in question already exists on the other machines, then the normal initialization function is disabled and a local copy is created with a copy of the current values. Again there are various ways of bringing about the desired result.

Figure 15:
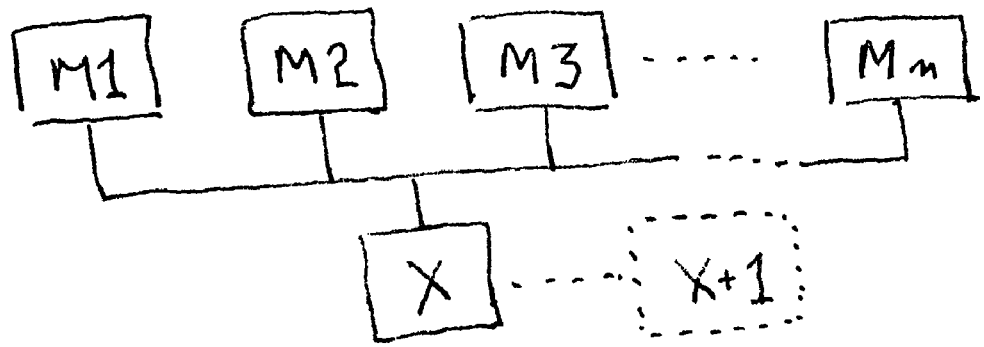
FIG. 15 is a schematic representation of n machines running the application program and serviced by an additional server machine X.

As seen in FIG. 15 a modification to the general arrangement of FIG. 8 is provided in that machines M1, M2 . . . Mn are as before and run the same application program (or programmes) 50 on all machines M1, M2 . . . Mn simultaneously. However, the previous arrangement is modified by the provision of a server machine X which is conveniently able to supply a housekeeping function, and especially the initialisation, the clean up and/or the synchronization of structures, assets and resources. Such a server machine X can be a low value commodity computer such as a PC since its computational load is low. As indicated by broken lines in FIG. 15, two server machines X and X+1 can be provided for redundancy purposes to increase the overall reliability of the system. Where two such server machines X and X+1 are provided, they are preferably operated as dual machines in a cluster. The additional machine X+1 is optional as indicated by the broken lines in FIG. 15.

It is not necessary to provide a server machine X as its computational load can be distributed over machines M1, M2 . . . Mn. Alternatively, a database operated by one machine (in a master/slave type operation) can be used for the housekeeping function.

Figure 16:
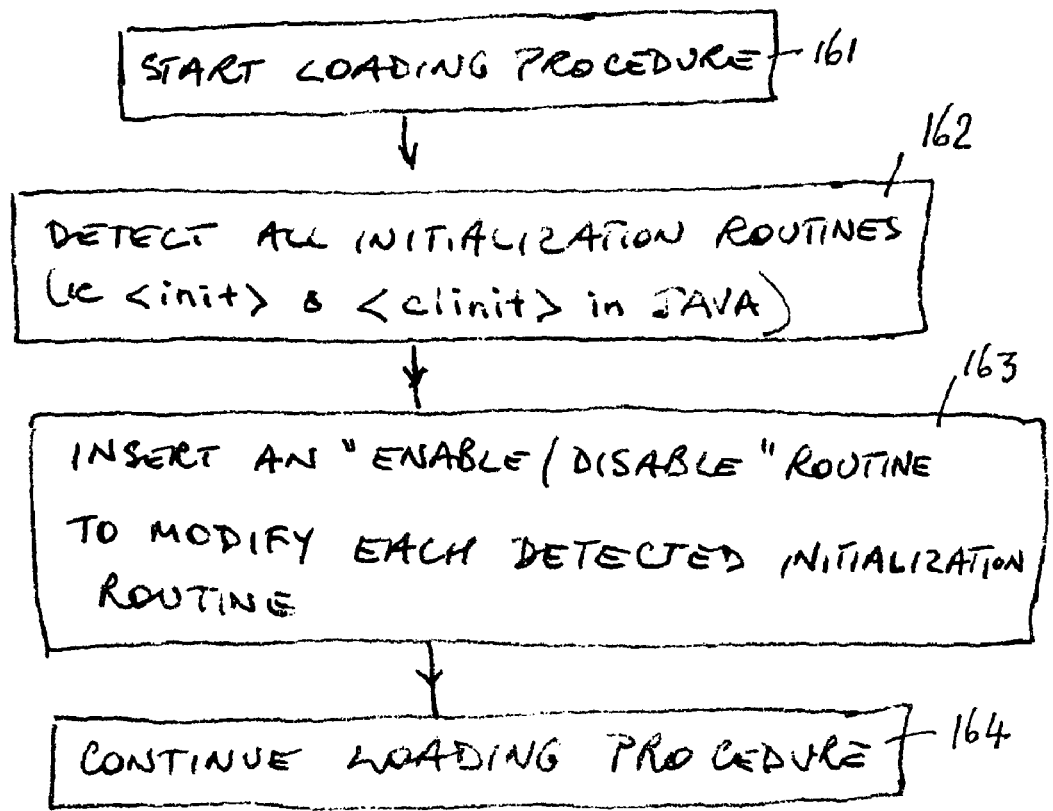
FIG. 16 is a flow chart of illustrating the modification of initialization routines.

FIG. 16 shows a preferred general procedure to be followed for initialization. After a loading step 161 has been commenced, the instructions to be executed are considered in sequence and all initialization routines are detected as indicated in step 162. In the JAVA language these are the <init> and <clinit> routines (or methods in JAVA terminology). Other languages use different terms.

Where an initialization routine is detected in step 162, it is modified in step 163, typically by inserting further instructions into the routine. Alternatively, the modifying instructions could be inserted prior to the routine. Once the modification step 163 has been completed the loading procedure continues, as indicated in step 164.

Figure 17:
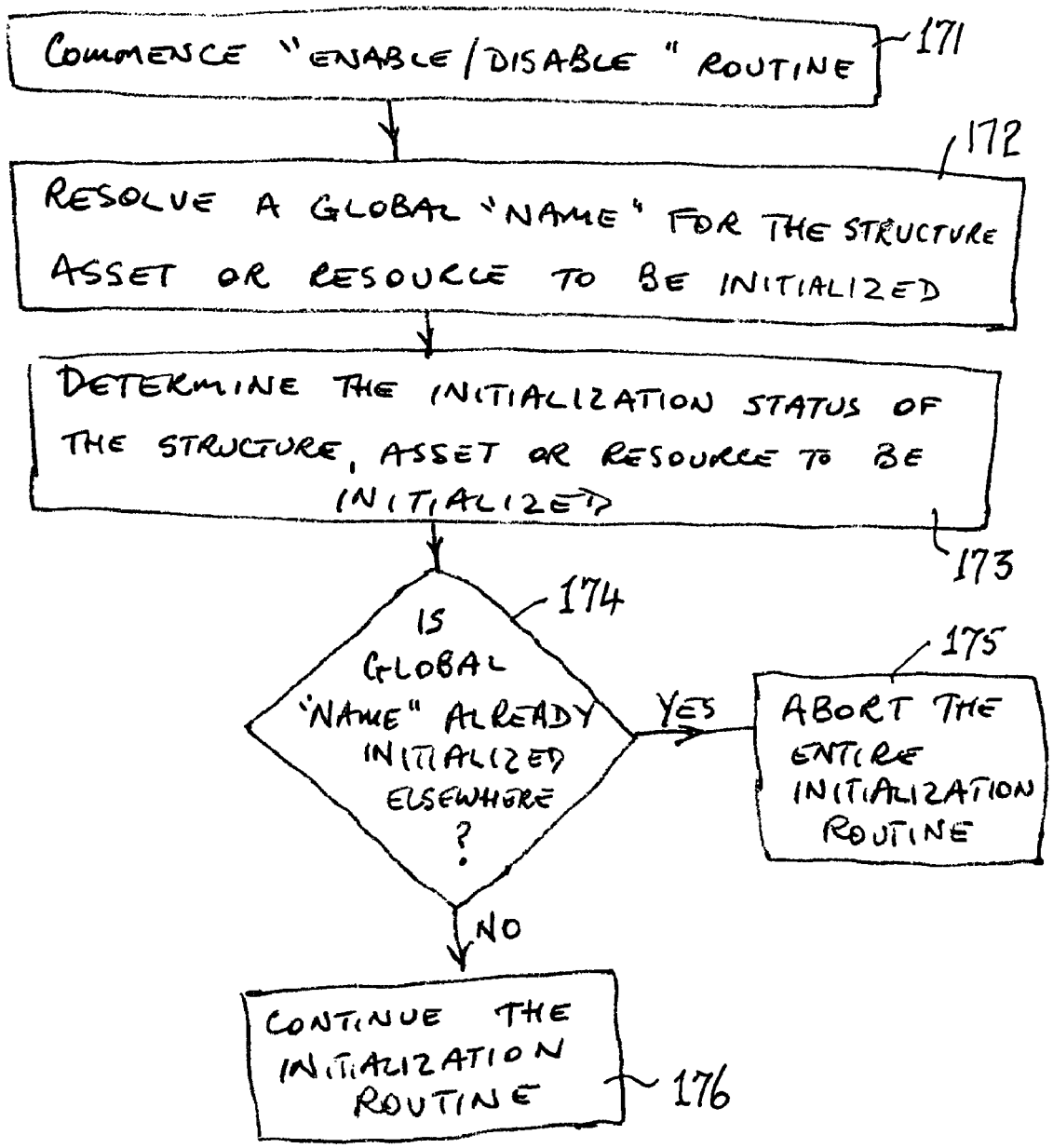
FIG. 17 is a flow chart illustrating the continuation or abortion of initialization routines.

FIG. 17 illustrates a particular form of modification. After commencing the routine in step 171, the structures, assets or resources (in JAVA termed classes or objects) to be initialised are, in step 172, allocated a name or tag which can be used globally by all machines. This is most conveniently done via a table maintained by server machine X of FIG. 15. This table also includes the status of the class or object to be initialised.

As indicated in FIG. 17, if steps 173 and 174 determine that the global name is not already initialised elsewhere (ie on a machine other than the machine carrying out the loading) then this means that the object or class can be initialised in the normal fashion by carrying out step 176 since it is the first such object or class to be created.

However, if steps 173 and 174 determine that the global name is already utilised elsewhere, this means that another machine has already initialised this class or object. As a consequence, the regular initialisation routine is aborted in its entirety, by carrying out step 175.

Figure 18:
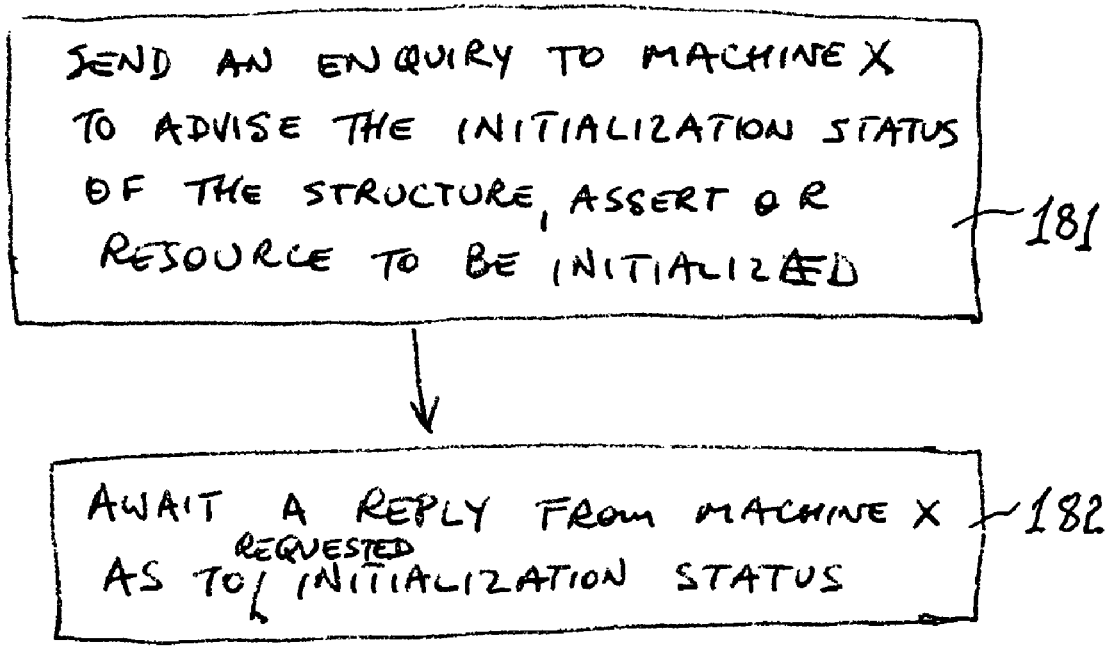
FIG. 18 is a flow chart illustrating the enquiry sent to the server machine X.

FIG. 18 shows the enquiry made by the loading machine (one of M1, M2 ... Mn) to the server machine X of FIG. 15. The operation of the loading machine is temporarily interrupted as indicated by step 181 until the reply is received from machine X, as indicated by step 182.

Figure 19:
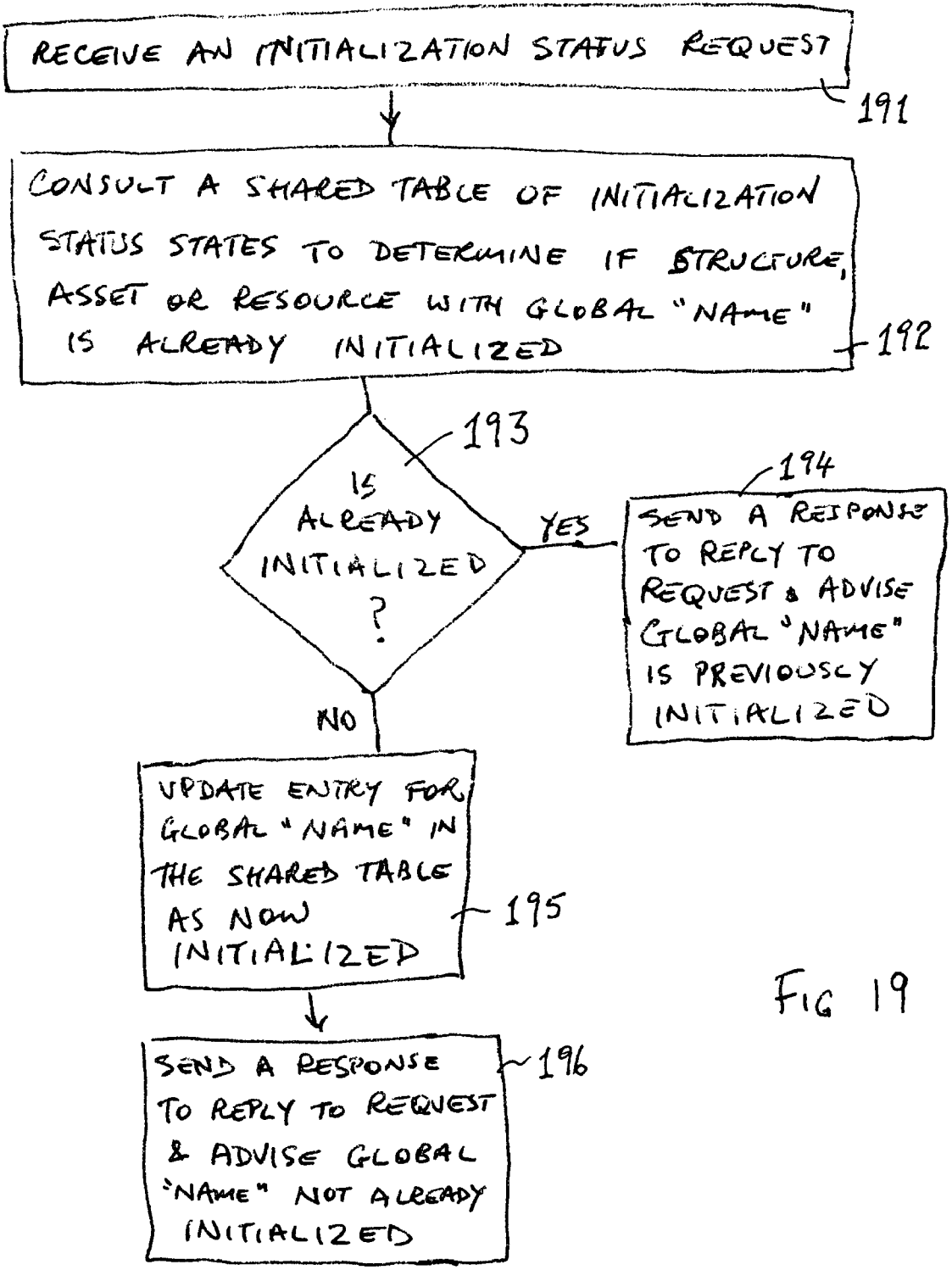
FIG. 19 is a flow chart of the response of the server machine X to the request of FIG. 18.

FIG. 19 shows the activity carried out by machine X of FIG. 15 in response to such an enquiry as step 181 of FIG. 18. The initialisation status is determined in steps 192 and 193 and, if already initialised, the response to that effect is sent to the enquiring machine by carrying out step 194. Similarly, if the initialisation status is uninitialized, the corresponding reply is sent by carrying out steps 195 and 196. The waiting enquiring machine created by step 182 is then able to respond accordingly.

Reference is made to the accompanying Annexures in which:

Annexures A1-A10 illustrate actual code in relation to fields,

Annexure B1 is a typical code fragment from an unmodified <clinit> instruction,

Annexure B2 is an equivalent in respect of a modified <clinit> instruction,

Annexure B3 is a typical code fragment from an unmodified <init> instruction,

Annexure B4 is an equivalent in respect of a modified <init> instruction,

In addition, Annexure B5 is an alternative to the code of Annexure B2, and

Annexure B6 is an alternative to the code of Annexure B4.

Furthermore, Annexure B7 is the source-code of InitClient, which queries an "initialization server" for the initialization status of the relevant class or object.

Annexure B8 is the source-code of InitServer, which receives an initialization status query by InitClient and in response returns the corresponding status.

Similarly, Annexure B9 is the source-code of the example application used in the before/after examples of Annexure B1-B6.

Figure 20:
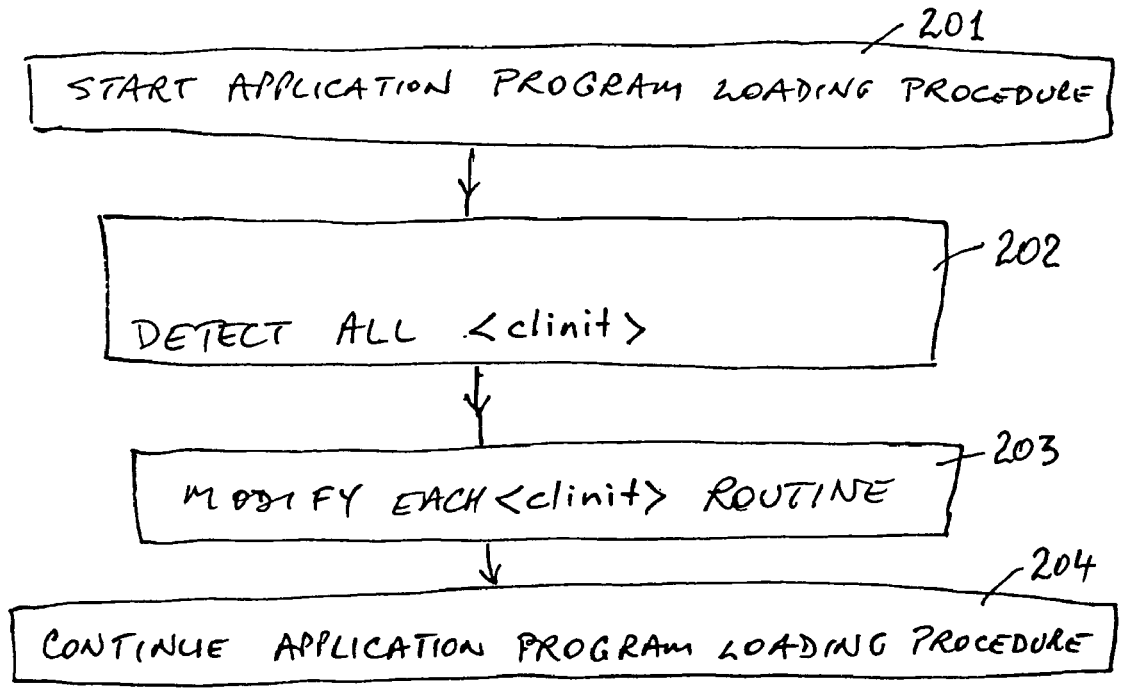
FIG. 20 is a flowchart illustrating a modified initialization routine for the <clinit> instruction.

Turning now to FIG. 20, the procedure followed to modify the <clinit> routine relating to classes so as to convert from the code fragment of Annexure B1 to the code fragment of Annexure B2 is indicated. The initial loading of the application program 50 onto the JAVA virtual machine 72 is commenced at step 201, and each line of code is scrutinized in order to detect those instructions which represent the <clinit> routine by carrying out step 202. Once so detected, the <clinit> routine is modified as indicated in Annexure B2 by carrying out step 203. As indicated by step 204, after the modification is completed the loading procedure is then continued.

Annexures B1 and B2 are the before and after excerpt of a <clinit> instruction respectively. The modified code that is added to the method is highlighted in bold. In the original code sample of Annexure B1, the <clinit> method creates a new object of itself, and writes this to the memory location (field) called "thisTest". Thus, without management of class loading in a distributed environment, each machine would reinitialise the same shared memory location (field), with different objects. Clearly this is not what the programmer of the application program being loaded expects to happen.

So, taking advantage of the DRT, the application code is modified as it is loaded into the machine by changing the <clinit> method. The changes made (highlighted in bold) are the initial instructions that the <clinit> method executes. These added instructions check if this class has already been loaded by calling the isAlreadyLoaded( ) method, which returns either true or false corresponding to the loaded state of this class.

The isAlreadyLoaded( ) method of the DRT can optionally take an argument which represents a unique identifier for this class (See Annexure B5 and B6), for example the name of the class, or a class object representing this class, or a unique number representing this class across all machines, to be used in the determination of the loaded status of this class. This way, the DRT can support the loading of multiple classes at the same time without becoming confused as to which of the multiple classes are already loaded and which are not, by using the unique identifier of each class to consult the correct record in the isAlreadyLoaded table.

The DRT can determine the loaded state of the class in a number of ways. Preferably, it can ask each machine in turn if this class is loaded, and if any machine replies true, then return true, otherwise false. Alternatively, the DRT on the local machine can consult a shared record table (perhaps on a separate machine (eg machine X), or a coherent shared record table on the local machine, or a database) to determine if this class has been loaded or not.

If the DRT returns false, then this means that this class has not been loaded before on any machine in the distributed environment, and hence, this execution is to be considered the first and original. As a result, the DRT must update the "isAlreadyLoaded" record for this class in the shared record table to true, such that all subsequent invocations of isAlreadyLoaded on all other machines, and including the current machine, will now return true. Thus, if DRT.isAlreadyLoaded( ) returns false, the modified <clinit> method proceeds with the original code block, which now trails the inserted three instructions.

On the other hand, if the DRT returns true, then this means that this class has already been loaded in the distributed environment, as recorded in the shared record table of loaded classes. In such a case, the original code block is NOT to be executed, as it will overwrite already-initialised memory locations etc. Thus, when the DRT returns true, the inserted three instructions prevent execution of the original code, and return straight away to the application program.

Figure 21:
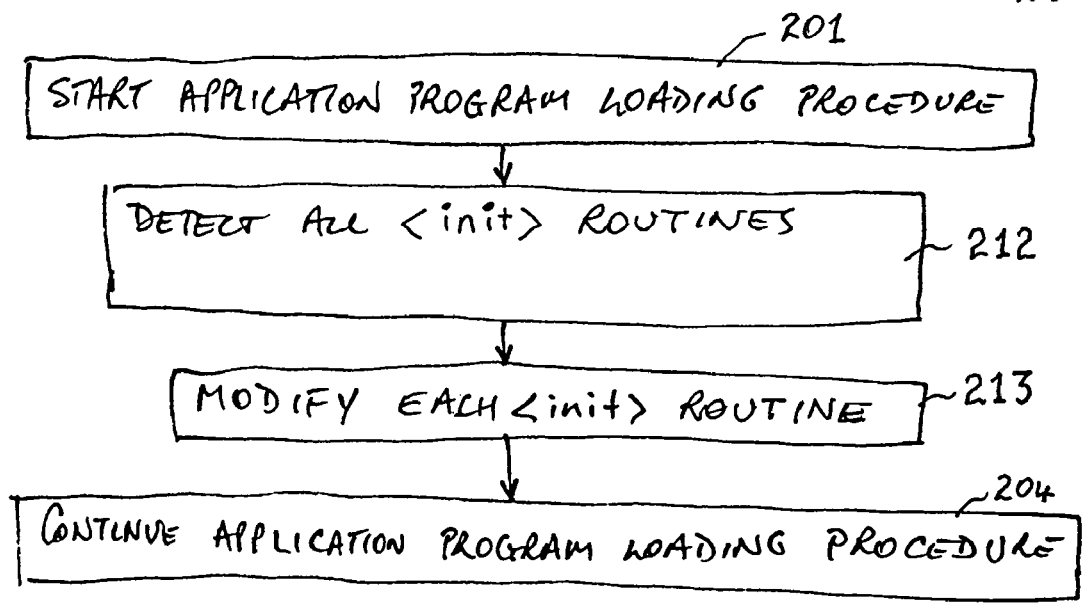
FIG. 21 is a flowchart illustrating a modified initialization routine for the <init> instruction.

An equivalent procedure for the <init> routines relating to objects is illustrated in FIG. 21 where steps 212 and 213 are equivalent to steps 202 and 203 of FIG. 20. This results in the code of Annexure B3 being converted into the code of Annexure B4.

A similar modification as used for <clinit> is used for <init>. The application program's <init> block (or blocks, as there can be multiple—unlike <clinit>) is or are detected as shown by step 212 and modified as shown by step 213 to behave coherently across the distributed environment.

In the example of Annexure B3 the application program's <init> instructions initialise a memory location (field) with the timestamp of the loading time. The application could use this, for example, to record when this object was created. Clearly, in a distributed environment, where peer objects can load at different times, special treatment is necessary to make sure that the timestamp of the first-loaded peer object is not overwritten by later peer objects.

The disassembled instruction sequence after modification has taken place is set out in Annexure B4 and the modified/inserted instructions are highlighted in bold. For the <init> modification, unlike the <clinit> modification, the modifying instructions are often required to be placed after the "invokespecial" instruction, instead of at the very beginning. The reasons for this are driven by the JAVA Virtual Machine specification. Other languages often have similar subtle designs nuances.

Given the fundamental concept of testing to see if initialization has already been carried out, and if not carrying it out, and if so, not carrying out any further initialization; there are several different ways in which this concept can be carried out.

In the first embodiment, a particular machine, say machine M2, loads the class or object on itself and then loads each of the other machines M1, M3 . . . Mn (either sequentially or simultaneously). In this arrangement, which may be termed "master/slave" each of machines M1, M3, . . . Mn loads what it is given by machine M2.

In a variation of this "master/slave" arrangement, machine M2 loads the <clinit> routine in unmodified form on machine M2 and then modifies the class by deleting the initialization routine in its entirety and loads the modified class on the other machines. Thus in this instance the modification is not a by-passing of the initialization routine but a deletion of it on all machines except one.

In a still further embodiment, each machine receives the initialization routine, but modifies it and loads the modified routine on that machine. This enables the modification carried out by each machine to be slightly different being optimized based upon its architecture and operating system, yet still coherent with all other similar modifications.

In a further arrangement, a particular machine, say M1, loads the class and all other machines M2, M3 . . . Mn do a modification to delete the initialization routine and load the modified version.

In all instances, the supply can be branched (ie M2 supplies each of M1, M3, M4, etc directly) or cascaded or sequential (ie M2 applies M1 which then supplies M3 which then supplies M4, and so on).

In a still further arrangement, the initial machine, say M2, can carry out the initial loading and then generate a table which lists all the classes loaded by machine M2. This table is then sent to all other machines (either in branched or cascade fashion). Then if a machine, other than M2, needs to access a class listed in the table, it sends a request to M2 to provide the necessary information. Thus the information provided to machine Mn is, in general, different from the initial state loaded into machine M2.

Under the above circumstances it is necessary for each entry in the table to be accompanied by a counter which is incremented on each occasion that a class is loaded. Thus, when data is demanded, both the class contents and the count of the corresponding counter are transferred in response to the demand. This "on demand" mode increases the overhead of each computer but reduces the volume of traffic on the communications network which interconnects the computers.

In a still further arrangement, the machines M1 to Mn, can send all load requests to an additional machine X (of FIG. 15), which performs the modification via any of the afore mentioned methods, and returns the modified class to each of the machines M1 to Mn which then load the class locally. In this arrangement, machines M1 to Mn do not maintain a table of records for any class, and instead, they forward all load requests to machine X, which maintains the table of loaded classes, and returns a modified class to each machine dependant on whether or not it is the first time a given class is loaded on machines M1 to Mn. The modifications performed by machine X can include any of the modifications covered under the scope of the present invention.

Referring again to FIG. 14, in the JAVA language, the initialization routine <clinit> happens only once when a given class file 50A is loaded. However, the initialization routine <init> happens often, for example every time a new object 50X, 50Y or 50Z is created. In addition, classes are loaded prior to objects so that in the application program illustrated in FIG. 14, having a single class 50A and three objects 50X-50Z, the first class 50A is loaded first, then first object 50X is loaded, then second object 50Y is loaded and finally third object 50Z is loaded. Where, as in FIG. 14, there is only a single computer or machine 72, then no conflict or inconsistency arises in the running of the initialization routines intended to operate during the loading procedure because the single machine of FIG. 14 is able to easily keep track of whether the specific objects 50X-50Z are, in future, liable to be required for the program 50. This is done by maintaining a "handle count" or similar. This count keeps track of the number of places in the executable code where reference is made to a specific object. When the handle count for a specific object reaches zero, there is nowhere in the executable code which makes reference to the object. The object is then said to be "finalizable".

Once this state has been achieved, the object can be safely deleted (or cleaned up or finalized) because it is no longer needed. The same procedure applies mutatis mutandis for classes. In particular, the computer programmer when writing a program using the JAVA language and architecture, need not write any specific code in order to provide for this cleaning up, deletion or finalization. Instead a single JAVA virtual machine 72 can keep track of the class and object handle counts and clean up (or carry out finalization) as necessary in an unobtrusive fashion.

However, in the arrangement illustrated in FIG. 8, (and also in FIGS. 31-33), a plurality of individual computers or machines M1, M2 . . . Mn are provided each of which are interconnected via a communications network 53 and each of which is provided with a modifier 51 (as in FIG. 5 and realised by the DRT 71 of FIG. 8) and loaded with a common application program 50. Essentially the modifier 51 or DRT 71 modifies the application code 50 to execute clean up routines across the plurality of individual machines M1, M2 . . . Mn. It follows therefore that in such a computing environment it is necessary to ensure that each of the individual machines is finalized in a consistent fashion (with respect to the others).

In particular, whilst one particular machine (say, M3) may have no further call on an object or class, another machine (say M5) may still need to refer to that object or class in future. Thus if the object or class were to be deleted from machine M3, then if M5 were to write to that object and amend its value, then that change in value could not be propagated throughout all the machines M1, M2 . . . Mn since the machine M3 would not include the relevant object in its local memory. Furthermore, were machine M3 to execute the cleanup routine on a given object or class, the cleanup routine would preform cleanup not just for that object on that machine, but all peer-objects on all other machines as well. Thus invalidating the object on machine M5. Thus the goal of substantially identical memory contents for each of the machines M1, M2 . . . Mn, as required for simultaneous operation of the same application program, would not be achieved.

In order to ensure consistent finalization, or clean up, the application program 50 is scrutinized in order to detect program steps which define a clean up routine. This scrutiny can take place either prior to loading, or during the loading procedure, or even after the loading procedure (but before execution of the relevant corresponding portion of the application code 50). It may be likened to a compilation procedure with the understanding that the term compilation normally involves a change in code or language, eg from source to object code or one language to another. However, in the present instance the term "compilation" (and its grammatical equivalents) is not so restricted and can also include embrace modifications within the same code or language.

As a consequence, in the abovementioned scrutiny clean up routines are initially looked for, and when found a modifying code is inserted so as to give rise to a modified clean up routine. This modified routine is to abort the clean up routine on any specific machine unless the class or object to be deleted is marked for deletion by all other machines. There are several different modes whereby this modification and loading can be carried out. In this connection reference is made to Annexure C where examples of various clean up or finalization modes are set out.

Thus, in one mode, the DRT 71/1 on the loading machine, in this example JVM#1, asks the DRT's 71/2 . . . 71/n of all the other machines M2 . . . Mn if the first object 50X, say, is utilized (ie not marked for deletion) by any other machine M2 . . . Mn. If the answer to this question is yes, then the normal clean up procedure is turned off or disabled for the first object 50X on machine JVM#1. If the answer is no, (ie the first object 50X is marked for deletion on all other machines) then the normal clean up procedure is operated and the first object 50X is deleted not only on machine JVM#1 but on all other machines M2 . . . Mn. Preferably the clean up task is allocated to the last machine M1 marking the object or class for deletion.

Figure 22:
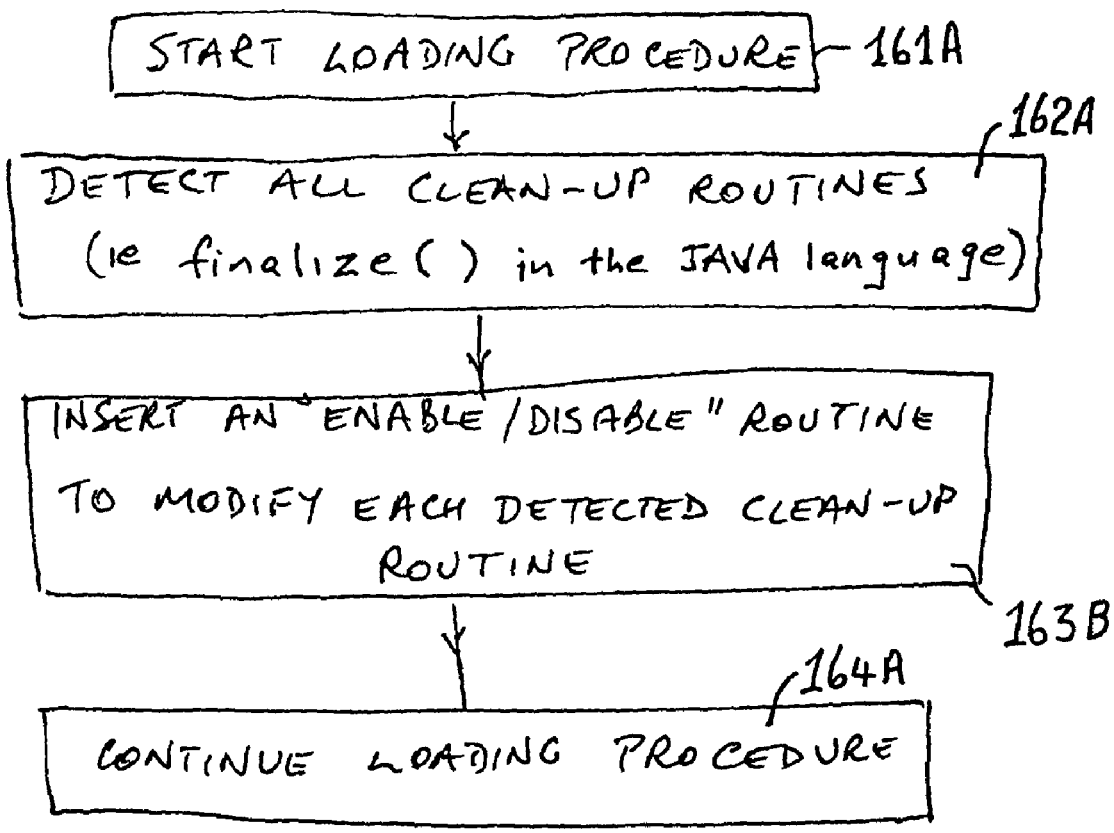
FIG. 22 is a flow chart of illustrating the modification of "clean up" or finalization routines.

FIG. 22 shows a preferred general procedure to be followed in relation to finalization. After loading 161A has been commenced, the instructions to be executed are considered in sequence and all clean up routines are detected as indicated in step 162A. In the JAVA language these are the "finalize( )" routine (or method in JAVA terminology). Other languages use different terms.

Where a clean up routine is detected, it is modified at step 163A, typically by inserting further instructions into the routine. Alternatively, the modifying instructions could be inserted prior to the routine. Once the modification has been completed the loading procedure continues, as indicated in step 164A.

Figure 23:
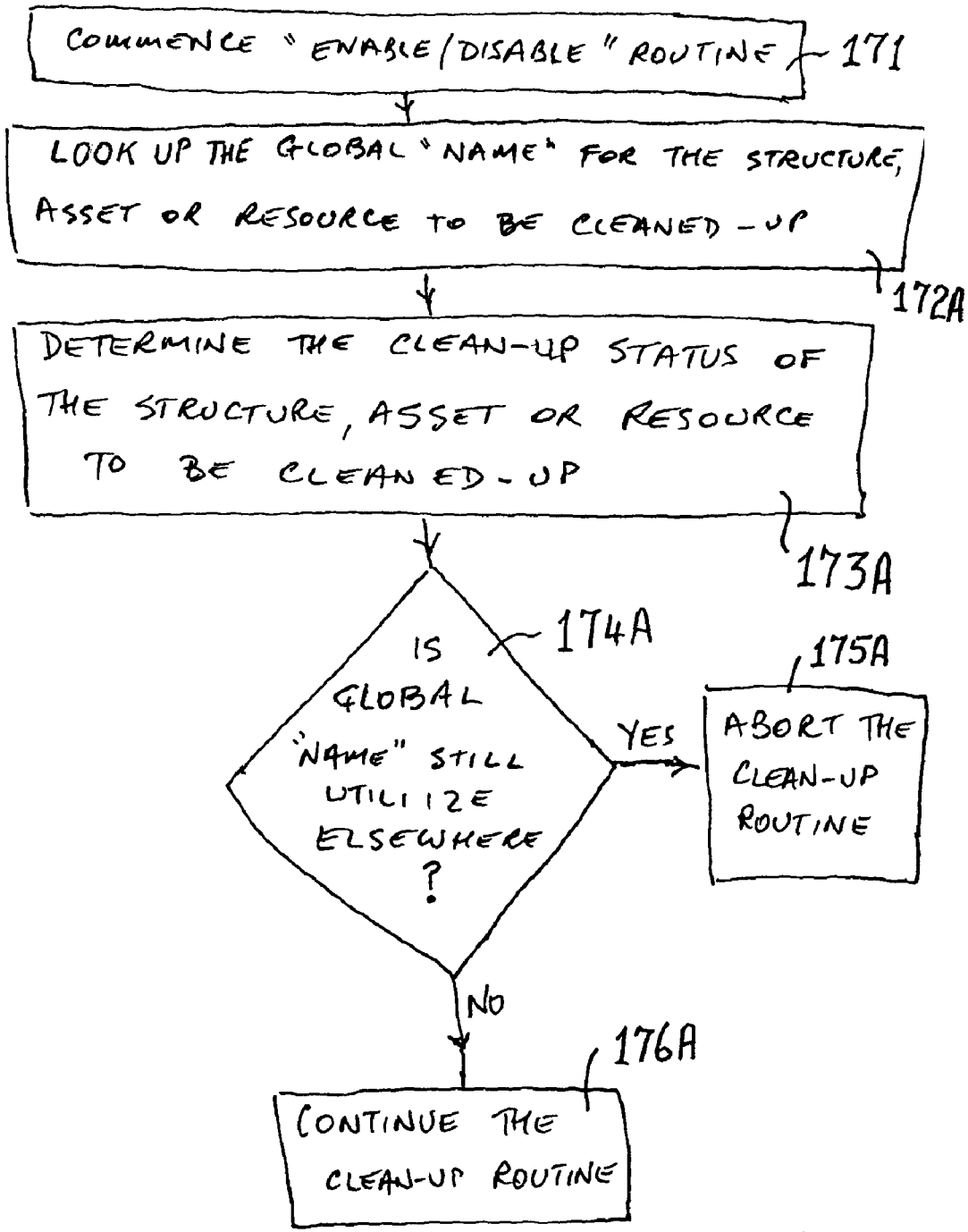
FIG. 23 is a flow chart illustrating the continuation or abortion of finalization routines.

FIG. 23 illustrates a particular form of modification. Firstly, the structures, assets or resources (in JAVA termed classes or objects) 50A, 50X . . . 50Y which are possible candidates to be cleaned up, have already been allocated a name or tag which can be used globally by all machines M1, M2 . . . Mn, as indicated by step 172A. This preferably happens when the classes or objects are originally initialized. This is most conveniently done via a table maintained by server machine X. This table also includes the "clean up status" of the class or object. In the preferred embodiment, this table also includes a counter which stores a count of the number of machines which have marked this asset for deletion. Thus a total count value of less than (n−1) indicates a "do not clean up" status for the asset as a network whole.

As indicated in FIG. 23, if the global name is not marked for deletion on all other machines (ie all except on the machine proposing to carry out the clean up routine) then this means that the proposed clean up routine of the object or class should be aborted since the object or class is still required, as indicated by step 175A.

However, if the global name is marked for deletion on all machines, this means that no other machine requires this class or object. As a consequence, the regular clean up routine indicated in step 176A can be, and should be, carried out.

Figure 24:
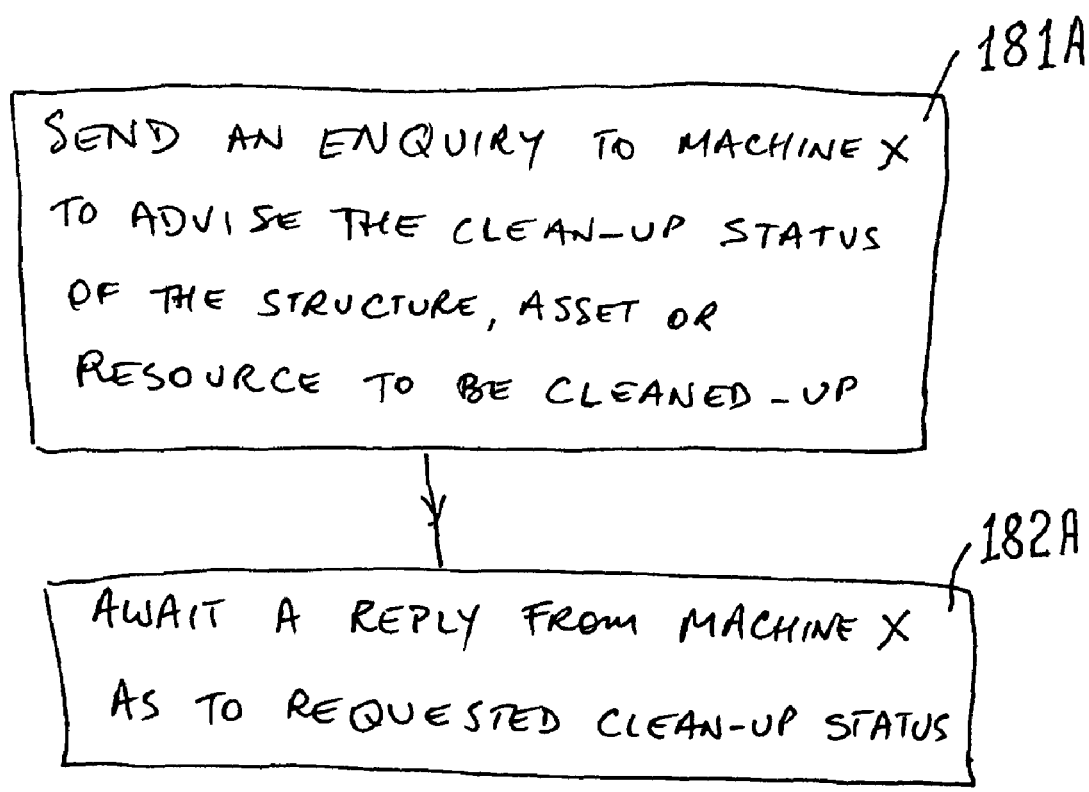
FIG. 24 is a flow chart illustrating the enquiry sent to the server machine X.

FIG. 24 shows the enquiry made by the machine proposing to execute a clean up routine (one of M1, M2 . . . Mn) to the server machine X. The operation of this proposing machine is temporarily interrupted, as shown in step 181A and 182A, until the reply is received from machine X, indicated by step 182A.

Figure 25:
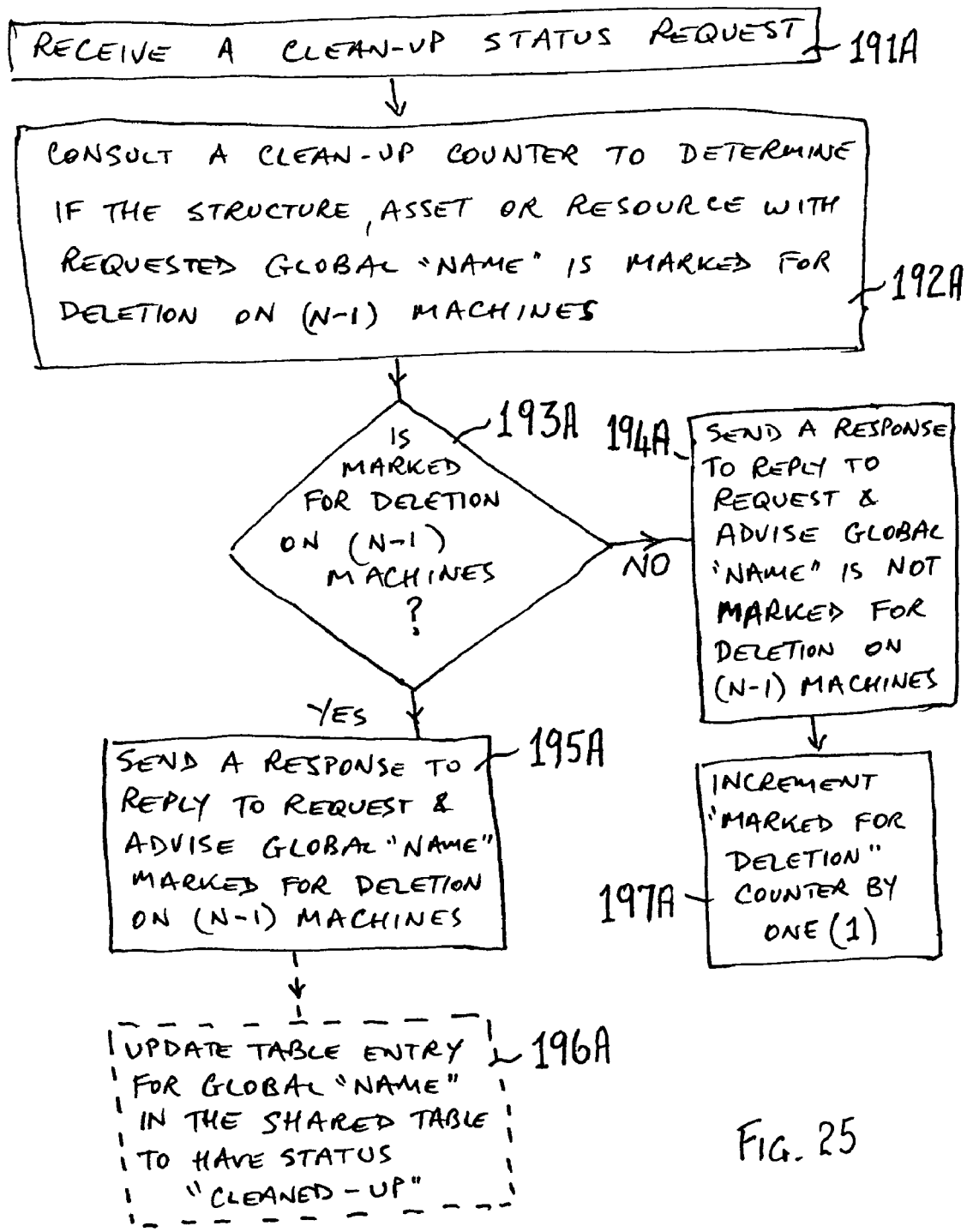
FIG. 25 is a flow chart of the response of the server machine X to the request of FIG. 24.

FIG. 25 shows the activity carried out by machine X in response to such an enquiry. The clean up status is determined as seen in step 192A and, if no—the named resource is not marked for deletion on (n-1) machines (ie is utilized elsewhere), the response to that effect is sent to the enquiring machine 194A but the "marked for deletion" counter is incremented by one (1), as shown by step 197A. Similarly, if the answer is yes—the corresponding reply is sent as indicated by steps 195A. The waiting enquiring machine 182A is then able to respond accordingly. As indicated by broken lines in FIG. 25, preferably in addition to the yes response shown in step 195A, the shared table is updated so that the status of the globally named asset is changed to "cleaned up" as indicated by step 196A.

Referring again to FIG. 14, the single machine of FIG. 14 is able to easily perform synchronization of specific objects 50X-50Z when specified by the programmer's use of a synchronization routine. As each object exists only locally, the single JAVA virtual machine 72 of FIG. 14 is able to ensure that an object is properly synchronized as specified by the programmer and thus only utilized by one part of the executable code at any single point in time. If another part of the executable code wishes to use the same object then the possible contention is resolved by the JAVA virtual machine 72 such that other executing parts of the application program have to wait until the first part has finished.

The same procedure applies mutatis mutandis for classes 50A. In particular, the computer programmer when writing a program using the JAVA language and architecture, need only to use a synchronization routine(s) in order to provide for this avoidance of contention. Thus a single JAVA virtual machine can keep track of utilization of the classes and objects and avoid any corresponding problems as necessary in an unobtrusive fashion. The process whereby only one object or class is exclusively used is termed "synchronization". In the JAVA language the instructions "monitorenter" and "monitorexit" signify the beginning and ending of a synchronization routine which results in the acquiring of and releasing of a "lock" respectively which prevents an asset being the subject of contention.

However, in the arrangement illustrated in FIG. 8, (and also in FIGS. 31-33), a plurality of individual computers or machines M1, M2 . . . Mn are provided each of which are interconnected via a communications network 53 and each of which is provided with a modifier 51 (as in FIG. 5 and realized by the DRT 71 in FIG. 8) and loaded with a common application program 50. Essentially the modifier 51 or DRT 71 ensures that when part of the application program 50 running on one of the machines exclusively utilizes (eg, by means of synchronization) a particular local asset, such as an objects 50X-50Z or class 50A, no other machine M2 . . . Mn utilizes the corresponding asset in its local memory.

In particular, whilst one particular machine (say, M3) is exclusively using an object or class, another machine (say M5) may also be instructed by the code it is executing to exclusively use that object or class at that time. Thus if the object or class were to be exclusively used by both machines, then the behaviour of the object and application as a whole is undefined—that is, in the absence of proper exclusive use of an object when explicitly specified by the programmer, permanent inconsistency between machine M5 and machine M3 is likely to result. Thus the goal of substantially identical memory contents for each of the machines M1, M2 . . . Mn, as required for simultaneous operation of the same application program, would not be achieved.

In order to ensure consistent synchronization the application program is scrutinized in order to detect program steps which define a synchronization routine. This scrutiny can take place either prior to loading, or during the loading procedure, or even after the loading procedure (but before execution of the relevant corresponding portion of the application code). It may be likened to a compilation procedure with the understanding that the term compilation normally involves a change in code or language, eg from source to object code or one language to another. However, in the present instance the term "compilation" (and its grammatical equivalents) is not so restricted and can also include embrace modifications within the same code or language.

Reference is made to the accompanying Annexure D in which:

Annexure D1 is a typical code fragment from an unmodified synchronization routine, and Annexure D2 is an equivalent in respect of a modified synchronization routine, Annexures D1 and D2 are the before and after excerpt of a synchronization routine respectively. The modified code that is added to the method is highlighted in bold. In the original code sample of Annexure D1, the code increments a shared memory location (counter) within in synchronize statement. The purpose of the synchronize statement is to ensure thread-safety of the increment operation in multi-threaded applications. Thus, without management of synchronization in a distributed environment, each machine would perform synchronization in isolation, thus potentially incrementing the shared counter at the same time, leading to potential race condition(s) and incoherent memory. Clearly this is not what the programmer of the application program expects to happen.

So, taking advantage of the DRT, the application code is modified as it is loaded into the machine by changing the synchronization routine. The changes made (highlighted in bold) are the initial instructions and ending instructions that the synchronization routine executes. These added instructions act to additionally perform synchronization across all other machines in the distributed environment, thereby preserving the synchronize behaviour of the application program across a plurality of machines.

The acquireLock( ) method of the DRT takes an argument which represents a unique identifier for this object (See Annexure D2), for example the name of the object, a reference to the object in question, or a unique number representing this object across all nodes, to be used in acquiring a global lock of the specified object. This way, the DRT can support the synchronization of multiple objects at the same time without becoming confused as to which of the multiple objects are already synchronized and which are not, by using the unique identifier of each object to consult the correct record in the shared synchronization table.

The DRT can determine the synchronization state of the object in a number of ways. Preferably, it can ask each machine in turn if their local copy of this object is presently synchronized, and if any machine replies true, then to wait until that object is unsynchronised, otherwise synchronize this object locally. Alternatively, the DRT on the local machine can consult a shared record table (perhaps on a separate machine (eg machine X), or a coherent shared record table on the local machine, or a database) to determine if this object has been marked as synchronized by any other machine, and if so, then wait until the status of the object is changed to "unsynchronised" and then acquire the lock by marking the object as synchronized, otherwise acquire the lock by marking the object as synchronized by this machine.

If the DRT determines that no other machine currently has a lock for this object (ie, no other machine has synchronized this object), then to acquire the lock for this object on all other machines, for example by means of modifying the corresponding entry in a shared table of synchronization states, or alternatively, sequentially acquiring the lock on all other machines in addition the current machine. Only once this machine has successfully confirmed that no other machine has currently synchronized this object, and this machine has correspondingly synchronized locally, can the execution of the original synchronized code-block begin.

On the other hand, if the DRT determines that another machine has already synchronized this object, then this machine is to postpone execution of the original synchronize code-block until such a time as the DRT can confirm than no other machine is presently executing a synchronize statement for this object, and that this machine has correspondingly synchronized the object locally. In such a case, the original code block is NOT to be executed until this machine can guarantee that no other machine is executing a synchronize statement for this object, as it will potentially corrupt the object across the participating machines due to race-conditions, inconsistency of memory, and so forth resulting from the concurrent execution of synchronized statements. Thus, when the DRT determines that this object is presently "synchronized", the DRT prevents execution of the original code-block by pausing the execution of the "acquireLock( )" operation until such a time as a corresponding "releaseLock( )" operation is executed by the present owner of the lock.

Thus, on execution of a "releaseLock( )" operation, the machine which presently "owns" a lock (ie, is executing a synchronized statement) indicates the close of its synchronized statement, for example by marking this object as "unsynchronised" in the shared table of synchronization states, or alternatively, sequentially releasing locks acquired on all other machines. At this point, any other machine waiting to begin execution of a corresponding synchronized statement can then claim ownership of this object's lock by resuming execution of its postponed (ie delayed) "acquireLock( )" operation, for example, marking itself as executing a synchronized statement for this object in the shared table of synchronization states, or alternatively, sequentially acquiring local locks on each of the other machines.

So, taking advantage of the DRT, the application code is modified as it is loaded into the machine by changing the synchronization routine (consisting of a beginning "monitorenter" and an ending "monitorexit" instruction/s). The changes made (highlighted in bold) are the initial instructions that the synchronization routine executes. These added instructions check if this lock has already been acquired by another machine. If this lock has not been acquired by another machine, then the DRT of this machine notifies all other machines that this machine has acquired the lock, and thereby stopping the other machines from executing synchronization routines for this lock.

The DRT can record the lock status of the machines in many ways, for example:

1. corresponding to the entry to a synchronization routine, the DRT individually consults each machine to ascertain if this lock is already acquired. If so, the DRT pauses the execution of the synchronization routine until all other machines no longer own a lock on this asset or object. Otherwise, the DRT executes this synchronization routine. Alternatively, 2. corresponding to the entry to a synchronization routine, the DRT consults a shared table of records (for example a shared database, or a copy of a shared table on each of the participating machines) which indicate if any machine currently "owns" this lock. If so, the DRT then pauses execution of the synchronization routine on this machine until all other machines no longer own a lock on this object. Otherwise the DRT records this machine in the shared table (or tables, if there are multiple tables of records, eg, on multiple machines) as the owner of this lock, and then executes the synchronization routine.

Similarly, when a lock is released, that is to say, when the execution of a synchronization routine is to end, the DRT can "un-record" the lock status of machines in many alternative ways, for example:

1. corresponding to the exit to a synchronization routine, the DRT individually notifies each other machine that it no longer owns the lock. Alternatively, 2. corresponding to the exit to a synchronization routine, the DRT updates the record for this locked asset or object in the shared table(s) of records such that this machine is no longer recorded as owning this lock.

Still further, the DRT can queue machines needing to acquire a locked object in multiple alternative ways, for example:

1. corresponding to the entry to a synchronization routine, the DRT notifies the present owner of the locked object that a specific machine would like to acquire the lock upon release by the current owning machine. The specified machine, if there are no other waiting machines, then stores a record of the specified machine's interest in a table, which, following the exit of the synchronization routine of the locked object, then notifies the waiting machine that it can acquire this locked object, and thus begin executing its synchronization routine, 2. corresponding to the entry to a synchronization routine, the DRT notifies the present owner of the locked object that a specific machine (say machine M6) would like to acquire the lock upon release by that machine (say machine M4). That machine M4, if it finds after consulting its records of waiting machines for this locked object, finds that there are already one or more machines waiting, then either appends machine M6 to the end of the list of machines wanting to acquire this locked object, or alternatively, forwards the request from M6 to the first waiting, or any other machine waiting, machine which then, in turn, records machine M6 in their table of records, 3. corresponding to the entry to a synchronization routine, the DRT records itself in a shared table(s) of records (for example, a table stored in a shared database accessible by all machines, or multiple separate tables which are substantially similar).

Still further, the DRT can notify other machines queued to acquire this lock corresponding to the exit of a synchronization routine by this machine in the following alternative ways, for example:

1. corresponding to the exit of a synchronization routine, the DRT notifies one of the awaiting machines (for example, this first machine in the queue of waiting machines) that the lock is released, 2. corresponding to the exit of a synchronization routine, the DRT notifies one of the awaiting machines (for example, the first machine in the queue of waiting machines) that the lock is released, and additionally, provides a copy of the entire queue of machines (for example, the second machine and subsequent machines awaiting for this lock). This way, the second machine inherits the list of waiting machines from the first machine, and thereby ensures the continuity of the queue of waiting machines as each machine in turn down the list acquires and subsequently releases the lock.

During the abovementioned scrutiny, "monitor enter" and "monitor exit" instructions (or methods) are initially looked for and, when found, a modifying code is inserted so as to give rise to a modified synchronization routine. This modified routine acquires and releases a lock. There are several different modes whereby this modification and loading can be carried out. Annexure D provides further information.

Figure 26:
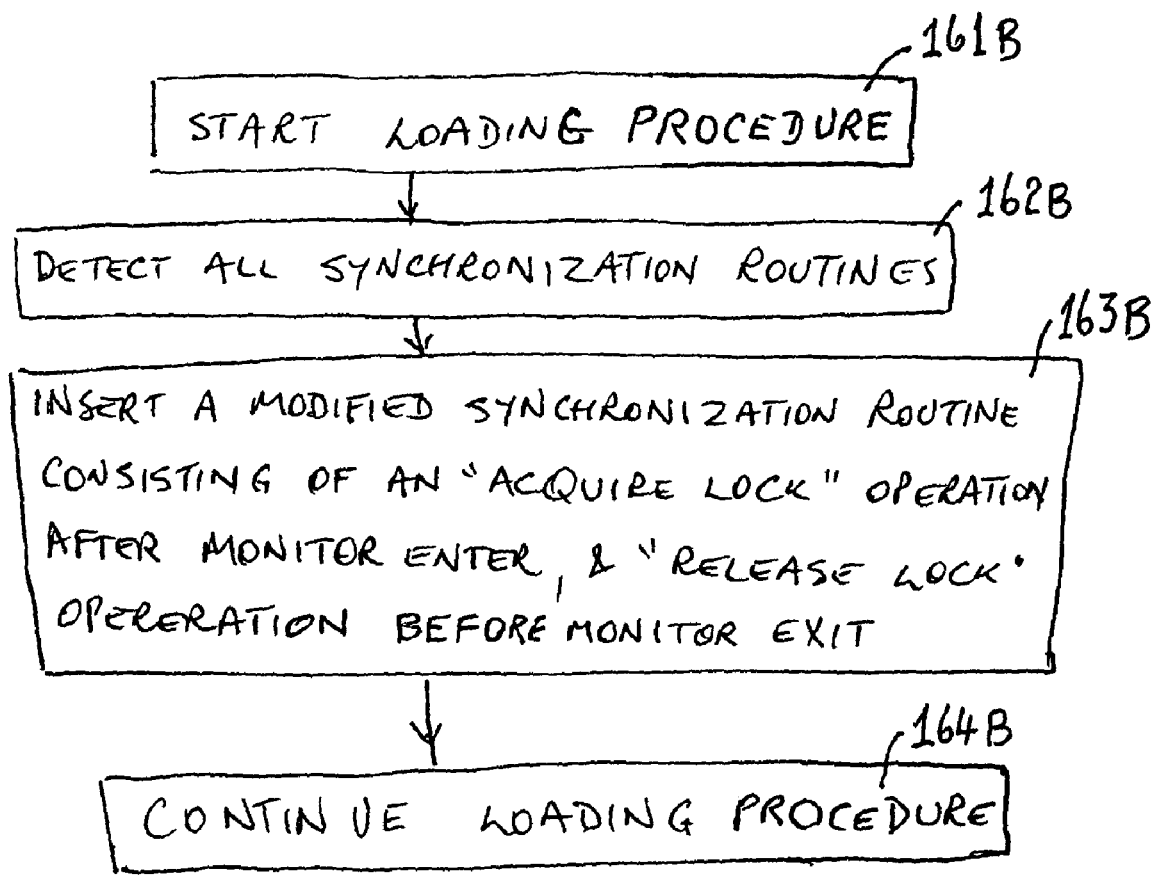
FIG. 26 is a flow chart of illustrating the modification of the monitor enter and exit routines.

FIG. 26 shows a preferred general procedure to be followed in relation to synchronization. After loading 161B has been commenced, the instructions to be executed are considered in sequence and all synchronization routines are detected as indicated in step 162B. In the JAVA language these are the "monitor enter" and "monitor exit" instructions. Other languages use different terms.

Where a synchronization routine is detected, it is modified, typically by inserting further instructions into the routine. Alternatively, the modifying instructions could be inserted prior to the routine. Once the modification has been completed the loading procedure continues. The modifications preferably take the form of an "acquire lock on all other machines" operation and a "release lock on all other machines" modification as indicated at step 163B.

Figure 27:
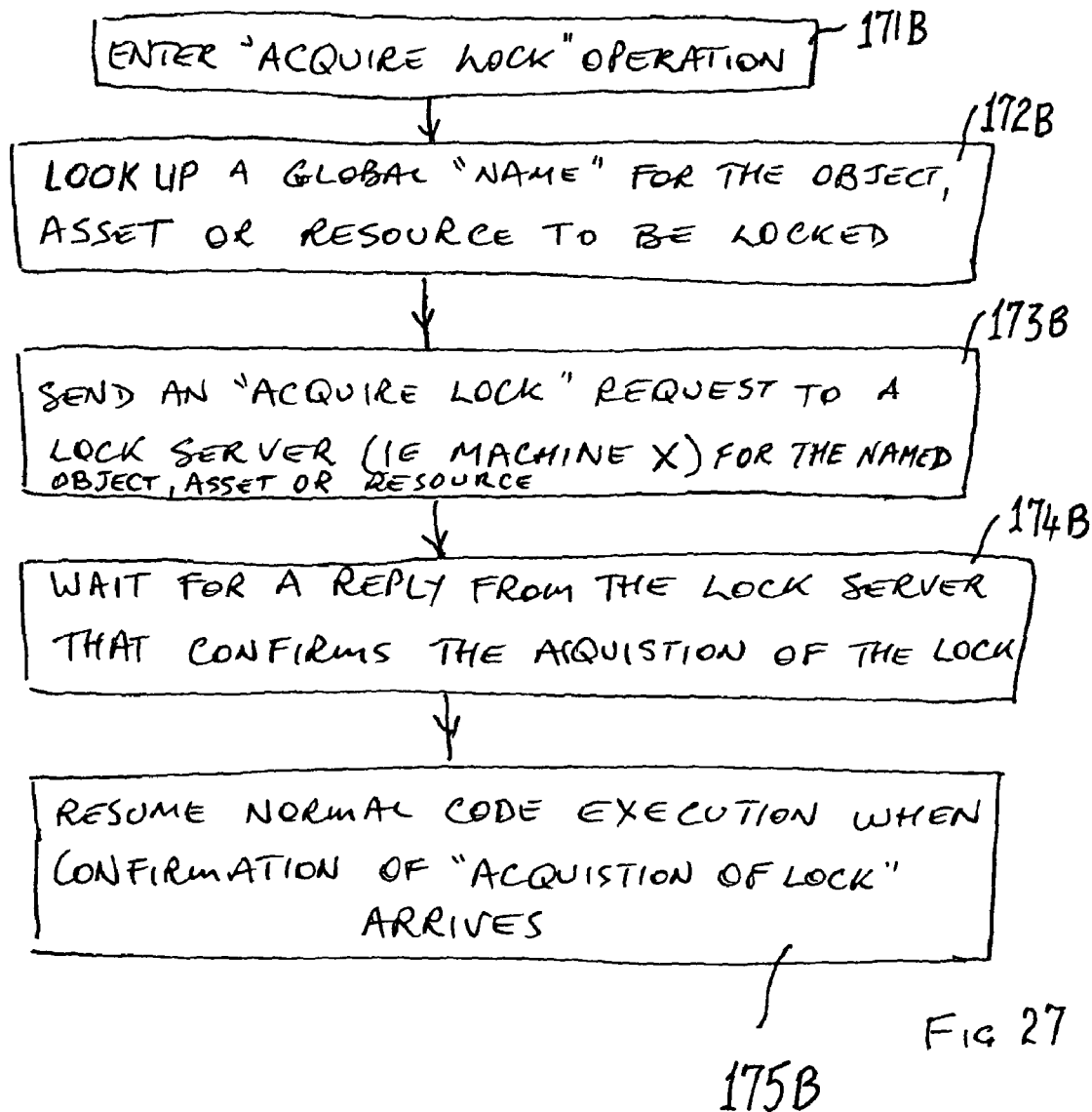
FIG. 27 is a flow chart illustrating the process followed by processing machine in requesting the acquisition of a lock.

FIG. 27 illustrates a particular form of modification. Firstly, the structures, assets or resources (in JAVA termed classes or objects eg 50A, 50X-50Y) to be synchronized have already been allocated a name or tag which can be used globally by all machines, as indicated by step 172B. This preferably happens when the classes or objects are originally initialized. This is most conveniently done via a table maintained by server machine X. This table also includes the synchronization status of the class or object. In the preferred embodiment, this table also includes a queue arrangement which stores the identities of machines which have requested use of this asset.

As indicated in step 173B of FIG. 27, next an "acquire lock" request is sent to machine X, after which, the sending machine awaits for confirmation of lock acquisition as shown in step 174B. Thus, if the global name is already locked (ie the corresponding asset is in use by another machine other than the machine proposing to acquire the lock) then this means that the proposed synchronization routine of the object or class should be paused until the object or class is unlocked by the current owner.

Alternatively, if the global name is not locked, this means that no other machine is using this class or object, and confirmation of lock acquisition is received straight away. After receipt of confirmation of lock acquisition, execution of the synchronization routine is allowed to continue, as shown in step 175B.

Figure 28:
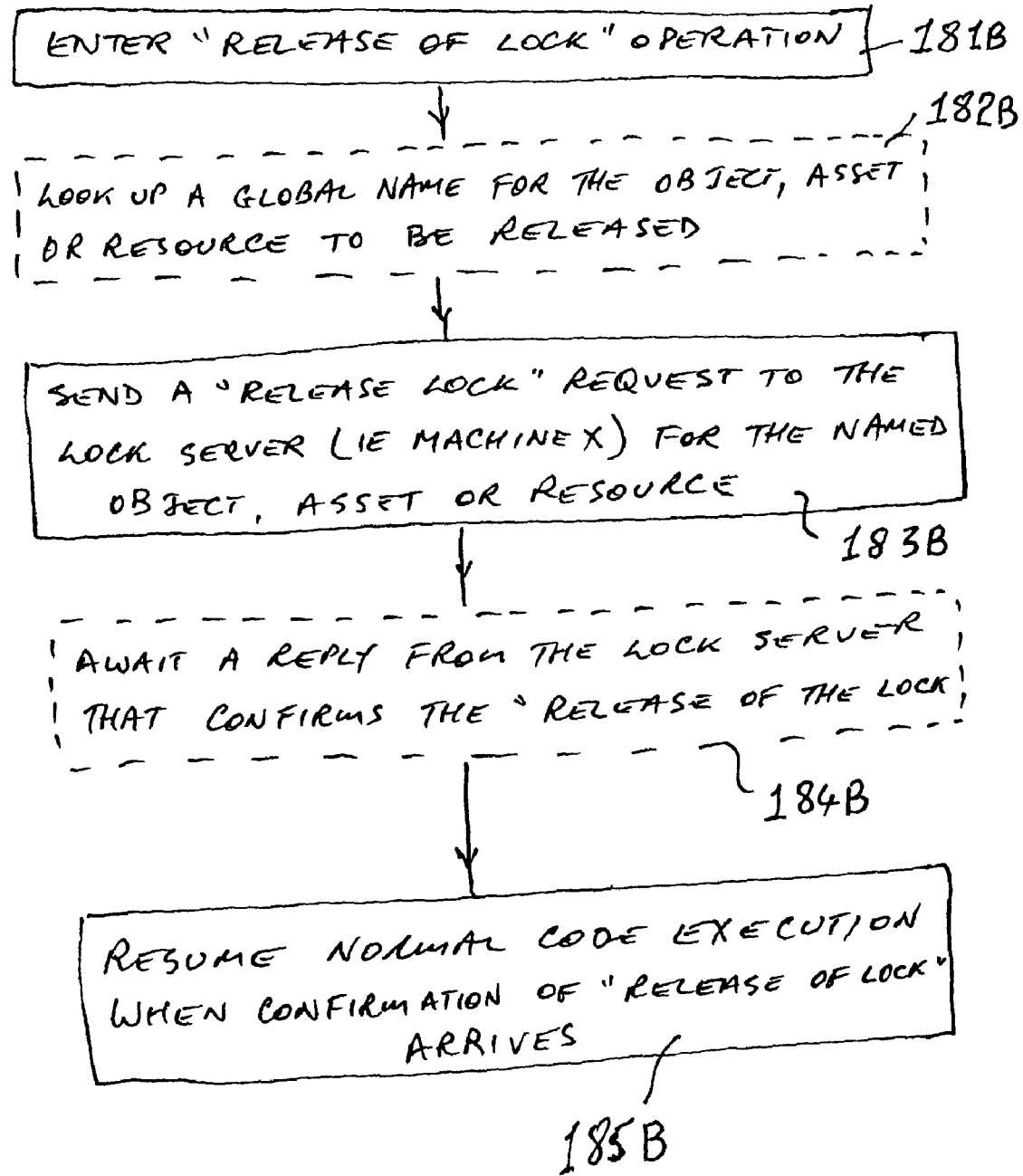
FIG. 28 is a flow chart illustrating the requesting of the release of a lock.

FIG. 28 shows the procedures followed by the application program executing machine which wishes to relinquish a lock. The initial step is indicated at step 181B. The operation of this proposing machine is temporarily interrupted by steps 183B, 184B until the reply is received from machine X, corresponding to step 184B, and execution then resumes as indicated in step 185B. Optionally, and as indicated in step 182B, the machine requesting release of a lock is made to lookup the "global name" for this lock preceding a request being made to machine X. This way, multiple locks on multiple machines can be acquired and released without interfering with one another.

Figure 29:
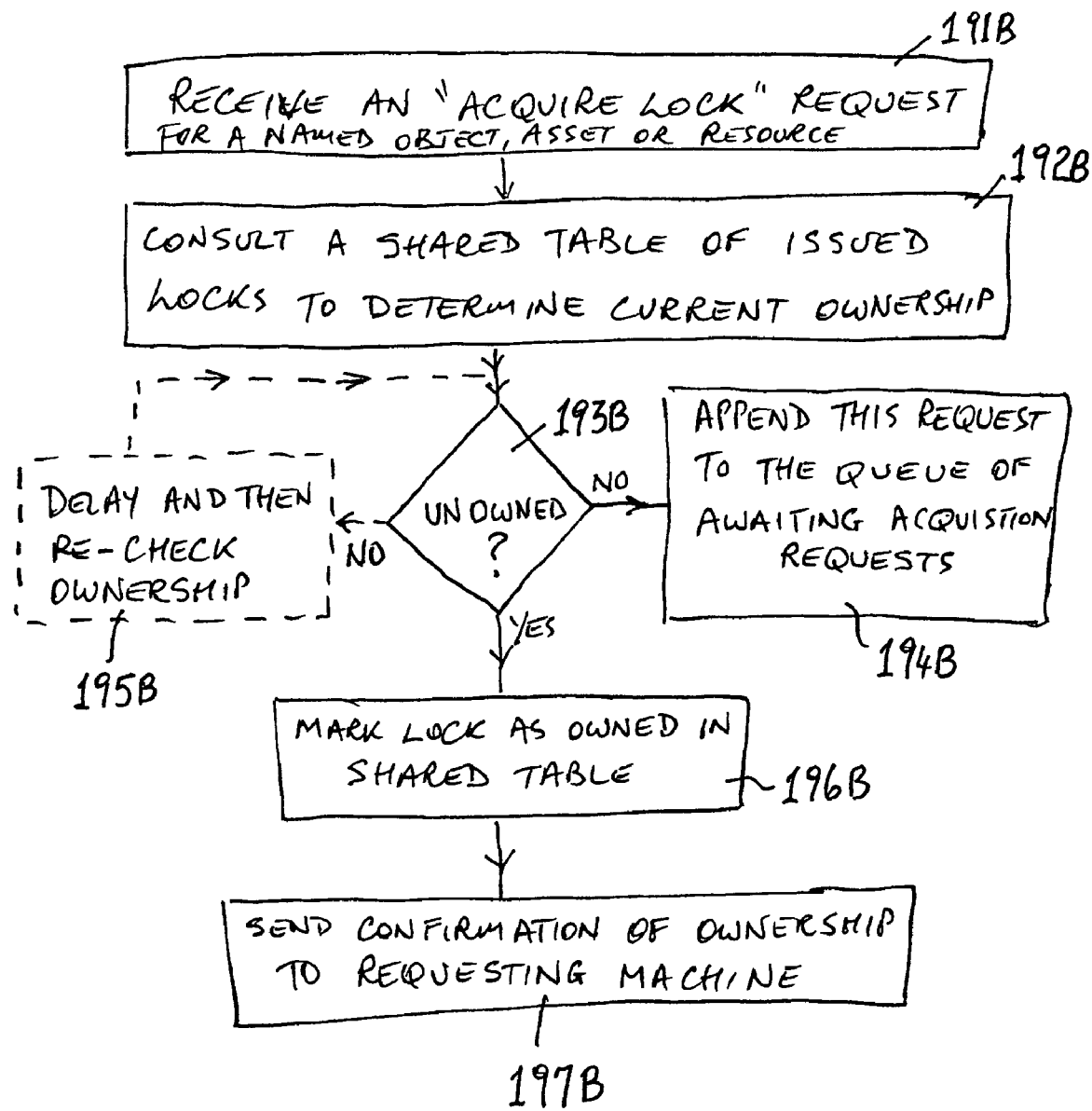
FIG. 29 is a flow chart of the response of the server machine X to the request of FIG. 27.

FIG. 29 shows the activity carried out by machine X in response to an "acquire lock" enquiry (of FIG. 27). After receiving an "acquire lock" request at step 191B, the lock status is determined at steps 192B and 193B and, if no—the named resource is not free, the identity of the enquiring machine is added at step 194B to (or forms) the queue of awaiting acquisition requests. Alternatively, if the answer is yes—the named resource is free—the corresponding reply is sent at step 197B. The waiting enquiring machine is then able to execute the synchronization routine accordingly by carrying out step 175B of FIG. 27. In addition to the yes response, the shared table is updated at step 196B so that the status of the globally named asset is changed to "locked".

Figure 30:
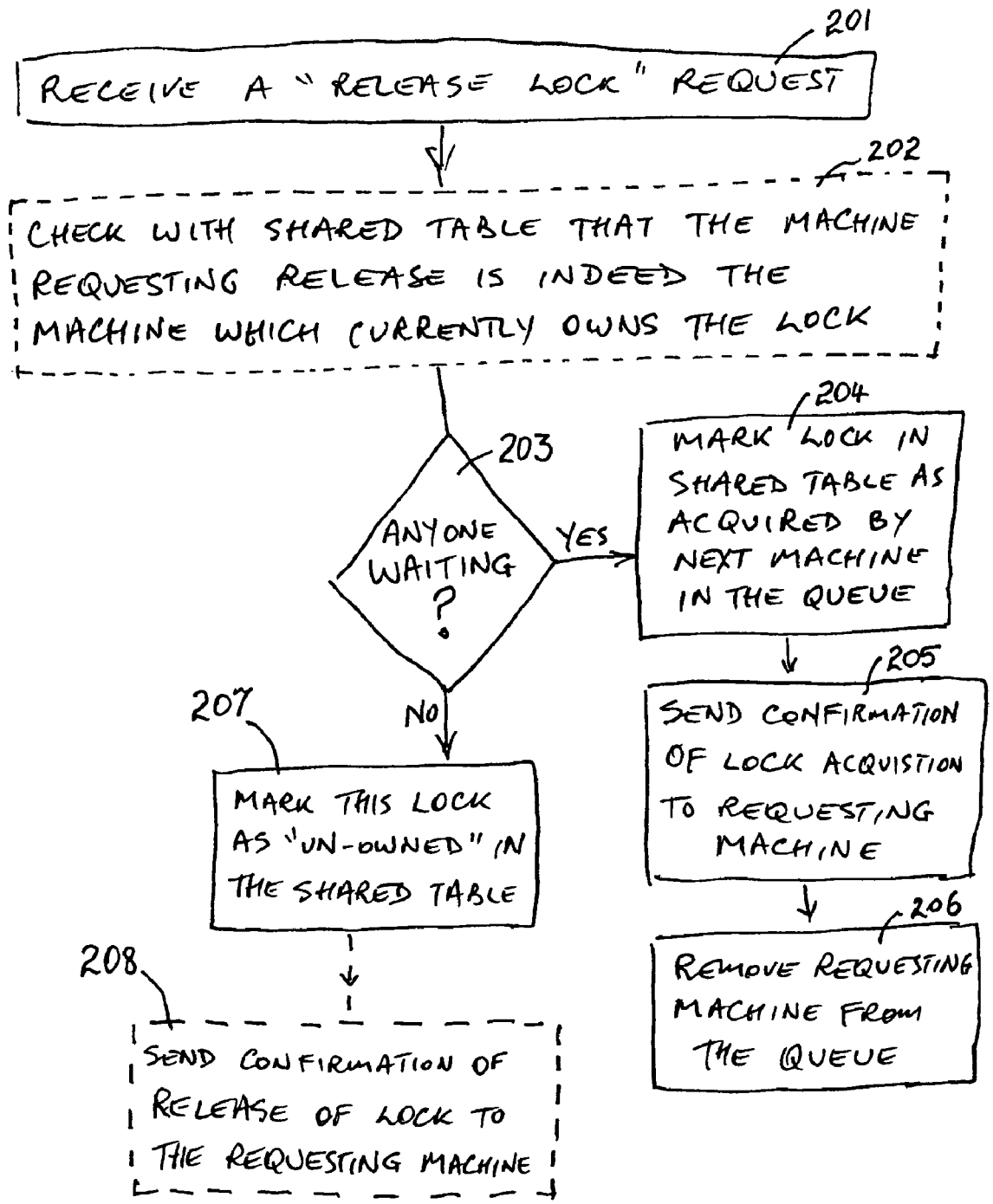
FIG. 30 is a flow chart illustrating the response of the server machine X to the request of FIG. 28.

FIG. 30 shows the activity carried out by machine X in response to a "release lock" request of FIG. 28. After receiving a "release lock" request at step 201, machine X optionally, and preferably, confirms that the machine requesting to release the lock is indeed the current owner of the lock", as indicated in step 202. Next, the queue status is determined at step 203 and, if no-one is waiting to acquire this lock, machine X marks this lock as "unowned" in the shared table, as shown in step 207, and optionally sends a confirmation of release back to the requesting machine, as indicated by step 208. This enables the requesting machine to execute step 185B of FIG. 28.

Alternatively, if yes—that is, other machines are waiting to acquire this lock-machine X marks this lock as now acquired by the next machine in the queue, as shown in step 204, and then sends a confirmation of lock acquisition to the queued machine at step 205, and consequently removes the new lock owner from the queue of waiting machines, as indicated in step 206.

Figure 31:
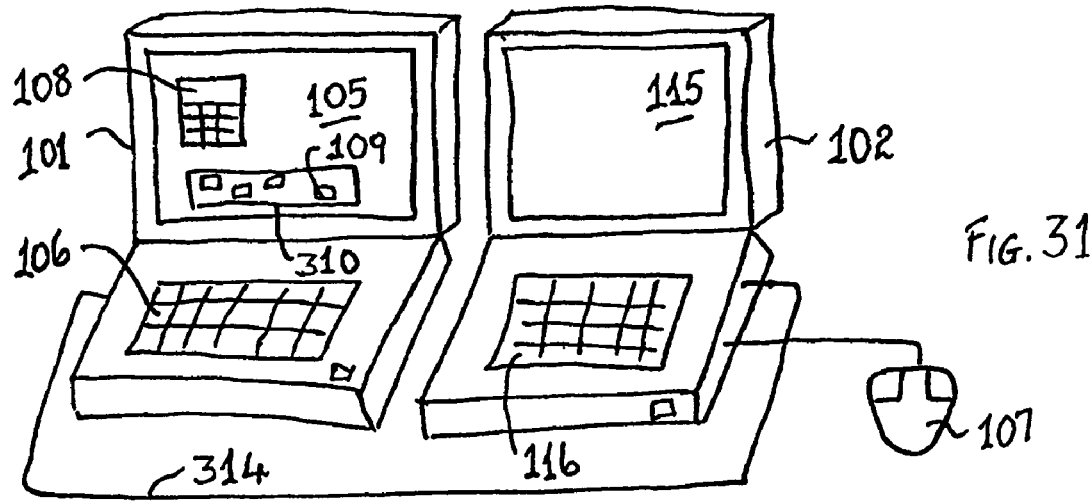
FIG. 31 is a schematic representation of two laptop computers interconnected to simultaneously run a plurality of applications, with both applications running on a single computer.
Figure 32:
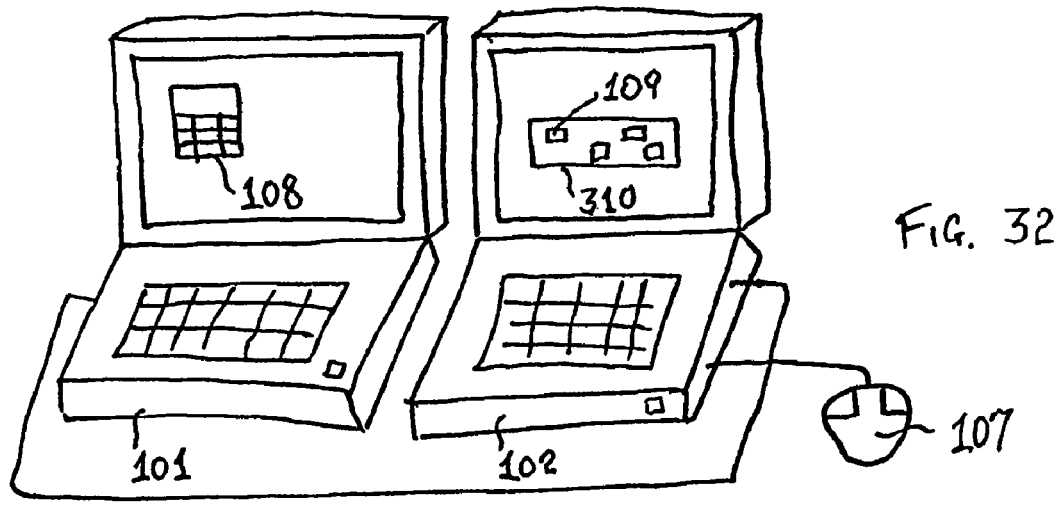
FIG. 32 is a view similar to FIG. 31 but showing the FIG. 31 apparatus with one application operating on each computer.
Figure 33:
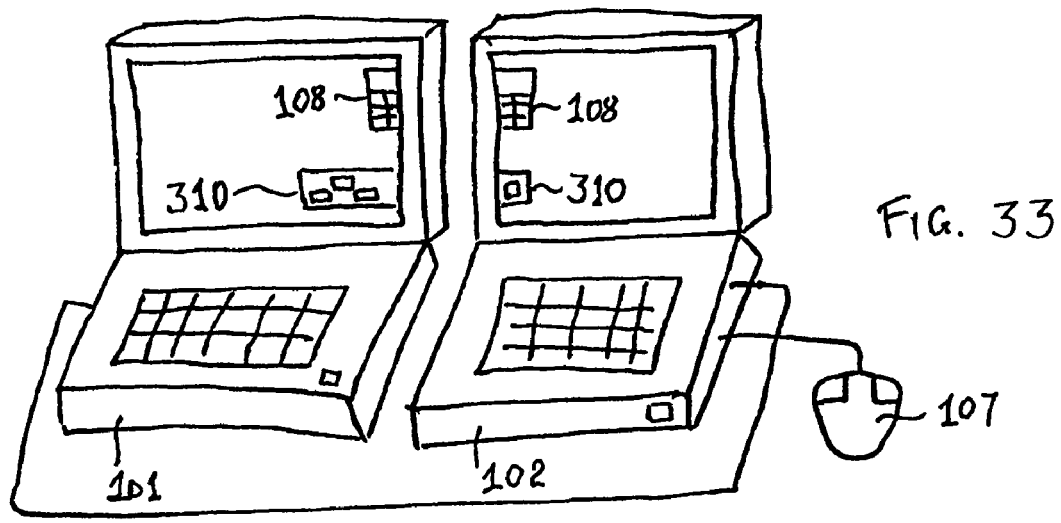
FIG. 33 is a view similar to FIGS. 31 and 32 but showing the FIG. 31 apparatus with both applications operating simultaneously on both computers.

Turning now to FIGS. 31-33, two laptop computers 101 and 102 are illustrated. The computers 101 and 102 are not necessarily identical and indeed, one can be an IBM or IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 314.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 310. Again, after loading, the box 310 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

The mouse 107 can be used to "grab" the box 310 and move same to the right across the screen 105 and onto the screen 115 so as to arrive at the situation illustrated in FIG. 32. In this arrangement, the calculator application is being conducted on machine 101 whilst the graphics application resulting in display of box 310 is being conducted on machine 102.

However, as illustrated in FIG. 33, it is possible by means of the mouse 107 to drag the calculator 108 to the right as seen in FIG. 32 so as to have a part of the calculator 108 displayed by each of the screens 105, 115. Similarly, the box 310 can be dragged by means of the mouse 107 to the left as seen in FIG. 32 so that the box 310 is partially displayed by each of the screens 105, 115 as indicated FIG. 33. In this configuration, part of the calculator operation is being performed on machine 101 and part on machine 102 whilst part of the graphics application is being carried out the machine 101 and the remainder is carried out on machine 102.

The foregoing describes only some embodiments of the present invention and modifications, obvious to those skilled in the art, can be made thereto without departing from the scope of the present invention. For example, reference to JAVA includes both the JAVA language and also JAVA platform and architecture.

Those skilled in the programming arts will be aware that when additional code or instructions is/are inserted into an existing code or instruction set to modify same, the existing code or instruction set may well require further modification (eg by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned embodiment in which the code of the JAVA initialisation routine is modified, is based upon the assumption that either the run time system (say, JAVA HOTSPOT VIRTUAL MACHINE written in C and JAVA) or the operating system (LINUX written in C and Assembler, for example) of each machine M1 . . . Mn will call the JAVA initialisation routine. It is possible to leave the JAVA initialisation routine unamended and instead amend the LINUX or HOTSPOT routine which calls the JAVA initialisation routine, so that if the object or class is already loaded, then the JAVA initialisation routine is not called. In order to embrace such an arrangement the term "initialisation routine" is to be understood to include within its scope both the JAVA initialisation routine and the "combination" of the JAVA initialisation routine and the LINUX or HOTSPOT code fragments which call or initiates the JAVA initialisation routine.

The abovementioned embodiment in which the code of the JAVA finalisation or clean up routine is modified, is based upon the assumption that either the run time system (say, JAVA HOTSPOT VIRTUAL MACHINE written in C and JAVA) or the operating system (LINUX written in C and Assembler, for example) of each machine M1 . . . Mn will call the JAVA finalisation routine. It is possible to leave the JAVA finalisation routine unamended and instead amend the LINUX or HOTSPOT routine which calls the JAVA finalisation routine, so that if the object or class is not to be deleted, then the JAVA finalisation routine is not called. In order to embrace such an arrangement the term "finalisation routine" is to be understood to include within its scope both the JAVA finalisation routine and the "combination" of the JAVA finalisation routine and the LINUX or HOTSPOT code fragments which call or initiate the JAVA finalisation routine.

The abovementioned embodiment in which the code of the JAVA synchronization routine is modified, is based upon the assumption that either the run time system (say, JAVA HOTSPOT VIRTUAL MACHINE written in C and JAVA) or the operating system (LINUX written in C and Assembler, for example) of each machine M1 . . . Mn will normally acquire the lock on the local machine (say M2) but not on any other machines (M1, M3 . . . Mn). It is possible to leave the JAVA synchronization routine unamended and instead amend the LINUX or HOTSPOT routine which acquires the lock locally, so that it correspondingly acquires the lock on all other machines as well. In order to embrace such an arrangement the term "synchronization routine" is to be understood to include within its scope both the JAVA synchronization routine and the "combination" of the JAVA synchronization routine and the LINUX or HOTSPOT code fragments which perform lock acquisition and release.

The terms object and class used herein are derived from the JAVA environment and are intended to embrace similar terms derived from different environments such as dynamically linked libraries (DLL), or object code packages, or function unit or memory locations.

The term "comprising" (and its grammatical variations) as used herein is used in the inclusive sense of "having" or "including" and not in the exclusive sense of "consisting only of".

ANNEXURE A

The following are program listings in the JAVA language:

A1. This first excerpt is part of the modification code. It searches through the code array, and when it finds a putstatic instruction (opcode 178), it implements the modifications.

```
// START
byte[ ] code = Code_attribute.code;     // Bytecode of a given method in a
                                        // given classfile.
int code_length = Code_attribute.code_length;
int DRT = 99;       // Location of the CONSTANT_Methodref_info for the
                    // DRT.alert( ) method.
for (int i=0; i<code_length; i++){
    if ((code[i] & 0xff) == 179){    // Putstatic instruction.
        System.arraycopy(code, i+3, code, i+6, code_length-(i+3));
        code[i+3] = (byte) 184;      // Invokestatic instruction for the
                                     // DRT.alert( ) method.
        code[i+4] = (byte) ((DRT >>> 8) & 0xff);
        code[i+5] = (byte) (DRT & 0xff);
    }
}
// END
```

A2. This second excerpt is part of the DRT.alert( ) method. This is the body of the DRT.alert( ) method when it is called.

```
// START
public static void alert( ){
    synchronized (ALERT_LOCK){
        ALERT_LOCK.notify( ); // Alerts a waiting DRT thread in
            the background.
    }
}
// END
```

A3. This third excerpt is part of the DRT Sending. This code fragment shows the DRT in a separate thread, after being notified, sending the value across the network.

```
// START
MulticastSocket ms = DRT.getMulticastSocket( );   // The multicast socket
                                                  // used by the DRT for
                                                  // communication.
byte nameTag = 33;   // This is the "name tag" on the network for this
                     // field.
Field field = modifiedClass.getDeclaredField("myField1");   // Stores
                                                            // the field
                                                            // from the
                                                            // modified
                                                            // class.
// In this example, the field is a byte field.
while (DRT.isRunning( )){
    synchronized (ALERT_LOCK){
        ALERT_LOCK.wait( );    // The DRT thread is waiting for the alert
                               // method to be called.
        byte[ ] b = new byte[ ]{nameTag, field.getByte(null)};   // Stores
                                                                 // the
                                                                 // nameTag
                                                                 // and the
                                                                 // value
                                                                 // of the
                                                                 // field from
                                                                 // the
                                                                 // modified
                                                                 // class in a
                                                                 buffer.
        DatagramPacket dp = new DatagramPacket(b, 0, b.length);
        ms.send(dp);    // Send the buffer out across the network.
    }
}
// END
```

A4. The fourth excerpt is part of the DRT receiving. This is a fragment of code to receive a DRT sent alert over the network.

```
// START
MulticastSocket ms = DRT.getMulticastSocket( );   // The multicast socket
                                                  // used by the DRT for
                                                  // communication.
DatagramPacket dp = new DatagramPacket(new byte[2], 0, 2);
byte nameTag = 33;     // This is the "name tag" on the network for this
                       // field.
Field field = modifiedClass.getDeclaredField("myField1");   // Stores the
                                                            // field from
                                                            // the
                                                            // modified
                                                            class.
// In this example, the field is a byte field.
while (DRT.isRunning){
    ms.receive(dp); // Receive the previously sent buffer from the network.
    byte[ ] b = dp.getData( );
```

```
        if (b[0] == nameTag){    // Check the nametags match.
            field.setByte(null, b[1]);    // Write the value from the network packet
                                          // into the field location in memory.
        }
    }
}
// END
```

A5. The fifth excerpt is an example application before modification has occurred.

```
Method void setValues(int, int)
  0 iload_1
  1 putstatic #3 <Field int staticValue>
  4 aload_0
  5 iload_2
  6 putfield #2 <Field int instanceValue>
  9 return
```

A6. The sixth excerpt is the same example application in 5 after modification has been performed. The modifications are highlighted in bold.

```
Method void setValues(int, int)
  0 iload_1
  1 putstatic #3 <Field int staticValue>
  4 ldc #4 <String "example">
  6 iconst_0
  7 invokestatic #5 <Method void alert(java.lang.Object, int)>
 10 aload_0
 11 iload_2
 12 putfield #2 <Field int instanceValue>
 15 aload_0
 16 iconst_1
 17 invokestatic #5 <Method void alert(java.lang.Object, int)>
 20 return
```

A7. The seventh excerpt is the source-code of the example application used in excerpt 5 and 6.

```
import java.lang.*;
public class example{
    /** Shared static field. */
    public static int staticValue = 0;
    /** Shared instance field. */
    public int instanceValue = 0;
    /** Example method that writes to memory (instance field). */
    public void setValues(int a, int b){
        staticValue = a;
        instanceValue = b;
    }
}
```

A8. The eighth excerpt is the source-code of FieldAlert, which alerts the "distributed run-time" to propagate a changed value.

```
import java.lang.*;
import java.util.*;
import java.net.*;
import java.io.*;
public class FieldAlert{
    /** Table of alerts. */
    public final static Hashtable alerts = new Hashtable( );
    /** Object handle. */
    public Object reference = null;
    /** Table of field alerts for this object. */
    public boolean[ ] fieldAlerts = null;
    /** Constructor. */
    public FieldAlert(Object o, int initialFieldCount){
        reference = o;
        fieldAlerts = new boolean[initialFieldCount];
    }
    /** Called when an application modifies a value. (Both objects and
        classes) */
    public static void alert(Object o, int fieldID){
        // Lock the alerts table.
        synchronized (alerts){
            FieldAlert alert = (FieldAlert) alerts.get(o);
            if (alert == null){    // This object hasn't been alerted already,
                                   // so add to alerts table.
                alert = new FieldAlert(o, fieldID + 1);
                alerts.put (o, alert);
            }
            if (fieldID >= alert.fieldAlerts.length){
                // Ok, enlarge fieldAlerts array.
                boolean[ ] b = new boolean[fieldID+1];
                System.arraycopy(alert.fieldAlerts, 0, b, 0,
                    alert.fieldAlerts.length);
                alert.fieldAlerts = b;
            }
            // Record the alert.
            alert.fieldAlerts[fieldID] = true;
            // Mark as pending.
            FieldSend.pending = true;    // Signal that there is one or more
                                         // propagations waiting.
            // Finally, notify the waiting FieldSend thread(s)
            if (FieldSend.waiting){
                FieldSend.waiting = false;
                alerts.notify( );
            }
        }
    }
}
```

A9. The ninth excerpt is the source-code of FieldSend, which propagates changes values alerted to it via FieldAlert.

```
import java.lang.*;
import java.lang.reflect.*;
import java.util.*;
import java.net.*;
import java.io.*;
public class FieldSend implements Runnable{
    /** Protocol specific values. */
    public final static int CLOSE = -1;
    public final static int NACK = 0;
    public final static int ACK = 1;
    public final static int PROPAGATE_OBJECT = 10;
    public final static int PROPAGATE_CLASS = 20;
    /** FieldAlert network values. */
```

-continued

```
public final static String group =
      System.getProperty("FieldAlert_network_group");
public final static int port =
      Integer.parseInt(System.getProperty("FieldAlert_network_port"));
/** Table of global ID's for local objects. (hashcode-to-globalID
      mappings) */
public final static Hashtable objectToGlobalID = new Hashtable( );
/** Table of global ID's for local classnames. (classname-to-globalID
      mappings) */
public final static Hashtable classNameToGlobalID = new Hashtable( );
/** Pending. True if a propagation is pending. */
public static boolean pending = false;
/** Waiting. True if the FieldSend thread(s) are waiting. */
public static boolean waiting = false;
/** Background send thread. Propagates values as this thread is alerted
      to their alteration. */
public void run( ){
      System.out.println("FieldAlert_network_group=" + group);
      System.out.println("FieldAlert_network_port=" + port);
      try{
            // Create a DatagramSocket to send propagated field values.
            DatagramSocket datagramSocket =
                  new DatagramSocket(port, InetAddress.getByName(group));
            // Next, create the buffer and packet for all transmissions.
            byte[ ] buffer = new byte[512];         // Working limit of 512 bytes
                                                    // per packet.
            DatagramPacket datagramPacket =
                  new DatagramPacket(buffer, 0, buffer.length);
            while (!Thread.interrupted( )){
                  Object[ ] entries = null;
                  // Lock the alerts table.
                  synchronized (FieldAlert.alerts){
                        // Await for an alert to propagate something.
                        while (!pending){
                              waiting = true;
                              FieldAlert.alerts.wait( );
                              waiting = false;
                        }
                        pending = false;
                        entries = FieldAlert.alerts.entrySet( ).toArray( );
                        // Clear alerts once we have copied them.
                        FieldAlert.alerts.clear( );
                  }
                  // Process each object alert in turn.
                  for (int i=0; i<entries.length; i++){
                        FieldAlert alert = (FieldAlert) entries[i];
                        int index = 0;
                        datagramPacket.setLength(buffer.length);
                        Object reference = null;
                        if (alert.reference instanceof String){
                              // PROPAGATE_CLASS field operation.
                              buffer[index++] = (byte) ((PROPAGATE_CLASS >> 24) & 0xff);
                              buffer[index++] = (byte) ((PROPAGATE_CLASS >> 16) & 0xff);
                              buffer[index++] = (byte) ((PROPAGATE_CLASS >> 8) & 0xff);
                              buffer[index++] = (byte) ((PROPAGATE_CLASS >> 0) & 0xff);
                              String name = (String) alert.reference;
                              int length = name.length( );
                              buffer[index++] = (byte) ((length >> 24) & 0xff);
                              buffer[index++] = (byte) ((length >> 16) & 0xff);
                              buffer[index++] = (byte) ((length >> 8) & 0xff);
                              buffer[index++] = (byte) ((length >> 0) & 0xff);
                              byte[ ] bytes = name.getBytes( );
                              System.arraycopy(bytes, 0, buffer, index, length);
                              index += length;
                        }else{              // PROPAGATE_OBJECT field operation.
                              buffer[index++] =
                                    (byte) ((PROPAGATE_OBJECT >> 24) & 0xff);
                              buffer[index++] =
                                    (byte) ((PROPAGATE_OBJECT >> 16) & 0xff);
                              buffer[index++] = (byte) ((PROPAGATE_OBJECT >> 8) & 0xff);
                              buffer[index++] = (byte) ((PROPAGATE_OBJECT >> 0) & 0xff);
                              int globalID = ((Integer)
                                    objectToGlobalID.get(alert.reference)).intValue( );
                              buffer[index++] = (byte) ((globalID >> 24) & 0xff);
                              buffer[index++] = (byte) ((globalID >> 16) & 0xff);
                              buffer[index++] = (byte) ((globalID >> 8) & 0xff);
                              buffer[index++] = (byte) ((globalID >> 0) & 0xff);
                              reference = alert.reference;
                        }
```

```
-continued

// Use reflection to get a table of fields that correspond to
// the field indexes used internally.
Field[ ] fields = null;
if (reference == null){
    fields = FieldLoader.loadClass((String)
        alert.reference).getDeclaredFields( );
}else{
    fields = alert.reference.getClass( ).getDeclaredFields( );
}
// Now encode in batch mode the fieldID/value pairs.
for (int j=0; j<alert.fieldAlerts.length; j++){
    if (alert.fieldAlerts[j] == false)
        continue;
    buffer[index++] = (byte) ((j >> 24) & 0xff);
    buffer[index++] = (byte) ((j >> 16) & 0xff);
    buffer[index++] = (byte) ((j >> 8) & 0xff);
    buffer[index++] = (byte) ((j >> 0) & 0xff);
    // Encode value.
    Class type = fields[j].getType( );
    if (type == Boolean.TYPE){
        buffer[index++] = (byte)
            (fields[j].getBoolean(reference)? 1 : 0);
    }else if (type == Byte.TYPE){
        buffer[index++] = fields[j].getByte(reference);
    }else if (type == Short.TYPE){
        short v = fields[j].getShort(reference);
        buffer[index++] = (byte) ((v >> 8) & 0xff);
        buffer[index++] = (byte) ((v >> 0) & 0xff);
    }else if (type == Character.TYPE){
        char v = fields[j].getChar(reference);
        buffer[index++] = (byte) ((v >> 8) & 0xff);
        buffer[index++] = (byte) ((v >> 0) & 0xff);
    }else if (type == Integer.TYPE){
        int v = fields[j].getInt(reference);
        buffer[index++] = (byte) ((v >> 24) & 0xff);
        buffer[index++] = (byte) ((v >> 16) & 0xff);
        buffer[index++] = (byte) ((v >> 8) & 0xff);
        buffer[index++] = (byte) ((v >> 0) & 0xff);
    }else if (type == Float.TYPE){
        int v = Float.floatToIntBits(
            fields[j].getFloat(reference));
        buffer[index++] = (byte) ((v >> 24) & 0xff);
        buffer[index++] = (byte) ((v >> 16) & 0xff);
        buffer[index++] = (byte) ((v >> 8) & 0xff);
        buffer[index++] = (byte) ((v >> 0) & 0xff);
    }else if (type == Long.TYPE){
        long v = fields[j].getLong(reference);
        buffer[index++] = (byte) ((v >> 56) & 0xff);
        buffer[index++] = (byte) ((v >> 48) & 0xff);
        buffer[index++] = (byte) ((v >> 40) & 0xff);
        buffer[index++] = (byte) ((v >> 32) & 0xff);
        buffer[index++] = (byte) ((v >> 24) & 0xff);
        buffer[index++] = (byte) ((v >> 16) & 0xff);
        buffer[index++] = (byte) ((v >> 8) & 0xff);
        buffer[index++] = (byte) ((v >> 0) & 0xff);
    }else if (type == Double.TYPE){
        long v = Double.doubleToLongBits(
            fields[j].getDouble(reference));
        buffer[index++] = (byte) ((v >> 56) & 0xff);
        buffer[index++] = (byte) ((v >> 48) & 0xff);
        buffer[index++] = (byte) ((v >> 40) & 0xff);
        buffer[index++] = (byte) ((v >> 32) & 0xff);
        buffer[index++] = (byte) ((v >> 24) & 0xff);
        buffer[index++] = (byte) ((v >> 16) & 0xff);
        buffer[index++] = (byte) ((v >> 8) & 0xff);
        buffer[index++] = (byte) ((v >> 0) & 0xff);
    }else{
        throw new AssertionError("Unsupported type.");
    }
}
// Now set the length of the datagrampacket.
datagramPacket.setLength(index);
```

```
                        // Now send the packet.
                        datagramSocket.send(datagramPacket);
                    }
                }
            }catch (Exception e){
                throw new AssertionError("Exception: " + e.toString( ));
            }
        }
    }
}
```

A10. The tenth excerpt is the source-code of FieldReceive, which receives propagated changed values sent via Field-Send.

```
import java.lang.*;
import java.lang.reflect.*;
import java.util.*;
import java.net.*;
import java.io.*;
public class FieldReceive implements Runnable{
    /** Protocol specific values. */
    public final static int CLOSE = -1;
    public final static int NACK = 0;
    public final static int ACK = 1;
    public final static int PROPAGATE_OBJECT = 10;
    public final static int PROPAGATE_CLASS = 20;
    /** FieldAlert network values. */
    public final static String group =
        System.getProperty("FieldAlert_network_group");
    public final static int port =
        Integer.parseInt(System.getProperty("FieldAlert_network_port"));
    /** Table of global ID's for local objects. (globalID-to-hashcode
            mappings) */
    public final static Hashtable globalIDToObject = new Hashtable( );
    /** Table of global ID's for local classnames. (globalID-to-classname
            mappings) */
    public final static Hashtable globalIDToClassName = new Hashtable( );
    /** Called when an application is to acquire a lock. */
    public void run( ){
        System.out.println("FieldAlert_network_group=" + group);
        System.out.println("FieldAlert_network_port=" + port);
        try{
            // Create a DatagramSocket to send propagated field values from
            MulticastSocket multicastSocket = new MulticastSocket(port);
            multicastSocket.joinGroup(InetAddress.getByName(group));
            // Next, create the buffer and packet for all transmissions.
            byte[ ] buffer = new byte[512];       // Working limit of 512
                                                  // bytes per packet.
            DatagramPacket datagramPacket =
                new DatagramPacket(buffer, 0, buffer.length);
            while (!Thread.interrupted( )){
                // Make sure to reset length.
                datagramPacket.setLength(buffer.length);
                // Receive the next available packet.
                multicastSocket.receive(datagramPacket);
                int index = 0, length = datagramPacket.getLength( );
                // Decode the command.
                int command = (int) (((buffer[index++] & 0xff) << 24)
                    | ((buffer[index++] & 0xff) << 16)
                    | ((buffer[index++] & 0xff) << 8)
                    | (buffer[index++] & 0xff));
                if (command == PROPAGATE_OBJECT){   // Propagate operation for
                                                    // object fields.
                    // Decode global id.
                    int globalID = (int) (((buffer[index++] & 0xff) << 24)
                        | ((buffer[index++] & 0xff) << 16)
                        | ((buffer[index++] & 0xff) << 8)
                        | (buffer[index++] & 0xff));
                    // Now, need to resolve the object in question.
                    Object reference = globalIDToObject.get(
                        new Integer(globalID));
```

```
                    // Next, get the array of fields for this object.
                    Field[ ] fields = reference.getClass( ).getDeclaredFields( );
                    while (index < length){
                        // Decode the field id.
                        int fieldID = (int) (((buffer[index++] & 0xff) << 24)
                            | ((buffer[index++] & 0xff) << 16)
                            | ((buffer[index++] & 0xff) << 8)
                            | (buffer[index++] & 0xff));
                        // Determine value length based on corresponding field
                        // type.
                        Field field = fields[fieldID];
                        Class type = field.getType( );
                        if (type == Boolean.TYPE){
                            boolean v = (buffer[index++] == 1 ? true : false);
                            field.setBoolean(reference, v);
                        }else if (type == Byte.TYPE){
                            byte v = buffer[index++];
                            field.setByte(reference, v);
                        }else if (type == Short.TYPE){
                            short v = (short) (((buffer[index++] & 0xff) << 8)
                                | (buffer[index++] & 0xff));
                            field.setShort(reference, v);
                        }else if (type == Character.TYPE){
                            char v = (char) (((buffer[index++] & 0xff) << 8)
                                | (buffer[index++] & 0xff));
                            field.setChar(reference, v);
                        }else if (type == Integer.TYPE){
                            int v = (int) (((buffer[index++] & 0xff) << 24)
                                | ((buffer[index++] & 0xff) << 16)
                                | ((buffer[index++] & 0xff) << 8)
                                | (buffer[index++] & 0xff));
                            field.setInt(reference, v);
                        }else if (type == Float.TYPE){
                            int v = (int) (((buffer[index++] & 0xff) << 24)
                                | ((buffer[index++] & 0xff) << 16)
                                | ((buffer[index++] & 0xff) << 8)
                                | (buffer[index++] & 0xff));
                            field.setFloat(reference, Float.intBitsToFloat(v));
                        }else if (type == Long.TYPE){
                            long v = (long) (((buffer[index++] & 0xff) << 56)
                                | ((buffer[index++] & 0xff) << 48)
                                | ((buffer[index++] & 0xff) << 40)
                                | ((buffer[index++] & 0xff) << 32)
                                | ((buffer[index++] & 0xff) << 24)
                                | ((buffer[index++] & 0xff) << 16)
                                | ((buffer[index++] & 0xff) << 8)
                                | (buffer[index++] & 0xff));
                            field.setLong(reference, v);
                        }else if (type == Double.TYPE){
                            long v = (long) (((buffer[index++] & 0xff) << 56)
                                | ((buffer[index++] & 0xff) << 48)
                                | ((buffer[index++] & 0xff) << 40)
                                | ((buffer[index++] & 0xff) << 32)
                                | ((buffer[index++] & 0xff) << 24)
                                | ((buffer[index++] & 0xff) << 16)
                                | ((buffer[index++] & 0xff) << 8)
                                | (buffer[index++] & 0xff));
                            field.setDouble(reference, Double.longBitsToDouble(v));
                        }else{
                            throw new AssertionError("Unsupported type.");
                        }
                    }
        }else if (command == PROPAGATE_CLASS){      // Propagate an update
                                                     // to class fields.
            // Decode the classname.
            int nameLength = (int) (((buffer[index++] & 0xff) << 24)
                | ((buffer[index++] & 0xff) << 16)
                | ((buffer[index++] & 0xff) << 8)
                | (buffer[index++] & 0xff));
            String name = new String(buffer, index, nameLength);
            index += nameLength;
            // Next, get the array of fields for this class.
            Field[ ] fields =
                FieldLoader.loadClass(name).getDeclaredFields( );
            // Decode all batched fields included in this propagation
            // packet.
```

```
                while (index < length){
                    // Decode the field id.
                    int fieldID = (int) (((buffer[index++] & 0xff) << 24)
                            | ((buffer[index++] & 0xff) << 16)
                            | ((buffer[index++] & 0xff) << 8)
                            | (buffer[index++] & 0xff));
                    // Determine field type to determine value length.
                    Field field = fields[fieldID];
                    Class type = field.getType( );
                    if (type == Boolean.TYPE){
                        boolean v = (buffer[index++] == 1 ? true : false);
                        field.setBoolean(null, v);
                    }else if (type == Byte.TYPE){
                        byte v = buffer[index++];
                        field.setByte(null, v);
                    }else if (type == Short.TYPE){
                        short v = (short) (((buffer[index++] & 0xff) << 8)
                                | (buffer[index++] & 0xff));
                        field.setShort(null, v);
                    }else if (type == Character.TYPE){
                        char v = (char) (((buffer[index++] & 0xff) << 8)
                                | (buffer[index++] & 0xff));
                        field.setChar(null, v);
                    }else if (type == Integer.TYPE){
                        int v = (int) (((buffer[index++] & 0xff) << 24)
                                | ((buffer[index++] & 0xff) << 16)
                                | ((buffer[index++] & 0xff) << 8)
                                | (buffer[index++] & 0xff));
                        field.setInt(null, v);
                    }else if (type == Float.TYPE){
                        int v = (int) (((buffer[index++] & 0xff) << 24)
                                | ((buffer[index++] & 0xff) << 16)
                                | ((buffer[index++] & 0xff) << 8)
                                | (buffer[index++] & 0xff));
                        field.setFloat(null, Float.intBitsToFloat(v));
                    }else if (type == Long.TYPE){
                        long v = (long) (((buffer[index++] & 0xff) << 56)
                                | ((buffer[index++] & 0xff) << 48)
                                | ((buffer[index++] & 0xff) << 40)
                                | ((buffer[index++] & 0xff) << 32)
                                | ((buffer[index++] & 0xff) << 24)
                                | ((buffer[index++] & 0xff) << 16)
                                | ((buffer[index++] & 0xff) << 8)
                                | (buffer[index++] & 0xff));
                        field.setLong(null, v);
                    }else if (type == Double.TYPE){
                        long v = (long) (((buffer[index++] & 0xff) << 56)
                                | ((buffer[index++] & 0xff) << 48)
                                | ((buffer[index++] & 0xff) << 40)
                                | ((buffer[index++] & 0xff) << 32)
                                | ((buffer[index++] & 0xff) << 24)
                                | ((buffer[index++] & 0xff) << 16)
                                | ((buffer[index++] & 0xff) << 8)
                                | (buffer[index++] & 0xff));
                        field.setDouble(null, Double.longBitsToDouble(v));
                    }else{              // Unsupported field type.
                        throw new AssertionError("Unsupported type.");
                    }
                }
            }
        }
    }catch (Exception e){
        throw new AssertionError("Exception: " + e.toString( ));
    }
  }
}
```

A11. FieldLoader.java

This excerpt is the source-code of FieldLoader, which modifies an application as it is being loaded.

```
import java.lang.*;
import java.io.*;
import java.net.*;
public class FieldLoader extends URLClassLoader{
    public FieldLoader(URL[ ] urls){
        super(urls);
    }
    protected Class findClass(String name)
    throws ClassNotFoundException{
    ClassFile cf = null;
    try{
        BufferedInputStream in =
            new BufferedInputStream(findResource(
            name.replace('-', '/').concat(".class")).openStream( ));
        cf = new ClassFile(in);
    }catch (Exception e){throw new ClassNotFoundException(e.toString( ));}
    // Class-wide pointers to the ldc and alert index.
    int ldcindex = -1;
    int alertindex = -1;
    for (int i=0; i<cf.methods_count; i++){
        for (int j=0; j<cf.methods[i].attributes_count; j++){
            if (!(cf.methods[i].attributes[j] instanceof Code_attribute))
                continue;
            Code_attribute ca = (Code_attribute) cf.methods[i].attributes[j];
            boolean changed = false;
            for (int z=0; z<ca.code.length; z++){
                if ((ca.code[z][0] & 0xff) == 179){   // Opcode for a PUTSTATIC
                                                      // instruction.
                    changed = true;
                    // The code below only supports fields in this class.
                    // Thus, first off, check that this field is local to this
                    // class.
                    CONSTANT_Fieldref_info fi = (CONSTANT_Fieldref_info)
                        cf.constant_pool[(int) (((ca.code[z][1] & 0xff) << 8) |
                        (ca.code[z][2] & 0xff))];
                    CONSTANT_Class_info ci = (CONSTANT_Class_info)
                        cf.constant_pool[fi.class_index];
                    String className =
                        cf.constant_pool[ci.name_index].toString( );
                    if (!name.equals(className)){
                        throw new AssertionError("This code only supports fields "
                            "local to this class");
                    }
                    // Ok, now search for the fields name and index.
                    int index = 0;
                    CONSTANT_NameAndType_info ni = (CONSTANT_NameAndType_info)
                        cf.constant_pool[fi.name_and_type_index];
                    String fieldName =
                        cf.constant_pool[ni.name_index].toString( );
                    for (int a=0; a<cf.fields_count; a++){
                        String fn = cf.constant_pool[
                            cf.fields[a].name_index].toString( );
                        if (fieldName.equals(fn)){
                            index = a;
                            break;
                        }
                    }
                    // Next, realign the code array, making room for the
                    // insertions.
                    byte[ ][ ] code2 = new byte[ca.code.length+3][ ];
                    System.arraycopy(ca.code, 0, code2, 0, z+1);
                    System.arraycopy(ca.code, z+1, code2, z+4,
                        ca.code.length-(z+1));
                    ca.code = code2;
```

```
                    // Next, insert the LDC_W instruction.
                    if (ldcindex == -1){
                        CONSTANT_String_info csi =
                            new CONSTANT_String_info(ci.name_index);
                        cp_info[ ] cpi = new cp_info[cf.constant_pool.length+1];
                        System.arraycopy(cf.constant_pool, 0, cpi, 0,
                            cf.constant_pool.length);
                        cpi[cpi.length - 1] = csi;
                        ldcindex = cpi.length-1;
                        cf.constant_pool = cpi;
                        cf.constant_pool_count++;
                    }
                    ca.code[z+1] = new byte[3];
                    ca.code[z+1] [0] = (byte) 19;
                    ca.code[z+1] [1] = (byte) ((ldcindex >> 8) & 0xff);
                    ca.code[z+1] [2] = (byte) (ldcindex & 0xff);
                    // Next, insert the SIPUSH instruction.
                    ca.code[z+2] = new byte[3];
                    ca.code[z+2] [0] = (byte) 17;
                    ca.code[z+2] [1] = (byte) ((index >> 8) & 0xff);
                    ca.code[z+2] [2] = (byte) (index & 0xff);
                    // Finally, insert the INVOKESTATIC instruction.
                    if (alertindex == -1){
                        // This is the first time this class is encourtering the
                        // alert instruction, so have to add it to the constant
                        // pool.
                        cp_info[ ] cpi = new cp_info[cf.constant_pool.length+6];
                        System.arraycopy(cf.constant_pool, 0, cpi, 0,
                            cf.constant_pool.length);
                        cf.constant_pool = cpi;
                        cf.constant_pool_count += 6;
                        CONSTANT_Utf8_info u1 =
                            new CONSTANT_Utf8_info("FieldAlert");
                        cf.constant_pool[cf.constant_pool.length-6] = u1;
                        CONSTANT_Class_info c1 = new CONSTANT_Class_info(
                            cf.constant_pool_count-6);
                        cf.constant_pool[cf.constant_pool.length-5] = c1;
                        u1 = new CONSTANT_Utf8_info("alert");
                        cf.constant_pool[cf.constant_pool.length-4] = u1;
                        u1 = new CONSTANT_Utf8_info("(Ljava/lang/Object;I)V");
                        cf.constant_pool[cf.constant_pool.length-3] = u1;
                        CONSTANT_NameAndType_info n1 =
                            new CONSTANT_NameAndType_info(
                                cf.constant_pool.length-4, cf.constant_pool.length-3);
                        cf.constant_pool[cf.constant_pool.length-2] = n1;
                        CONSTANT_Methodref_info m1 = new CONSTANT_Methodref_info(
                            cf.constant_pool.length-5, cf.constant_pool.length-2);
                        cf.constant_pool[cf.constant_pool.length-1] = m1;
                        alertindex = cf.constant_pool.length-1;
                    }
                    ca.code[z+3] = new byte[3];
                    ca.code[z+3] [0] = (byte) 184;
                    ca.code[z+3] [1] = (byte) ((alertindex >> 8) & 0xff);
                    ca.code[z+3] [2] = (byte) (alertindex & 0xff);
                    // And lastly, increase the CODE_LENGTH and ATTRIBUTE_LENGTH
                    // values.
                    ca.code_length += 9;
                    ca.attribute_length += 9;
                }
            }
            // If we changed this method, then increase the stack size by one.
            if (changed){
                ca.max_stack++;        // Just to make sure.
            }
        }
    }
    try{
        ByteArrayOutputStream out = new ByteArrayOutputStream( );
        cf.serialize(out);
```

```
                byte[ ] b = out.toByteArray( );
                return defineClass(name, b, 0, b.length);
            }catch (Exception e){
                throw new ClassNotFoundException(name);
            }
        }
    }
```

A12. Attribute_info.java
Convience class for representing attribute_info structures within ClassFiles.

```
import java.lang.*;
import java.io.*;
/** This abstract class represents all types of attribute_info
 *  that are used in the JVM specifications.
 *
 *  All new attribute_info subclasses are to always inherit from this
 *  class.
 */
public abstract class attribute_info{
    public int attribute_name_index;
    public int attribute_length;
    /** This is used by subclasses to register themselves
     * to their parent classFile.
     */
    attribute_info(ClassFile cf){ }
    /** Used during input serialization by ClassFile only. */
    attribute_info(ClassFile cf, DataInputStream in)
        throws IOException{
            attribute_name_index = in.readChar( );
            attribute_length = in.readInt( );
    }
    /** Used during output serialization by ClassFile only. */
    void serialize(DataOutputStream out)
        throws IOException{
            out.writeChar(attribute_name_index);
            out.writeInt(attribute_length);
    }
    /** This class represents an unknown attribute_info that
     * this current version of classfile specification does
     * not understand.
     */
    public final static class Unknown extends attribute_info{
        byte[ ] info;
        /** Used during input serialization by ClassFile only. */
        Unknown(ClassFile cf, DataInputStream in)
            throws IOException{
                super(cf, in);
                info = new byte[attribute_length];
                in.read(info, 0, attribute_length);
        }
        /** Used during output serialization by ClassFile only. */
        void serialize(DataOutputStream out)
            throws IOException{
                ByteArrayOutputStream baos = new
                    ByteArrayOutputStream( );
                super.serialize(out);
                out.write(info, 0, attribute_length);
        }
    }
}
```

A13. ClassFile.java
Convience class for representing ClassFile structures.

```
import java.lang.*;
import java.io.*;
import java.util.*;
/** The ClassFile follows verbatim from the JVM specification. */
public final class ClassFile {
    public int magic;
    public int minor_version;
    public int major_version;
    public int constant_pool_count;
    public cp_info[ ] constant_pool;
    public int access_flags;
    public int this_class;
    public int super_class;
    public int interfaces_count;
    public int[ ] interfaces;
    public int fields_count;
    public field_info[ ] fields;
    public int methods_count;
    public method_info[ ] methods;
    public int attributes_count;
    public attribute_info[ ] attributes;
    /** Constructor. Takes in a byte stream representation and transforms
     * each of the attributes in the ClassFile into objects to allow for
     * easier manipulation.
     */
    public ClassFile(InputStream ins)
        throws IOException{
        DataInputStream in = (ins instanceof DataInputStream ?
            (DataInputStream) ins : new DataInputStream(ins));
        magic = in.readInt( );
        minor_version = in.readChar( );
        major_version = in.readChar( );
        constant_pool_count = in.readChar( );
        constant_pool = new cp_info[constant_pool_count];
        for (int i=1; i<constant_pool_count; i++){
            in.mark(1);
            int s = in.read( );
            in.reset( );
            switch (s){
                case 1:
                    constant_pool[i] = new CONSTANT_Utf8_info(this, in);
                    break;
                case 3:
                    constant_pool[i] = new CONSTANT_Integer_info(this, in);
                    break;
                case 4:
                    constant_pool[i] = new CONSTANT_Float_info(this, in);
                    break;
                case 5:
                    constant_pool[i] = new CONSTANT_Long_info(this, in);
                    i++;
                    break;
                case 6:
                    constant_pool[i] = new CONSTANT_Double_info(this, in);
                    i++;
                    break;
                case 7:
                    constant_pool[i] = new CONSTANT_Class_info(this, in);
                    break;
                case 8:
                    constant_pool[i] = new CONSTANT_String_info(this, in);
                    break;
                case 9:
                    constant_pool[i] = new CONSTANT_Fieldref_info(this, in);
                    break;
                case 10:
                    constant_pool[i] = new CONSTANT_Methodref_info(this, in);
                    break;
```

-continued

```
            case 11:
                constant_pool[i] =
                    new CONSTANT_InterfaceMethodref_info(this, in);
                break;
            case 12:
                constant_pool[i] = new CONSTANT_NameAndType_info
(this, in);
                break;
            default:
                throw new ClassFormatError("Invalid ConstantPoolTag");
        }
    }
    access_flags = in.readChar( );
    this_class = in.readChar( );
    super_class = in.readChar( );
    interfaces_count = in.readChar( );
    interfaces = new int[interfaces_count];
    for (int i=0; i<interfaces_count; i++)
        interfaces[i] = in.readChar( );
    fields_count = in.readChar( );
    fields = new field_info[fields_count];
    for (int i=0; i<fields_count; i++) {
        fields[i] = new field_info(this, in);
    }
    methods_count = in.readChar( );
    methods = new method_info[methods_count];
    for (int i=0; i<methods_count; i++) {
        methods[i] = new method_info(this, in);
    }
    attributes_count = in.readChar( );
    attributes = new attribute_info[attributes_count];
    for (int i=0; i<attributes_count; i++) {
        in.mark(2);
        String s = constant_pool[in.readChar( )].toString( );
        in.reset( );
        if (s.equals("SourceFile"))
            attributes[i] = new SourceFile_attribute(this, in);
        else if (s.equals("Deprecated"))
            attributes[i] = new Deprecated_attribute(this, in);
        else if (s.equals("InnerClasses"))
            attributes[i] = new InnerClasses_attribute(this, in);
        else
            attributes[i] = new attribute_info.Unknown(this, in);
    }
}
/** Serializes the ClassFile object into a byte stream. */
public void serialize(OutputStream o)
        throws IOException{
    DataOutputStream out = (o instanceof DataOutputStream ?
        (DataOutputStream) o : new DataOutputStream(o));
    out.writeInt(magic);
    out.writeChar(minor_version);
    out.writeChar(major_version);
    out.writeChar(constant_pool_count);
    for (int i=1; i<constant_pool_count; i++){
        constant_pool[i].serialize(out);
        if (constant_pool[i] instanceof CONSTANT_Long_info ||
            constant_pool[i] instanceof CONSTANT_Double_info)
            i++;
    }
    out.writeChar(access_flags);
    out.writeChar(this_class);
    out.writeChar(super_class);
    out.writeChar(interfaces_count);
    for (int i=0; i<interfaces_count; i++)
        out.writeChar(interfaces[i]);
    out.writeChar(fields_count);
    for (int i=0; i<fields_count; i++)
        fields[i].serialize(out);
    out.writeChar(methods_count);
    for (int i=0; i<methods_count; i++)
        methods[i].serialize(out);
    out.writeChar(attributes_count);
    for (int i=0; i<attributes_count; i++)
        attributes[i].serialize(out);
```

-continued

```
    // Flush the outputstream just to make sure.
    out.flush( );
  }
}
```

A14. Code_attribute.java

Convience class for representing Code_attribute structures within ClassFiles.

```
import java.util.*;
import java.lang.*;
import java.io.*;
/**
 * The code[ ] is stored as a 2D array. */
public final class Code_attribute extends attribute_info{
    public int max_stack;
    public int max_locals;
    public int code_length;
    public byte[ ][ ] code;
    public int exception_table_length;
    public exception_table[ ] exception_table;
    public int attributes_count;
    public attribute_info[ ] attributes;
    /** Internal class that handles the exception table. */
    public final static class exception_table{
        public int start_pc;
        public int end_pc;
        public int handler_pc;
        public int catch_type;
    }
    /** Constructor called only by method_info. */
    Code_attribute(ClassFile cf, int ani, int al, int ms, int ml, int cl,
            byte[ ][ ] cd, int etl, exception_table[ ] et, int ac,
            attribute_info[ ] a){
        super(cf);
        attribute_name_index = ani;
        attribute_length = al;
        max_stack = ms;
        max_locals = ml;
        code_length = cl;
        code = cd;
        exception_table_length = etl;
        exception_table = et;
        attributes_count = ac;
        attributes = a;
    }
    /** Used during input serialization by ClassFile only. */
    Code_attribute(ClassFile cf, DataInputStream in)
            throws IOException{
        super(cf, in);
        max_stack = in.readChar( );
        max_locals = in.readChar( );
        code_length = in.readInt( );
        code = new byte[code_length][ ];
        int i = 0;
        for (int pos=0; pos<code_length; i++){
            in.mark(1);
            int s = in.read( );
            in.reset( );
            switch (s){
                case 16:
                case 18:
                case 21:
                case 22:
                case 23:
                case 24:
                case 25:
                case 54:
                case 55:
                case 56:
                case 57:
                case 58:
                case 169:
                case 188:
                case 196:
```

-continued

```
        code[i] = new byte[2];
        break;
    case 17:
    case 19:
    case 20:
    case 132:
    case 153:
    case 154:
    case 155:
    case 156:
    case 157:
    case 158:
    case 159:
    case 160:
    case 161:
    case 162:
    case 163:
    case 164:
    case 165:
    case 166:
    case 167:
    case 168:
    case 178:
    case 179:
    case 180:
    case 181:
    case 182:
    case 183:
    case 184:
    case 187:
    case 189:
    case 192:
    case 193:
    case 198:
    case 199:
    case 209:
        code[i] = new byte[3];
        break;
    case 197:
        code[i] = new byte[4];
        break;
    case 185:
    case 200:
    case 201:
        code[i] = new byte[5];
        break;
    case 170:{
        int pad = 3 - (pos % 4);
        in.mark(pad+13);            // highbyte
        in.skipBytes(pad+5);        // lowbyte
        int low = in.readInt( );
        code[i] =
            new byte[pad + 13 + ((in.readInt( ) - low + 1) * 4)];
        in.reset( );
        break;
    }case 171:{
        int pad = 3 - (pos % 4);
        in.mark(pad+9);
        in.skipBytes(pad+5);
        code[i] = new byte[pad + 9 + (in.readInt( ) * 8)];
        in.reset( );
        break;
    }default:
        code[i] = new byte[1];
    }
    in.read(code[i], 0, code[i].length);
    pos += code[i].length;
}
// adjust the array to the new size and store the size
byte[ ][ ] temp = new byte[i][ ];
System.arraycopy(code, 0, temp, 0, i);
code = temp;
exception_table_length = in.readChar( );
exception_table =
    new Code_attribute.exception_table[exception_table_length];
for (i=0; i<exception_table_length; i++){
    exception_table[i] = new exception_table( );
    exception_table[i].start_pc = in.readChar( );
    exception_table[i].end_pc = in.readChar( );
```

-continued

```
        exception_table[i].handler_pc = in.readChar( );
        exception_table[i].catch_type = in.readChar( );
    }
    attributes_count = in.readChar( );
    attributes = new attribute_info[attributes_count];
    for (i=0; i<attributes_count; i++){
        in.mark(2);
        String s = cf.constant_pool[in.readChar( )].toString( );
        in.reset( );
        if (s.equals("LineNumberTable"))
            attributes[i] = new LineNumberTable_attribute(cf, in);
        else if (s.equals("LocalVariableTable"))
            attributes[i] = new LocalVariableTable_attribute(cf, in);
        else
            attributes[i] = new attribute_info.Unknown(cf, in);
    }
}
/** Used during output serialization by ClassFile only.
 */
void serialize (DataOutputStream out)
    throws IOException{
        attribute_length = 12 + code_length +
            (exception_table_length * 8);
        for (int i=0; i<attributes_count; i++)
            attribute_length += attributes[i].attribute_length + 6;
        super.serialize(out);
        out.writeChar(max_stack);
        out.writeChar(max_locals);
        out.writeInt(code_length);
        for (int i=0, pos=0; pos<code_length; i++){
            out.write(code[i], 0, code[i].length);
            pos += code[i].length;
        }
        out.writeChar(exception_table_length);
        for (int i=0; i<exception_table_length; i++){
            out.writeChar(exception_table[i].start_pc);
            out.writeChar(exception_table[i].end_pc);
            out.writeChar(exception_table[i].handler_pc);
            out.writeChar(exception_table[i].catch_type);
        }
        out.writeChar(attributes_count);
        for (int i=0; i<attributes_count; i++)
            attributes[i].serialize(out);
    }
}
```

A15. CONSTANT_Class_info.java

Convience class for representing CONSTANT_Class_info structures within ClassFiles.

```
import java.lang.*;
import java.io.*;
/** Class subtype of a constant pool entry. */
public final class CONSTANT_Class_info extends cp_info{
    /** The index to the name of this class. */
    public int name_index = 0;
    /** Convenience constructor.
     */
    public CONSTANT_Class_info(int index) {
        tag = 7;
        name_index = index;
    }
    /** Used during input serialization by ClassFile only. */
    CONSTANT_Class_info(ClassFile cf, DataInputStream in)
        throws IOException{
            super(cf, in);
            if (tag != 7)
                throw new ClassFormatError( );
            name_index = in.readChar( );
        }
```

A16. CONSTANT_Double_info.java

Convience class for representing CONSTANT_Double_info structures within ClassFiles.

```java
import java.lang.*;
import java.io.*;
/** Double subtype of a constant pool entry. */
public final class CONSTANT_Double_info extends cp_info{
    /** The actual value. */
    public double bytes;
    public CONSTANT_Double_info(double d){
        tag = 6;
        bytes = d;
    }
    /** Used during input serialization by ClassFile only. */
    CONSTANT_Double_info(ClassFile cf, DataInputStream in)
        throws IOException{
        super(cf, in);
        if (tag != 6)
            throw new ClassFormatError( );
        bytes = in.readDouble( );
    }
    /** Used during output serialization by ClassFile only. */
    void serialize(DataOutputStream out)
        throws IOException{
        out.writeByte(tag);
        out.writeDouble(bytes);
        long l = Double.doubleToLongBits(bytes);
    }
}
```

A17. CONSTANT_Fieldref_info.java

Convience class for representing CONSTANT_Fieldref_info structures within ClassFiles.

```java
import java.lang.*;
import java.io.*;
/** Fieldref subtype of a constant pool entry. */
public final class CONSTANT_Fieldref_info extends cp_info{
    /** The index to the class that this field is referencing to. */
    public int class_index;
    /** The name and type index this field if referencing to. */
    public int name_and_type_index;
    /** Convenience constructor. */
    public CONSTANT_Fieldref_info(int class_index, int
        name_and_type_index)
    {
        tag = 9;
        this.class_index = class_index;
        this.name_and_type_index = name_and_type_index;
    }
    /** Used during input serialization by ClassFile only. */
    CONSTANT_Fieldref_info(ClassFile cf, DataInputStream in)
        throws IOException{
        super(cf, in);
        if (tag != 9)
            throw new ClassFormatError( );
        class_index = in.readChar( );
        name_and_type_index = in.readChar( );
    }
    /** Used during output serialization by ClassFile only. */
    void serialize(DataOutputStream out)
        throws IOException{
        out.writeByte(tag);
        out.writeChar(class_index);
        out.writeChar(name_and_type_index);
    }
}
```

A18. CONSTANT_Float_info.java

Convience class for representing CONSTANT_Float_info structures within ClassFiles.

```java
import java.lang.*;
import java.io.*;
/** Float subtype of a constant pool entry. */
public final class CONSTANT_Float_info extends cp_info{
    /** The actual value. */
    public float bytes;
    public CONSTANT_Float_info(float f){
        tag = 4;
        bytes = f;
    }
    /** Used during input serialization by ClassFile only. */
    CONSTANT_Float_info(ClassFile cf, DataInputStream in)
        throws IOException{
        super(cf, in);
        if (tag != 4)
            throw new ClassFormatError( );
        bytes = in.readFloat( );
    }
    /** Used during output serialization by ClassFile only. */
    public void serialize(DataOutputStream out)
        throws IOException{
        out.writeByte(4);
        out.writeFloat(bytes);
    }
}
```

A19. CONSTANT_Integer_info.java

Convience class for representing CONSTANT_Integer_info structures within ClassFiles.

```java
import java.lang.*;
import java.io.*;
/** Integer subtype of a constant pool entry. */
public final class CONSTANT_Integer_info extends cp_info{
    /** The actual value. */
    public int bytes;
    public CONSTANT_Integer_info(int b) {
        tag = 3;
        bytes = b;
    }
    /** Used during input serialization by ClassFile only. */
    CONSTANT_Integer_info(ClassFile cf, DataInputStream in)
        throws IOException{
        super(cf, in);
        if (tag != 3)
            throw new ClassFormatError( );
        bytes = in.readInt( );
    }
    /** Used during output serialization by ClassFile only. */
    public void serialize(DataOutputStream out)
        throws IOException{
        out.writeByte(tag);
        out.writeInt(bytes);
    }
}
```

A20. CONSTANT_InterfaceMethodref_info.java

Convience class for representing CONSTANT_InterfaceMethodref_info structures within ClassFiles.

```
import java.lang.*;
import java.io.*;
/** InterfaceMethodref subtype of a constant pool entry.
 */
public final class CONSTANT_InterfaceMethodref_info extends
cp_info{
   /** The index to the class that this field is referencing to. */
   public int class_index;
   /** The name and type index this field if referencing to. */
   public int name_and_type_index;
   public CONSTANT_InterfaceMethodref_info(int class_index,
                                  int name_and_type_index) {
      tag = 11;
      this.class_index = class_index;
      this.name_and_type_index = name_and_type_index;
   }
   /** Used during input serialization by ClassFile only. */
   CONSTANT_InterfaceMethodref_info(ClassFile cf,
   DataInputStream in)
      throws IOException{
      super(cf, in);
      if (tag != 11)
         throw new ClassFormatError( );
      class_index = in.readChar( );
      name_and_type_index = in.readChar( );
   }
   /** Used during output serialization by ClassFile only. */
   void serialize(DataOutputStream out)
      throws IOException{
      out.writeByte(tag);
      out.writeChar(class_index);
      out.writeChar(name_and_type_index);
   }
}
```

A21. CONSTANT_Long_info.java

Convience class for representing CONSTANT_Long_info structures within ClassFiles.

```
import java.lang.*;
import java.io.*;
/** Long subtype of a constant pool entry. */
public final class CONSTANT_Long_info extends cp_info{
   /** The actual value. */
   public long bytes;
   public CONSTANT_Long_info(long b){
      tag = 5;
      bytes = b;
   }
   /** Used during input serialization by ClassFile only. */
   CONSTANT_Long_info(ClassFile cf, DataInputStream in)
      throws IOException{
      super(cf, in);
      if (tag != 5)
         throw new ClassFormatError( );
      bytes = in.readLong( );
   }
   /** Used during output serialization by ClassFile only. */
   void serialize(DataOutputStream out)
      throws IOException{
      out.writeByte(tag);
      out.writeLong(bytes);
   }
}
```

A22. CONSTANT_Methodref_info.java

Convience class for representing CONSTANT_Methodref_info structures within ClassFiles.

```
import java.lang.*;
import java.io.*;
/** Methodref subtype of a constant pool entry.
 */
public final class CONSTANT_Methodref_info extends cp_info{
   /** The index to the class that this field is referencing to. */
   public int class_index;
   /** The name and type index this field if referencing to. */
   public int name_and_type_index;
   public CONSTANT_Methodref_info(int class_index, int
   name_and_type_index)
   {
      tag = 10;
      this.class_index = class_index;
      this.name_and_type_index = name_and_type_index;
   }
   /** Used during input serialization by ClassFile only. */
   CONSTANT_Methodref_info(ClassFile cf, DataInputStream in)
      throws IOException{
      super(cf, in);
      if (tag != 10)
         throw new ClassFormatError( );
      class_index = in.readChar( );
      name_and_type_index = in.readChar( );
   }
   /** Used during output serialization by ClassFile only. */
   void serialize(DataOutputStream out)
      throws IOException{
      out.writeByte(tag);
      out.writeChar(class_index);
      out.writeChar(name_and_type_index)
   }
}
```

A23. CONSTANT_NameAndType_info.java

Convience class for representing CONSTANT_NameAndType_info structures within ClassFiles.

```
import java.io.*;
import java.lang.*;
/** NameAndType subtype of a constant pool entry.
 */
public final class CONSTANT_NameAndType_info extends cp_info{
   /** The index to the Utf8 that contains the name. */
   public int name_index;
   /** The index fo the Utf8 that consains the signature. */
   public int descriptor_index;
   public CONSTANT_NameAndType_info(int name_index,
   int descriptor_index) {
      tag = 12;
      this.name_index = name_index;
      this.descriptor_index = descriptor_index;
   }
   /** Used during input serialization by ClassFile only. */
   CONSTANT_NameAndType_info(ClassFile cf, DataInputStream in)
      throws IOException{
      super(cf, in);
      if (tag != 12)
         throw new ClassFormatError( );
      name_index = in.readChar( );
      descriptor_index = in.readChar( );
   }
   /** Used during output serialization by ClassFile only. */
   void serialize(DataOutputStream out)
      throws IOException{
      out.writeByte(tag);
      out.writeChar(name_index);
      out.writeChar(descripton_index);
   }
}
```

A24. CONSTANT_String_info.java

Convience class for representing CONSTANT_String_info structures within ClassFiles.

```java
import java.lang.*;
import java.io.*;
/** String subtype of a constant pool entry.
 */
public final class CONSTANT_String_info extends cp_info{
    /** The index to the actual value of the string. */
    public int string_index;
    public CONSTANT_String_info(int value) {
        tag = 8;
        string_index = value;
    }
    /** ONLY TO BE USED BY CLASSFILE! */
    public CONSTANT_String_info(ClassFile cf, DataInputStream in)
        throws IOException{
        super(cf, in);
        if (tag != 8)
            throw new ClassFormatError( );
        string_index = in.readChar( );
    }
    /** Output serialization, ONLY TO BE USED BY CLASSFILE! */
    public void serialize(DataOutputStream out)
        throws IOException{
        out.writeByte(tag);
        out.writeChar(string_index);
    }
}
```

A25. CONSTANT_Utf8_info.java

Convience class for representing CONSTANT_Utf8_info structures within ClassFiles.

```java
import java.io.*;
import java.lang.*;
/** Utf8 subtype of a constant pool entry.
 * We internally represent the Utf8 info byte array
 * as a String.
 */
public final class CONSTANT_Utf8_info extends cp_info{
    /** Length of the byte array. */
    public int length;
    /** The actual bytes, represented by a String. */
    public String bytes;
    /** This constructor should be used for the purpose
     * of part creation. It does not set the parent
     * ClassFile reference.
     */
    public CONSTANT_Utf8_info(String s) {
        tag = 1;
        length = s.length( );
        bytes = s;
    }
    /** Used during input serialization by ClassFile only. */
    public CONSTANT_Utf8_info(ClassFile cf, DataInputStream in)
        throws IOException{
        super(cf, in);
        if (tag != 1)
            throw new ClassFormatError( );
        length = in.readChar( );
        byte[ ] b = new byte[length];
        in.read(b, 0, length);
        // WARNING: String constructor is deprecated.
        bytes = new String(b, 0, length);
    }
    /** Used during output serialization by ClassFile only. */
    public void serialize(DataOutputStream out)
        throws IOException{
        out.writeByte(tag);
        out.writeChar(length);
        // WARNING: Handling of String coversion here might be
        problematic.
        out.writeBytes(bytes);
    }
    public String toString( ){
        return bytes;
    }
}
```

A26. ConstantValue_attribute.java

Convience class for representing ConstantValue_attribute structures within ClassFiles.

```java
import java.lang.*;
import java.io.*;
/** Attribute that allows for initialization of static variables in
 * classes. This attribute will only reside in a field_info struct.
 */
public final class ConstantValue_attribute extends attribute_info{
    public int constantvalue_index;
    public ConstantValue_attribute(ClassFile cf, int ani, int al, int cvi){
        super(cf);
        attribute_name_index = ani;
        attribute_length = al;
        constantvalue_index = cvi;
    }
    public ConstantValue_attribute(ClassFile cf, DataInputStream in)
        throws IOException{
        super(cf, in);
        constantvalue_index = in.readChar( );
    }
    public void serialize(DataOutputStream out)
        throws IOException{
        attribute_length = 2;
        super.serialize(out);
        out.writeChar(constantvalue_index);
    }
}
```

A27. cp_info.java

Convience class for representing cp_info structures within ClassFiles.

```java
import java.lang.*;
import java.io.*;
/** Represents the common interface of all constant pool parts
 * that all specific constant pool items must inherit from.
 *
 */
public abstract class cp_info{
    /** The type tag that signifies what kind of constant pool
     * item it is */
    public int tag;
    /** Used for serialization of the object back into a bytestream. */
    abstract void serialize(DataOutputStream out) throws IOException;
    /** Default constructor. Simply does nothing. */
    public cp_info( ) { }
    /** Constructor simply takes in the ClassFile as a reference to
     * it's parent
     */
    public cp_info(ClassFile cf) { }
    /** Used during input serialization by ClassFile only. */
    cp_info(ClassFile cf, DataInputStream in)
        throws IOException{
        tag = in.readUnsignedByte( );
    }
}
```

A28. Deprecated_attribute.java

Convience class for representing Deprecated_attribute structures within ClassFiles.

```java
import java.lang.*;
import java.io.*;
/** A fix attributed that can be located either in the ClassFile,
 * field_info or the method_info attribute. Mark deprecated to
 * indicate that the method, class or field has been superceded.
 */
public final class Deprecated_attribute extends attribute_info{
    public Deprecated_attribute(ClassFile cf, int ani, int al){
        super(cf);
        attribute_name_index = ani;
        attribute_length = al;
    }
    /** Used during input serialization by ClassFile only. */
    Deprecated_attribute(ClassFile cf, DataInputStream in)
        throws IOException{
        super(cf, in);
    }
}
```

A29. Exceptions_attribute.java

Convience class for representing Exceptions_attribute structures within ClassFiles.

```java
import java.lang.*;
import java.io.*;
/** This is the struct where the exceptions table are located.
 * <br><br>
 * This attribute can only appear once in a method_info struct.
 */
public final class Exceptions_attribute extends attribute_info{
    public int number_of_exceptions;
    public int[ ] exception_index_table;
    public Exceptions_attribute(ClassFile cf, int ani, int al, int noe,
                                int[ ] eit){
        super(cf);
        attribute_name_index = ani;
        attribute_length = al;
        number_of_exceptions = noe;
        exception_index_table = eit;
    }
    /** Used during input serialization by ClassFile only. */
    Exceptions_attribute(ClassFile cf, DataInputStream in)
        throws IOException{
        super(cf, in);
        number_of_exceptions = in.readChar( );
        exception_index_table = new int[number_of_exceptions];
        for (int i=0; i<number_of_exceptions; i++)
            exception_index_table[i] = in.readChar( );
    }
    /** Used during output serialization by ClassFile only. */
    public void serialize(DataOutputStream out)
        throws IOException{
        attribute_length = 2 + (number_of_exceptions*2);
        super.serialize(out);
        out.writeChar(nunber_of_exceptions);
        for (int i=0; i<number_of_exceptions; i++)
            out.writeChar(exception_index_table[i]);
    }
}
```

A30. field_info.java

Convience class for representing field_info structures within ClassFiles.

```java
import java.lang.*;
import java.io.*;
/** Represents the field_info structure as specified in the JVM
specification.
 */
public final class field_info{
    public int access_flags;
    public int name_index;
    public int descriptor_index;
    public int attributes_count;
    public attribute_info[ ] attributes;
    /** Convenience constructor. */
    public field_info(ClassFile cf, int flags, int ni, int di){
        access_flags = flags;
        name_index = ni;
        descriptor_index = di;
        attributes_count = 0;
        attributes = new attribute_info[0];
    }
    /** Constructor called only during the serialization process.
     * <br><br>
     * This is intentionally left as package protected as we
     * should not normally call this constructor directly.
     * <br><br>
     * Warning: the handling of len is not correct (after String s = . . . )
     */
    field_info(ClassFile cf, DataInputStream in)
        throws IOException{
        access_flags = in.readChar( );
        name_index = in.readChar( );
        descriptor_index = in.readChar( );
        attributes_count = in.readChar( );
        attributes = new attribute_info[attributes_count];
        for (int i=0; i<attributes_count; i++){
            in.mark(2);
            String s = cf.constant_pool[in.readChar( )].toString( );
            in.reset( );
            if (s.equals("ConstantValue"))
                attributes[i] = new ConstantValue_attribute(cf, in);
            else if (s.equals("Synthetic"))
                attributes[i] = new Synthetic_attribute(cf, in);
            else if (s.equals("Deprecated"))
                attributes[i] = new Deprecated_attribute(cf, in);
            else
                attributes[i] = new attribute_info.Unknown(cf, in);
        }
    }
    /** To serialize the contents into the output format.
     */
    public void serialize(DataOutputStream out)
        throws IOException{
        out.writeChar(access_flags);
        out.writeChar(name_index);
        out.writeChar(descriptor_index);
        out.writeChar(attributes_count);
        for (int i=0; i<attributes_count; i++)
            attributes[i].serialize(out);
    }
}
```

A31. InnerClasses_attribute.java

Convience class for representing InnerClasses_attribute structures within ClassFiles.

```java
import java.lang.*;
import java.io.*;
/** A variable length structure that contains information about an
 * inner class of this class.
 */
public final class InnerClasses_attribute extends attribute_info{
    public int number_of_classes;
```

```
public classes[ ] classes;
public final static class classes{
    int inner_class_info_index;
    int outer_class_info_index;
    int inner_name_index;
    int inner_class_access_flags;
}
public InnerClasses_attribute(ClassFile cf, int ani, int al,
                 int noc, classes[ ] c){
    super(cf);
    attribute_name_index = ani;
    attribute_length = al;
    number_of_classes = noc;
    classes = c;
}
/** Used during input serialization by ClassFile only. */
InnerClasses_attribute(ClassFile cf, DataInputStream in)
    throws IOException{
    super(cf, in);
    number_of_classes = in.readChar( );
    classes = new InnerClasses_attribute.classes[number_of_classes];
    for (int i=0; i<number_of_classes; i++){
        classes[i] = new classes( );
        classes[i].inner_class_info_index = in.readChar( );
        classes[i].outer_class_info_index = in.readChar( );
        classes[i].inner_name_index = in.readChar( );
        classes[i].inner_class_access_flags = in.readChar( );
    }
}
/** Used during output serialization by ClassFile only. */
public void serialize(DataOutputStream out)
    throws IOException{
    attribute_length = 2 + (number_of_classes * 8);
    super.serialize(out);
    out.writeChar(number_of_classes);
    for (int i=0; i<number_of_classes; i++){
        out.writeChar(classes[i].inner_class_info_index);
        out.writeChar(classes[i].outer_class_info_index);
        out.writeChar(classes[i].inner_name_index);
        out.writeChar(classes[i].inner_class_access_flags);
    }
}
}
```

A32. LineNumberTable_attribute.java

Convience class for representing LineNumberTable_attribute structures within ClassFiles.

```
import java.lang.*;
import java.io.*;
/** Determines which line of the binary code relates to the
 * corresponding source code.
 */
public final class LineNumberTable_attribute extends attribute_info{
    public int line_number_table_length;
    public line_number_table[ ] line_number_table;
    public final static class line_number_table{
        int start_pc;
        int line_number;
    }
    public LineNumberTable_attribute(ClassFile cf, int ani, int al, int lntl,
                     line_number_table[ ] lnt){
        super(cf);
        attribute_name_index = ani;
        attribute_length = al;
        line_number_table_length = lntl;
        line_number_table = lnt;
    }
    /** Used during input serialization by ClassFile only. */
    LineNumberTable_attribute(ClassFile cf, DataInputStream in)
        throws IOException{
        super(cf, in);
        line_number_table_length = in.readChar( );
        line_number_table = new
LineNumberTable_attribute.line_number_table
[line_number_table_length];
        for (int i=0; i<line_number_table_length; i++){
            line_number_table[i] = new line_number_table( );
            line_number_table[i].start_pc = in.readChar( );
            line_number_table[i].line_number = in.readChar( );
        }
    }
    /** Used during output serialization by ClassFile only. */
    void serialize(DataOutputStream out)
        throws IOException{
        attribute_length = 2 + (line_number_table_length * 4);
        super.serialize(out);
        out.writeChar(line_number_table_length);
        for (int i=0; i<line_number_table_length; i++){
            out.writeChar(line_number_table[i].start_pc);
            out.writeChar(line_number_table[i].line_number);
        }
    }
}
```

A33. LocalVariableTable_attribute.java

Convience class for representing LocalVariableTable_attribute structures within ClassFiles.

```
import java.lang.*;
import java.io.*;
/** Used by debugger to find out how the source file line number is linked
 * to the binary code. It has many to one correspondence and is found in
 * the Code_attribute.
 */
public final class LocalVariableTable_attribute extends attribute_info{
    public int local_variable_table_length;
    public local_variable_table[ ] local_variable_table;
    public final static class local_variable_table{
        int start_pc;
        int length;
        int name_index;
        int descriptor_index;
        int index;
    }
    public LocalVariableTable_attribute(ClassFile cf, int ani, int al,
                     int lvtl, local_variable_table[ ]
lvt){
        super(cf);
        attribute_name_index = ani;
        attribute_length = al;
        local_variable_table_length = lvtl;
        local_variable_table = lvt;
    }
    /** Used during input serialization by ClassFile only. */
    LocalVariableTable_attribute(ClassFile cf, DataInputStream in)
        throws IOException{
        super(cf, in);
        local_variable_table_length = in.readChar( );
        local_variable_table = new
LocalVariableTable_attribute.
local_variable_table[local_variable_table_length];
        for (int i=0; i<local_variable_table_length; i++){
            local_variable_table[i] = new local_variable_table( );
            local_variable_table[i].start_pc = in.readChar( );
            local_variable_table[i].length = in.readChar( );
            local_variable_table[i].name_index = in.readChar( );
            local_variable_table[i].descriptor_index = in.readChar( );
            local_variable_table[i].index = in.readChar( );
        }
    }
    /** Used during output serialization by ClassFile only. */
    void serialize(DataOutputStream out)
        throws IOException{
        attribute_length = 2 + (local_variable_table_length * 10);
        super.serialize(out);
        out.writeChar(local_variable_table_length);
```

```
        for (int i=0; i<local_variable_table_length; i++){
            out.writeChar(local_variable_table[i].start_pc);
            out.writeChar(local_variable_table[i].length);
            out.writeChar(local_variable_table[i].name_index);
            out.writeChar(local_variable_table[i].descriptor_index);
            out.writeChar(local_variable_table[i].index);
        }
    }
}
```

A34. method_info.java

Convience class for representing method_info structures within ClassFiles.

```
import java.lang.*;
import java.io.*;
/** This follows the method_info in the JVM specification.
 */
public final class method_info {
    public int access_flags;
    public int name_index;
    public int descriptor_index;
    public int attributes_count;
    public attribute_info[ ] attributes;
    /** Constructor. Creates a method_info, initializes it with
     * the flags set, and the name and descriptor indexes given.
     * A new uninitialized code attribute is also created, and stored
     * in the <i>code</i> variable.*/
    public method_info(ClassFile cf, int flags, int ni, int di,
                int ac, attribute_info[ ] a) {
        access_flags = flags;
        name_index = ni;
        descriptor_index = di;
        attributes_count = ac;
        attributes = a;
    }
    /** This method creates a method_info from the current pointer in the
     * data stream. Only called by during the serialization of a complete
     * ClassFile from a bytestream, not normally invoked directly.
     */
    method_info(ClassFile cf, DataInputStream in)
        throws IOException{
        access_flags = in.readChar( );
        name_index = in.readChar( );
        descriptor_index = in.readChar( );
        attributes_count = in.readChar( );
        attributes = new attribute_info[attributes_count];
        for (int i=0; i<attributes_count; i++){
            in.mark(2);
            String s = cf.constant_pool[in.readChar( )].toString( );
            in.reset( );
            if (s.equals("Code"))
                attributes[i] = new Code_attribute(cf, in);
            else if (s.equals("Exceptions"))
                attributes[i] = new Exceptions_attribute(cf, in);
            else if (s.equals("Synthetic"))
                attributes[i] = new Synthetic_attribute(cf, in);
            else if (s.equals("Deprecated"))
                attributes[i] = new Deprecated_attribute(cf, in);
            else
                attributes[i] = new attribute_info.Unknown(cf, in);
        }
    }
    /** Output serialization of the method_info to a byte array.
     * Not normally invoked directly.
     */
    public void serialize (DataOutputStream out)
        throws IOException{
        out.writeChar(access_flags);
        out.writeChar(name_index);
        out.writeChar(descriptor_index);
        out.writeChar(attributes_count);
        for (int i=0; i<attributes_count; i++)
            attributes[i].serialize(out);
    }
}
```

A35. SourceFile_attribute.java

Convience class for representing SourceFile_attribute structures within ClassFiles.

```
import java.lang.*;
import java.io.*;
/** A SourceFile attribute is an optional fixed_length attribute in
 * the attributes table. Only located in the ClassFile struct only
 * once.
 */
public final class SourceFile_attribute extends attribute_info{
    public int sourcefile_index;
    public SourceFile_attribute(ClassFile cf, int ani, int al, int sfi){
        super(cf);
        attribute_name_index = ani;
        attribute_length = al;
        sourcefile_index = sfi;
    }
    /** Used during input serialization by ClassFile only. */
    SourceFile_attribute(ClassFile cf, DataInputStream in)
        throws IOException{
        super(cf, in);
        sourcefile_index = in.readChar( );
    }
    /** Used during output serialization by ClassFile only. */
    void serialize(DataOutputStream out)
        throws IOException{
        attribute_length = 2;
        super.serialize(out);
        out.writeChar(sourcefile_index);
    }
}
```

A36. Synthetic_attribute.java

Convience class for representing Synthetic_attribute structures within ClassFiles.

```
import java.lang.*;
import java.io.*;
/** A synthetic attribute indicates that this class does not have
 * a generated code source. It is likely to imply that the code
 * is generated by machine means rather than coded directly. This
 * attribute can appear in the classfile, method_info or field_info.
 * It is fixed length.
 */
public final class Synthetic_attribute extends attribute_info{
    public Synthetic_attribute(ClassFile cf, int ani, int al){
        super(cf);
        attribute_name_index = ani;
        attribute_length = al;
    }
    /** Used during output serialization by ClassFile only. */
    Synthetic_attribute(ClassFile cf, DataInputStream in)
        throws IOException{
        super(cf, in);
    }
}
```

ANNEXURE B

B1
Method <clinit>
0 new #2 <Class test>
3 dup
4 invoke special #3 <Method test( )>
7 putstafic #4 <Field test thisTest>
10 return
B2
Method <clinit>
0 invokestatic #3 <Method boolean isAlreadyLoaded( )>
3 ifeq 7
6 return
7 new #5 <Class test>
10 dup
11 invokespecial #6 <Method test( )>
14 putstatic #7 <Field test thisTest>
17 return
B3
Method <init>
0 aload_0
1 invokespecial #1 <Method java.lang.Object( )>
4 aload_0
5 invokestatic #2 <Method long currentTimeMillis( )>
8 putfield #3 <Field long timestamp>
11 return
B4
Method <init>
0 aload_0
1 invokespecial #1 <Method java.lang.Object( )>
4 invokestatic #2 <Method boolean isAlreadyLoaded( )>
7 ifeq 11
10 return
11 aload_0
12 invokestatic #4 <Method long currentTimeMillis( )>
15 putfield #5 <Field long timestamp>
18 return
B5
Method <clinit>
0 ldc #2 <String "test">
2 invokestatic #3 <Method boolean isAlreadyLoaded (java.lang.String)>
5 ifeq 9
8 return
9 new #5 <Class test>
12 dup
13 invokespecial #6 <Method test( )>
16 putstatic #7 <Field test thisTest>
19 return
B6
Method <init>
0 aload_0
1 invokespecial #1 <Method java.lang.Object( )>
4 aload_0
5 invokestatic #2 <Method boolean isAlreadyLoaded (java.lang.Object)>
8 ifeq 12
11 return
12 aload_0
13 invokestatic #4 <Method long currentTimeMillis( )>
16 putfield #5 <Field long timestamp>
19 return

ANNEXURE B7

This excerpt is the source-code of InitClient, which queries an "initialisation server" for the initialisation status of the relevant class or object.

```java
import java.lang.*;
import java.util.*;
import java.net.*;
import java.io.*;
public class InitClient{
   /** Protocol specific values. */
   public final static int CLOSE = −1;
   public final static int NACK = 0;
   public final static int ACK = 1;
   public final static int INITIALIZE_CLASS = 10;
   public final static int INITIALIZE_OBJECT = 20;
   /** InitServer network values. */
   public final static String serverAddress =
      System.getProperty("InitServer_network_address");
   public final static int serverPort =
      Integer.parseInt(System.getProperty("InitServer_network_port"));
   /** Table of global ID's for local objects. (hashcode-to-globalID
      mappings) */
   public final static Hashtable hashCodeToGlobalID = new Hashtable( );
   /** Called when a object is being initialized. */
   public static boolean isAlreadyLoaded(Object o){
      // First of all, we need to resolve the globalID
      // for object 'o'. To do this we use the hashCodeToGlobalID
      // table.
      int globalID = ((Integer) hashCodeToGlobalID.get(o)).intValue( );
      try{
         // Next, we want to connect to the InitServer, which will inform us
         // of the initialization status of this object.
         Socket socket = new Socket(serverAddress, serverPort);
         DataOutputStream out =
            new DataOutputStream(socket.getOutputStream( ));
         DataInputStream in =
            new DataInputStream(socket.getInputStream( ));
         // Ok, now send the serialized request to the InitServer.
         out.writeInt(INITIALIZE_OBJECT);
         out.writeInt(globalID);
         out.flush( );
         // Now wait for the reply.
         int status = in.readInt( );   // This is a blocking call. So we
                                       // will wait until the remote side
                                       // sends something.
         if (status == NACK){
            throw new AssertionError(
               "Negative acknowledgement. Request failed.");
         }else if (status != ACK){
            throw new AssertionError("Unknown acknowledgement: "
               + status + ". Request failed.");
         }
         // Next, read in a 32bit argument which is the count of previous
         // initializations.
         int count = in.readInt( );
         // If the count is equal to 0, then this is the first
         // initialization, and hence isAlreadyLoaded should be false.
         // If however, the count is greater than 0, then this is already
         // initialized, and thus isAlreadyLoaded should be true.
         boolean isAlreadyLoaded = (count == 0 ? false : true);
         // Close down the connection.
         out.writeInt(CLOSE);
         out.flush( );
         out.close( );
         in.close( );
         socket.close( );    // Make sure to close the socket.
```

-continued
```
        // Return the value of the isAlreadyLoaded variable.
        return isAlreadyLoaded;
    }catch (IOException e){
        throw new AssertionError("Exception: " + e.toString( ));
    }
}
/** Called when a class is being initialized. */
public static boolean isAlreadyLoaded(String name){
    try{
        // First of all, we want to connect to the InitServer, which will
        // inform us of the initialization status of this class.
        Socket socket = new Socket(serverAddress, serverPort);
        DataOutputStream out =
            new DataOutputStream(socket.getOutputStream( ));
        DataInputStream in =
            new DataInputStream(socket.getInputStream( ));
        // Ok, now send the serialized request to the InitServer.
        out.writeInt(INITIALIZE_CLASS);
        out.writeInt(name.length( ));      // A 32bit length argument of
                                            // the String name.
        out.write(name.getBytes( ), 0, name.length( ));   // The byte-
                                            // encoded
                                            // String name.
        out.flush( );
        // Now wait for the reply.
        int status = in.readInt( );       // This is a blocking call. So we
                                            // will wait until the remote side
                                            // sends something.
        if (status == NACK){
            throw new AssertionError(
                "Negative acknowledgement. Request failed.");
        }else if (status != ACK){
            throw new AssertionError("Unknown acknowledgement: "
                + status + ". Request failed.");
        }
        // Next, read in a 32bit argument which is the count of the
        // previous intializations.
        int count = in.readInt( );
        // If the count is equal to 0, then this is the first
        // initialization, and hence isAlreadyLoaded should be false.
        // If however, the count is greater than 0, then this is already
        // loaded, and thus isAlreadyLoaded should be true.
        boolean isAlreadyLoaded = (count == 0 ? false : true);
        // Close down the connection.
        out.writeInt(CLOSE);
        out.flush( );
        out.close( );
        in.close( );
        socket.close( );      // Make sure to close the socket.
        // Return the value of the isAlreadyLoaded variable.
        return isAlreadyLoaded;
    }catch (IOException e){
        throw new AssertionError("Exception: " + e.toString( ));
    }
}
}
```

ANNEXURE B8

This excerpt is the source-code of InitServer, which receives an initialisation status query by InitClient and in response returns the corresponding status.

```
import java.lang.*;
import java.util.*;
import java.net.*;
import java.io.*;
public class InitServer implements Runnable{
    /** Protocol specific values */
    public final static int CLOSE = -1;
    public final static int NACK = 0;
    public final static int ACK = 1;
    public final static int INITIALIZE_CLASS = 10;
    public final static int INITIALIZE_OBJECT = 20;
    /** InitServer network values. */
    public final static int serverPort = 20001;
    /** Table of initialization records. */
    public final static Hashtable initializations = new Hashtable( );
    /** Private input/output objects. */
    private Socket socket = null;
    private DataOutputStream outputStream;
    private DataInputStream inputStream;
    private String address;
    public static void main(String[ ] s)
        throws Exception{
        System.out.println("InitServer_network_address="
            + InetAddress.getLocalHost( ).getHostAddress( ));
        System.out.println("InitServer_network_port=" + serverPort);
        // Create a serversocket to accept incoming initialization operation
        // connections.
        ServerSocket serverSocket = new ServerSocket(serverPort);
        while (!Thread.interrupted( )){
            // Block until an incoming initialization operation connection.
            Socket socket = serverSocket.accept( );
            // Create a new instance of InitServer to manage this
            // initialization operation connection.
            new Thread(new InitServer(socket)).start( );
        }
    }
    /** Constructor. Initialize this new InitServer instance with necessary
        resources for operation. */
    public InitServer(Socket s){
        socket = s;
        try{
            outputStream = new DataOutputStream(s.getOutputStream( ));
            inputStream = new DataInputStream(s.getInputStream( ));
            address = s.getInetAddress( ).getHostAddress( );
        }catch (IOException e){
            throw new AssertionError("Exception: " + e.toString( ));
        }
    }
    /** Main code body. Decode incoming initialization operation requests
        and execute accordingly. */
    public void run( ){
        try{
            // All commands are implemented as 32bit integers.
            // Legal commands are listed in the "protocol specific values"
            // fields above.
            int command = inputStream.readInt( );
            // Continue processing commands until a CLOSE operation.
            while (command != CLOSE){
                if (command ==                    // This is an
INITIALIZE_CLASS){                                // INITIALIZE_CLASS
                                                  // operation.
                    // Read in a 32bit length field 'l', and a String name for
                    // this class of length 'l'.
                    int length = inputStream.readInt( );
                    byte[ ] b = new byte [length];
                    inputStream.read(b, 0, b.length);
                    String className = new String(b, 0, length);
                    // Synchronize on the initializations table in order to
                    // ensure thread-safety.
                    synchronized (initializations){
                        // Locate the previous initializations entry for this
                        // class, if any.
                        Integer entry = (Integer) initializations.get(className);
                        if (entry == null){    // This is an unknown class so
                                                // update the table with a
                                                // corresponding entry.
                            initializations.put(className, new Integer(1));
                            // Send a positive acknowledgement to InitClient,
                            // together with the count of previous initializations
                            // of this class - which in this case of an unknown
                            // class must be 0.
                            outputStream.writeInt(ACK);
                            outputStream.writeInt(0);
                            outputStream.flush( );
                        }else{                 // This is a known class, so update
                                                // the count of initializations.
                            initializations.put(className,
                                new Integer(entry.intValue( ) + 1));
                            // Send a positive acknowledgement to InitClient,
```

-continued
```
            // together with the count of previous initializtions
            // of this class - which in this case of a known class
            // must be the value of "entry.intValue( )".
            outputStream.writeInt(ACK);
            outputStream.writeInt(entry.intValue( ));
            outputStream.flush( );
          }
        }
      }else if (command ==        // This is an
INITIALIZE_OBJECT){              // INITIALIZE_OBJECT
                                 operation.
        // Read in the globalID of the object to be initialized.
        int globalID = inputStream.readInt( );
        // Synchronize on the initializations table in order to
        // ensure thread-safety.
        synchronized (initializations){
          // Locate the previous initializations entry for this
          // object, if any.
          Integer entry = (Integer) initializations.get(
              new Integer(globalID));
          if (entry == null){    // This is an unknown object so
                                 // update the table with a
                                 // corresponding entry.
            initializations.put(new Integer(globalID),
                new Integer(1));
            // Send a positive acknowledgement to InitClient,
            // together with the count of previous initializations
            // of this object - which in this case of an unknown
            // object must be 0.
            outputStream.writeInt(ACK);
            outputStream.writeInt(0);
            outputStream.flush( );
          }else{       // This is a known object so update the
                       // count of initializations.
            initializations.put(new Integer(globalID),
                new Integer(entry.intValue( ) + 1));
            // Send a positive acknowledgement to InitClient,
            // together with the count of previous initializations
            // of this object - which in this case of a known
            // object must be value "entry.intValue( )".
            outputStream.writeInt(ACK);
            outputStream.writeInt(entry.intValue( ));
            outputStream.flush( );
          }
        }
      }else{         // Unknown command.
        throw new AssertionError(
            "Unknown command. Operation failed.");
      }
      // Read in the next command.
      command = inputStream.readInt( );
    }
  }catch (Exception e){
      throw new AssertionError("Exception: " + e.toString( ));
  }finally{
    try{
      // Closing down. Cleanup this connection.
      outputStream.flush( );
      outputStream.close( );
      inputStream.close( );
      socket.close( );
    }catch (Throwable t){
      t.printStackTrace( );
    }
    // Garbage these references.
    outputStream = null;
    inputStream = null;
    socket = null;
  }
}
```

ANNEXURE B9

This excerpt is the source-code of the example application used in the before/after examples of Annexure B.

```
import java.lang.*;
public class example{
  /** Shared static field. */
  public static example currentExample;
  /** Shared instance field. */
  public long timestamp;
  /** Static intializer. (clinit) */
  static{
    currentExample = new example( );
  }
  /** Instance intializer (init) */
  public example( ){
    timestamp = System.currentTimeMillis( );
  }
}
```

ANNEXURE B10

InitLoader.java

This excerpt is the source-code of InitLoader, which modifies an application as it is being loaded.

```
import java.lang.*;
import java.io.*;
import java.net.*;
public class InitLoader extends URLClassLoader{
  public InitLoader(URL[ ] urls) {
    super(urls);
  }
  protected Class findClass(String name)
  throws ClassNotFoundException{
    ClassFile cf = null;
    try{
      BufferedInputStream in = new
          BufferedInputStream(findResource(name.replace('.',
              '/').concat(".class")).openStream( ));
      cf = new ClassFile(in);
    }catch (Exception e) {throw new ClassNotFoundException(e.toString( ));}
    for (int i=0; i<cf.methods_count; i++){
```

```
            // Find the <clinit> method_info struct.
            String methodName = cf.constant_pool[
                cf.methods[i].name_index].toString( );
            if (!methodName.equals("<clinit>")){
                continue;
            }
            // Now find the Code_attribute for the <clinit> method.
            for (int j=0; j<cf.methods[i].attributes_count; j++){
                if (!(cf.methods[i].attributes[j] instanceof Code_attribute))
                    continue;
                Code_attribute ca = (Code_attribute) cf.methods[i].attributes[j];
                // First, shift the code[ ] down by 4 instructions.
                byte[ ][ ] code2 = new byte[ca.code.length+4] [ ];
                System.arraycopy(ca.code, 0, code2, 4, ca.code.length);
                ca.code = code2;
                // Then enlarge the constant_pool by 7 items.
                cp_info[ ] cpi = new cp_info[cf.constant_pool.length+7];
                System.arraycopy(cf.constant_pool, 0, cpi, 0,
                    cf.constant_pool.length);
                cf.constant_pool = cpi;
                cf.constant_pool_count += 7;
                // Now add the constant pool items for these instructions, starting
                // with String.
                CONSTANT_String_info csi = new CONSTANT_String_info(
        ((CONSTANT_Class_info)cf.constant_pool[cf.this_class]).name_index);
                cf.constant_pool[cf.constant_pool.length-7] = csi;
                // Now add the UTF for class.
                CONSTANT_Utf8_info u1 = new CONSTANT_Utf8_info("InitClient");
                cf.constant_pool[cf.constant_pool.length-6] = u1;
                // Now add the CLASS for the previous UTF.
                CONSTANT_Class_info c1 =
                    new CONSTANT_Class_info(cf.constant_pool.length-6);
                cf.constant_pool[cf.constant_pool.length-5] = c1;
                // Next add the first UTF for NameAndType.
                u1 = new CONSTANT_Utf8_info("isAlreadyLoaded");
                cf.constant_pool[cf.constant_pool.length-4] = u1;
                // Next add the second UTF for NameAndType.
                u1 = new CONSTANT_Utf8_info("(Ljava/lang/String;)Z");
                cf.constant_pool[cf.constant_pool.length-3] = u1;
                // Next add the NameAndType for the previous two UTFs.
                CONSTANT_NameAndType_info n1 = new CONSTANT_NameAndType_info(
                    cf.constant_pool.length-4, cf.constant_pool.length-3);
                cf.constant_pool[cf.constant_pool.length-2] = n1;
                // Next add the Methodref for the previous CLASS and NameAndType.
                CONSTANT_Methodref_info m1 = new CONSTANT_Methodref_info(
                    cf.constant_pool.length-5, cf.constant_pool.length-2);
                cf.constant_pool[cf.constant_pool.length-1] = m1;
                // Now with that done, add the instructions into the code, starting
                // with LDC.
                ca.code[0] = new byte[3];
                ca.code[0] [0] = (byte) 19;
                ca.code[0] [1] = (byte) (((cf.constant_pool.length-7) >> 8) & 0xff);
                ca.code[0] [2] = (byte) ((cf.constant_pool.length-7) & 0xff);
                // Now Add the INVOKESTATIC instruction.
                ca.code[1] = new byte[3];
                ca.code[1] [0] = (byte) 184;
                ca.code[1] [1] = (byte) (((cf.constant_pool.length-1) >> 8) & 0xff);
                ca.code[1] [2] = (byte) ((cf.constant_pool.length-1) & 0xff);
                // Next add the IFEQ instruction.
                ca.code[2] = new byte[3];
                ca.code[2] [0] = (byte) 153;
                ca.code[2] [1] = (byte) ((4 >> 8) & 0xff);
                ca.code[2] [2] = (byte) (4 & 0xff);
                // Finally, add the RETURN instruction.
                ca.code[3] = new byte[1];
                ca.code[3] [0] = (byte) 177;
                // Lastly, increment the CODE_LENGTH and ATTRIBUTE_LENGTH values.
                ca.code_length += 10;
                ca.attribute_length += 10;
            }
        }
        try{
            ByteArrayOutputStream out = new ByteArrayOutputStream( );
            cf.serialize(out);
            byte[ ] b = out.toByteArray( );
```

-continued

```
        return defineClass(name, b, 0, b.length);
      }catch (Exception e){
      e.printStackTrace ( );
        throw new ClassNotFoundException (name);
      }
    }
  }
}
```

ANNEXURE C

C1. Typical Prior Art Finalization for a Single Machine

Method finalize( )
0 getstatic #9 <Field java.io.PrintStream out>
3 ldc #24 <String "Deleted . . . ">
5 invokevirtual #16 <Method void println(java.lang.String)>
8 return

C2. Preferred Finalization for Multiple Machines

Method finalize( )
0 invokestatic #3 <Method boolean isLastReference( )>
3 ifne 7
6 return
7 getstatic #9 <Field java.io.PrintStream out>
10 ldc #24 <String "Deleted . . . ">
12 invokevirtual #16 <Method void println(java.lang.String)>
15 return

C3. Preferred Finalization for Multiple Machines (Alternative)

Method finalize( )
0 aload_0
1 invokestatic #3 <Method boolean isLastReference (java.lang.Object)>
4 ifne 8
7 return
8 getstatic #9 <Field java.io.PrintStream out>
11 ldc #24 <String "Deleted . . . ">
13 invokevirtual #16 <Method void println(java.lang.String)>
16 return

ANNEXURE C4

```
import java.lang.*;
public class example{
  /** Finalize method. */
  protected void finalize( ) throws Throwable{
    // "Deleted . . . " is printed out when this object is garbaged.
    System.out.println("Deleted . . . ");
  }
}
```

ANNEXURE C5

```
import java.lang.*;
import java.util.*;
import java.net.*;
import java.io.*;
public class FinalClient{
  /** Protocol specific values. */
  public final static int CLOSE = −1;
  public final static int NACK = 0;
  public final static int ACK = 1;
  public final static int FINALIZE_OBJECT = 10;
  /** FinalServer network values. */
  public final static String serverAddress =
    System.getProperty("FinalServer_network_address");
  public final static int serverPort =
    Integer.parseInt(System.getProperty("FinalServer_network_port"));
  /** Table of global ID's for local objects. (hashcode-to-globalID
      mappings) */
  public final static Hashtable hashCodeToGlobalID = new Hashtable( );
  /** Called when a object is being finalized. */
  public static boolean isLastReference(Object o){
    // First of all, we need to resolve the globalID for object 'o'.
    // To do this we use the hashCodeToGlobalID table.
    int globalID = ((Integer) hashCodeToGlobalID.get(o)).intValue( );
    try{
      // Next, we want to connect to the FinalServer, which will inform
      // us of the finalization status of this object.
      Socket socket = new Socket(serverAddress, serverPort);
      DataOutputStream out =
        new DataOutputStream(socket.getOutputStream( ));
      DataInputStream in = new
      DataInputStream(socket.getInputStream( ));
      // Ok, now send the serialized request to the FinalServer.
      out.writeInt(FINALIZE_OBJECT);
      out.writeInt(globalID);
      out.flush( );
      // Now wait for the reply.
      int status = in.readInt( );   // This is a blocking call. So we
                                    // will wait until the remote side
                                    // sends something.
      if (status == NACK){
        throw new AssertionError(
          "Negative acknowledgement. Request failed.");
      }else if (status != ACK){
        throw new AssertionError("Unknown acknowledgement: "
          + status + ". Request failed.");
      }
      // Next, read in a 32bit argument which is the count of the
      // remaining finalizations
      int count = in.readInt( );
      // If the count is equal to 1, then this is the last finalization,
      // and hence isLastReference should be true.
      // If however, the count is greater than 1, then this is not the
      // last finalization, and thus isLastReference should be false.
      boolean isLastReference = (count == 1 ? true : false);
      // Close down the connection.
      out.writeInt(CLOSE);
      out.flush( );
      out.close( );
      in.close( );
```

-continued

```
        socket.close( );     // Make sure to close the socket.
        // Return the value of the isLastReference variable.
        return isLastReference;
     }catch (IOException e){
        throw new AssertionError("Exception: " + e.toString( ));
     }
   }
}
```

ANNEXURE C6

```
import java.lang.*;
import java.util.*;
import java.net.*;
import java.io.*;
public class FinalServer implements Runnable{
   /** Protocol specific values */
   public final static int CLOSE = -1;
   public final static int NACK = 0;
   public final static int ACK = 1;
   public final static int FINALIZE_OBJECT = 10;
   /** FinalServer network values. */
   public final static int serverPort = 20001;
   /** Table of finalization records. */
   public final static Hashtable finalizations = new Hashtable( );
   /** Private input/output objects. */
   private Socket socket = null;
   private DataOutputStream outputStream;
   private DataInputStream inputStream;
   private String address;
   public static void main(String[ ] s)
   throws Exception{
      System.out.println("FinalServer_network_address="
         + InetAddress.getLocalHost( ).getHostAddress( ));
      System.out.println("FinalServer_network_port=" + serverPort);
      // Create a serversocket to accept incoming initialization operation
      // connections.
      ServerSocket serverSocket = new ServerSocket(serverPort);
      while (!Thread.interrupted( )){
         // Block until an incoming initialization operation connection.
         Socket socket = serverSocket.accept( );
         // Create a new instance of InitServer to manage this
         // initialization operation connection.
         new Thread(new FinalServer(socket)).start( );
      }
   }
   /** Constructor. Initialize this new FinalServer instance with necessary
      resources for operation. */
   public FinalServer(Socket s){
      socket = s;
      try{
         outputStream = new DataOutputStream(s.getOutputStream( ));
         inputStream = new DataInputStream(s.getInputStream( ));
         address = s.getInetAddress( ).getHostAddress( );
      }catch (IOException e){
         throw new AssertionError("Exception: " + e.toString( ));
      }
   }
   /** Main code body. Decode incoming finalization operation requests and
      execute accordingly. */
   public void run( ){
      try{
         // All commands are implemented as 32bit integers.
         // Legal commands are listed in the "protocol specific values"
         // fields above.
         int command = inputStream.readInt( );
         // Continue processing commands until a CLOSE operation.
         while (command != CLOSE){
            if (command ==              // This is a
FINALIZE_OBJECT){                       // FINALIZE_OBJECT
                                        operation.
               // Read in the globalID of the object to be finalized.
               int globalID = inputStream.readInt( );
               // Synchronize on the finalizations table in order to ensure
               // thread-safety.
               synchronized (finalizations){
                  // Locate the previous finalizations entry for this
                  // object, if any.
                  Integer entry = (Integer) finalizations.get(
                     new Integer(globalID));
                  if (entry == null){
                     throw new AssertionError("Unknown object.");
                  }else if (entry.intValue( ) < 1){
                     throw new AssertionError("Invalid Count.");
                  }else if (entry.intValue( ) == 1){   // Count of 1 means
                                                      // this is the last
                                                      // reference, hence
                                                      // remove from table.
                     finalizations.remove(new Integer(globalID));
                     // Send a positive acknowledgement to FinalClient,
                     // together with the count of remaining references -
                     // which in this case is 1.
                     outputStream.writeInt(ACK);
                     outputStream.writeInt(1);
                     outputStream.flush( );
                  }else{       // This is not the last remaining
                               // reference, as count is greater than 1.
                               // Decrement count by 1.
                     finalizations.put(new Integer(globalID),
                        new Integer(entry.intValue( ) - 1));
                     // Send a positive acknowledgement to FinalClient,
                     // together with the count of remaining references to
                     // this object - which in this case of must be value
                     // "entry.intValue( )".
                     outputStream.writeInt(ACK);
                     outputStream.writeInt(entry.intValue( ));
                     outputStream.flush( );
                  }
               }
            }else{       // Unknown command.
               throw new AssertionError(
                  "Unknown command. Operation failed.");
            }
            // Read in the next command.
            command = inputStream.readInt( );
         }
      }catch (Exception e){
         throw new AssertionError("Exception: " + e.toString( ));
      }finally{
         try{
            // Closing down. Cleanup this connection.
            outputStream.flush( );
            outputStream.close( );
            inputStream.close( );
            socket.close( );
         }catch (Throwable t){
            t.printStackTrace( );
         }
         // Garbage these references.
         outputStream = null;
         inputStream = null;
         socket = null;
      }
   }
}
```

ANNEXURE C7

FinalLoader.java
This excerpt is the source-code of FinalLoader, which modifies an application as it is being loaded.

---

```java
import java.lang.*;
import java.io.*;
import java.net.*;
public class FinalLoader extends URLClassLoader{
   public FinalLoader(URL[ ] urls){
      super(urls);
   }
   protected Class findClass(String name)
   throws ClassNotFoundException{
      ClassFile cf = null;
      try{
         BufferedInputStream in =
            new BufferedInputStream(findResource(name.replace('.',
            '/').concat(".class")).openStream( ));
         cf = new ClassFile(in);
      }catch (Exception e){throw new ClassNotFoundException(e.toString( ));}
      for (int i=0; i<cf.methods_count; i++){
         // Find the finalize method_info struct.
         String methodName = cf.constant_pool[
            cf.methods[i].name_index].toString( );
         if (!methodName.equals("finalize")){
            continue;
         }
         // Now find the Code_attribute for the finalize method.
         for (int j=0; j<cf.methods[i].attributes_count; j++){
            if (!(cf.methods[i].attributes[j] instanceof Code_attribute))
               continue;
            Code_attribute ca = (Code_attribute)
cf.methods[i].attributes[j];
            // First, shift the code[ ] down by 4 instructions.
            byte[ ][ ] code2 = new byte[ca.code.length+4][ ];
            System.arraycopy(ca.code, 0, code2, 4, ca.code.length);
            ca.code = code2;
            // Then enlarge the constant_pool by 6 items.
            cp_info[ ] cpi = new cp_info[cf.constant_pool.length+6];
            System.arraycopy(cf.constant_pool, 0, cpi, 0,
               cf.constant_pool.length);
            cf.constant_pool = cpi;
            cf.constant_pool_count += 6;
            // Now add the UTF for class.
            CONSTANT_Utf8_info ul = new CONSTANT_Utf8_info("FinalClient");
            cf.constant_pool[cf.constant_pool.length-6] = u1;
            // Now add the CLASS for the previous UTF.
            CONSTANT_Class_info c1 =
               new CONSTANT_Class_info(cf.constant_pool.length-6);
            cf.constant_pool[cf.constant_pool.length-5] = c1;
            // Next add the first UTF for NameAndType.
            ul = new CONSTANT_Utf8_info("isLastReference");
            cf.constant_pool[cf.constant_pool.length-4] = u1;
            // Next add the second UTF for NameAndType.
            ul = new CONSTANT_Utf8_info("(Ljava/lang/Object;)Z");
            cf.constant_pool[cf.constant_pool.length-3] = u1;
            // Next add the NameAndType for the previous two UTFs.
            CONSTANT_NameAndType_info n1 = new CONSTANT_NameAndType_info(
               cf.constant_pool.length-4, cf.constant_pool.length-3);
            cf.constant_pool[cf.constant_pool.length-2] = n1;
            // Next add the Methodref for the previous CLASS and
NameAndType.
            CONSTANT_Methodref_info m1 = new CONSTANT_Methodref_info(
               cf.constant_pool.length-5, cf.constant_pool.length-2);
            cf.constant_pool[cf.constant_pool.length-1] = m1;
            // Now with that done, add the instructions into the code,
starting
            // with LDC.
            ca.code[0] = new byte[1];
            ca.code[0][0] = (byte) 42;
            // Now Add the INVOKESTATIC instruction.
            ca.code[1] = new byte[3];
            ca.code[1] [0] = (byte) 184;
            ca.code[1] [1] = (byte) (((cf.constant_pool.length-1) >> 8) &
0xff);
            ca.code[1][2] = (byte) ((cf.constant_pool.length-1) & 0xff);
```

```
            // Next add the IFNE instruction.
            ca.code[2] = new byte[3];
            ca.code[2] [0] = (byte) 154;
            ca.code[2] [1] = (byte) ((4 >> 8) & 0xff);
            ca.code[2] [2] = (byte) (4 & 0xff);
            // Finally, add the RETURN instruction.
            ca.code[3] = new byte[1];
            ca.code[3] [0] = (byte) 177;
            // Lastly, increment the CODE_LENGTH and ATTRIBUTE_LENGTH
values.
            ca.code_length += 8;
            ca.attribute_length += 8;
        }
    }
    try{
       ByteArrayOutputStream out = new ByteArrayOutputStream( );
       cf.serialize(out);
       byte[ ] b = out.toByteArray( );
       return defineClass(name, b, 0, b.length);
    }catch (Exception e){
    e.printStackTrace( );
       throw new ClassNotFoundException(name);
    }
  }
}
```

ANNEXURE D1

Method void run( )

0 getstatic #2 <Field java.lang.Object LOCK>

3 dup 4 astore_1

5 monitorenter 6 getstatic #3 <Field int counter>

9 iconst_1

10 iadd 11 putstatic #3 <Field int counter>

14 aload_1

15 monitorexit 16 return

ANNEXURE D2

Method void run( )

0 getstatic #2 <Field java.lang.Object LOCK>

3 dup 4 astore_1

5 dup 6 monitorenter 7 invokestatic #23 <Method void acquireLock(java.lang.Object)>

10 getstatic #3 <Field int counter>

13 iconst_1

14 iadd 15 putstatic #3 <Field int counter>

18 aload_1

19 dup 20 invokestatic #24 <Method void releaseLock(java.lang.Object)>

23 monitorexit 24 return

ANNEXURE D3

```
import java.lang.*;
public class example{
    /** Shared static field. */
    public final static Object LOCK = new Object( );
    /** Shared static field. */
    public static int counter = 0;
    /** Example method using synchronization. This method serves to
        illustrate the use of synchronization to implement thread-safe
        modification of a shared memory location by potentially multiple
        threads. */
    public void run( ){
        // First acquire the lock, otherwise any memory
        writes we do will be
        // prone to race-conditions.
        synchronized (LOCK){
            // Now that we have acquired the lock, we can safely
            modify memory
            // in a thread-safe manner.
            counter++;
        }
    }
}
```

ANNEXURE D4

```
import java.lang.*;
import java.util.*;
import java.net.*;
import java.io.*;
public class LockClient{
    /** Protocol specific values. */
    public final static int CLOSE = −1;
    public final static int NACK = 0;
    public final static int ACK = 1;
    public final static int ACQUIRE_LOCK = 10;
    public final static int RELEASE_LOCK = 20;
```

```
/** LockServer network values. */
public final static String serverAddress =
    System.getProperty("LockServer_network_address");
public final static int serverPort =
    Integer.parseInt
    (System.getProperty("LockServer_network_port"));
/** Table of global ID's for local objects. (hashcode-to-globalID
    mappings) */
public final static Hashtable hashCodeToGlobalID =
new Hashtable( );
/** Called when an application is to acquire a lock. */
public static void acquireLock(Object o) {
    // First of all, we need to resolve the globalID for object 'o'.
    // To do this we use the hashCodeToGlobalID table.
    int globalID = ((Integer) hashCodeToGlobalID.get(o))
    .intValue( );
    try{
        // Next, we want to connect to tbe LockServer,
        which will grant us
        // the global lock.
        Socket socket = new Socket(serverAddress, serverPort);
        DataOutputStream out =
            new DataOutputStream(socket.getOutputStream( ));
        DataInputStream in = new
        DataInputStream(socket.getInputStream( ));
        // Ok, now send the serialized request to the lock server.
        out.writeInt (ACQUIRE_LOCK);
        out.writeInt (globalID);
        out.flush( );
        // Now wait for the reply.
        int status =          // This is a blocking call. So we
        in.readInt( );        // will wait until the remote side
                              // sends something.
        if (status == NACK) {
            throw new AssertionError(
                "Negative acknowledgement. Request failed.");
        }else if (status != ACK) {
            throw new AssertionError("Unknown
            acknowledgement: "
                + status + ". Request failed.");
        }
        // Close down the connection.
        out.writeInt (CLOSE);
        out.flush( );
        out.close( );
        in.close( );
        socket.close( );       // Make sure to close the socket.
        // This is a good acknowledgement, thus
        we can return now because
        // global lock is now acquired.
        return;
    }catch (IOException e) {
        throw new AssertionError("Exception: "
            + e.toString( ));
    }
}
/** Called when an application is to release a lock. */
public static void releaseLock(Object o){
    // First of all, we need to resolve the globalID for object 'o'.
    // To do this we use the hashCodeToGlobalID table.
int globalID = ((Integer) hashCodeToGlobalID.get (o)) .intValue( );
try{
        // Next, we want to connect to the LockServer,
        which records us as
        // the owner of the global lock for object 'o'.
        Socket socket = new Socket(serverAddress, serverPort);
        DataOutputStream out =
            new DataOutputStream(socket.getOutputStream( ));
        DataInputStream in = new
        DataInputStream(socket.getInputStream( ));
        // Ok, now send the serialized request to the lock server.
        out.writeInt (RELEASE_LOCK);
        out.writeInt (globalID);
        out.flush( );
        // Now wait for the reply.
        int status =          // This is a blocking call. So we
        in.readInt( );        // will wait until the remote side
                              // sends something.
        if (status == NACK) {
            throw new AssertionError(
                "Negative acknowledgement. Request failed.");
        }else if (status != ACK) {
            throw new AssertionError("Unknown
            acknowledgement: "
                + status + ". Request failed.");
        }
        // Close down the connection.
        out.writeInt (CLOSE);
        out.flush( );
        out.close( );
        in.close( );
        socket.close( );       // Make sure to close the socket.
        // This is a good acknowledgement, return because global
        lock is
        // now released.
        return;
    }catch (IOException e) {
        throw new AssertionError("Exception: "+ e.toString( ));
    }
}
}
```

ANNEXURE D5

```
import java.lang.*;
import java.util.*;
import java.net.*;
import java.io.*;
public class LockServer implements Runnable{
    /** Protocol specific values */
    public final static int CLOSE = -1;
    public final static int NACK = 0;
    public final static int ACK = 1;
    public final static int ACQUIRE_LOCK = 10;
    public final static int RELEASE_LOCK = 20;
    /** LockServer network values. */
    public final static int serverPort = 20001;
    /** Table of lock records. */
    public final static Hashtable locks = new Hashtable( );
    /** Linked list of waiting LockManager objects. */
    public LockServer next = null;
    /** Address of remote LockClient. */
    public final String address;
    /** Private input/output objects. */
    private Socket socket = null;
    private DataOutputStream outputStream;
    private DataInputStream inputStream;
    public static void main(String[ ] s)
    throws Exception{
        System.out.println("LockServer_network_address="
            + InetAddress.getLocalHost( ).getHostAddress( ));
        System.out.println("LockServer_network_port=" + serverPort);
        // Create a serversocket to accept incoming lock operation
        // connections.
        ServerSocket serverSocket = new ServerSocket(serverPort);
        while (!Thread.interrupted( )){
            // Block until an incoming lock operation connection.
            Socket socket = serverSocket.accept( );
            // Create a new instance of LockServer to manage this lock
            // operation connection.
            new Thread(new LockServer(socket)).start( );
        }
    }
    /** Constructor. Initialise this new LockServer instance with necessary
        resources for operation. */
    public LockServer(Socket s){
        socket = s;
        try{
            outputStream = new DataOutputStream(s.getOutputStream( ));
            inputStream = new DataInputStream(s.getInputStream( ));
            address = s.getInetAddress( ).getHostAddress( );
```

```
}catch (IOException e){
  throw new AssertionError("Exception: " + e.toString( ));
}
}
/** Main code body. Decode incoming lock operation requests and
execute accordingly. */
public void run( ){
  try{
    // All commands are implemented as 32bit integers.
    // Legal commands are listed in the "protocol specific values"
    // fields above.
    int command = inputStream.readInt( );
    // Continue processing commands until a CLOSE operation.
    while (command != CLOSE){
      if (command == ACQUIRE_LOCK){      // This is an
                                          // ACQUIRE_LOCK
                                          // operation.
        // Read in the globalID of the object to be locked.
        int globalID = inputStream.readInt( );
        // Synchronize on the locks table in order to ensure thread-
        // safety.
        synchronized (locks){
          // Check for an existing owner of this lock.
          LockServer lock = (LockServer) locks.get(
            new Integer(globalID));
          if (lock == null){    // No-one presently owns this lock,
                                // so acquire it.
            locks.put(new Integer(globalID), this);
            acquireLock( );   // Signal to the client the
                              // successful acquisition of this
                              // lock.
          }else{                // Already owned. Append ourselves
                                // to end of queue.
            // Search for the end of the queue. (Implemented as
            // linked-list)
            while (lock.next != null){
              lock = lock.next;
            }
            lock.next = this; // Append this lock request at end.
          }
        }
      }else if (command == RELEASE_LOCK){    // This is a
                                              // RELEASE_LOCK
                                              // operation.
        // Read in the globalID of the object to be locked.
        int globalID = inputStream.readInt( );
        // Synchronize on the locks table in order to ensure thread-
        // safety.
        synchronized (locks){
          // Check to make sure we are the owner of this lock.
          LockServer lock = (LockServer) locks.get(
            new Integer(globalID));
          if (lock == null){
            throw new AssertionError("Unlocked. Release failed.");
          }else if (lock.address != this.address){
            throw new AssertionError("Trying to release a lock "
              + "which this client doesn't own. Release "
              + "failed.");
          }
          lock = lock.next;
          lock.acquireLock( );  // Signal to the client the
                                // successful acquisition of this
                                // lock.
          // Shift the linked list of pending acquisitions forward
          // by one.
          locks.put(new Integer(globalID), lock);
          // Clear stale reference.
          next = null;
        }
        releaseLock( );    // Signal to the client the successful
                           // release of this lock.
      }else{ // Unknown command.
        throw new AssertionError(
          "Unknown command. Operation failed.");
      }
      // Read in the next command.
      command = inputStream.readInt( );
    }
```

```
}catch (Exception e){
  throw new AssertionError("Exception: " + e.toString( ));
}finally{
  try{
    // Closing down. Cleanup this connection.
    outputStream.flush( );
    outputStream.close( );
    inputStream.close( );
    socket.close( );
  }catch (Throwable t){
    t.printStackTrace( );
  }
  // Garbage these references.
  outputStream = null;
  inputStream = null;
  socket = null;
}
}
/** Send a positive acknowledgement of an ACQUIRE_LOCK
operation. */
public void acquireLock( ) throws IOException{
  outputStream.writeInt(ACK);
  outputStream.flush( );
}
/** Send a positive acknowledgement of a RELEASE_LOCK
operation. */
public void releaseLock( ) throws IOException{
  outputStream.writeInt(ACK);
  outputStream.flush( );
}
}
```

ANNEXURE D6

LockLoader.java

This excerpt is the source-code of LockLoader, which modifies an application as it is being loaded.

```
import java.lang.*;
import java.io.*;
import java.net.*;
public class LockLoader extends URLClassLoader{
  public LockLoader(URL[ ] urls){
    super(urls);
  }
  protected Class findClass(String name)
    throws ClassNotFoundException{
    ClassFile cf = null;
    try{
      BufferedInputStream in =
        new BufferedInputStream(findResource(name.replace('.',
        '/').concat(".class")).openStream( ));
      cf = new ClassFile(in);
    }catch (Exception e){throw new
    ClassNotFoundException(e.toString( ));}
    // Class-wide pointers to the enterindex and exitindex.
    int enterindex = -1;
    int exitindex = -1;
    for (int i=0; i<cf.methods_count; i++){
      for (int j=0; j<cf.methods[i].attributes_count; j++){
        if (!(cf.methods[i].attributes[j] instanceof Code_attribute))
          continue;
        Code_attribute ca = (Code_attribute)
    cf.methods[i].attributes[j];
        boolean changed = false;
        for (int z=0; z<ca.code.length; z++){
          if ((ca.code[z][0] & 0xff) == 194){    // Opcode for a
                                                  // MONITORENTER
                                                  // instruction.
            changed = true;
            // Next, realign the code array, making room for the
            // insertions.
            byte[ ][ ] code2 = new byte[ca.code.length+2][ ];
```

```
        System.arraycopy(ca.code, 0, code2, 0, z);
        code2[z+1] = ca.code[z];
        System.arraycopy(ca.code, z+1, code2, z+3,
          ca.code.length-(z+1));
        ca.code = code2;
        // Next, insert the DUP instruction.
        ca.code[z] = new byte[1];
        ca.code[z] [0] = (byte) 89;
        // Finally, insert the INVOKESTATIC instruction.
        if (enterindex == -1){
          // This is the first time this class is encourtering
the
          // acquirelock instruction, so have to add it to the
          // constant pool.
          cp_info[ ] cpi = new cp_info[cf.constant_pool.length+6];
          System.arraycopy(cf.constant_pool, 0, cpi, 0,
            cf.constant_pool.length);
          cf.constant_pool = cpi;
          cf.constant_pool_count += 6;
          CONSTANT_Utf8_info u1 =
            new CONSTANT_Utf8_info("LockClient");
          cf.constant_pool[cf.constant_pool.length-6] = u1;
          CONSTANT_Class_info c1 = new CONSTANT_Class_info(
            cf.constant_pool_count-6);
          cf.constant_pool[cf.constant_pool.length-5] = c1;
          u1 = new CONSTANT_Utf8_info("acquireLock");
          cf.constant_pool[cf.constant_pool.length-4] = u1;
          u1 = new CONSTANT_Utf8_info("(Ljava/lang/Object;)V");
          cf.constant_pool[cf.constant_pool.length-3] = u1;
          CONSTANT_NameAndType_info n1 =
            new CONSTANT_NameAndType_info(
              cf.constant_pool.length-4, cf.constant_pool.length-
3);
          cf.constant_pool[cf.constant_pool.length-2] = n1;
          CONSTANT_Methodref_info m1 = new
CONSTANT_Methodref_info(
            cf.constant_pool.length-5, cf.constant_pool.length-
2);
          cf.constant_pool[cf.constant_pool.length-1] = m1;
          enterindex = cf.constant_pool.length-1;
        }
        ca.code[z+2] = new byte[3];
        ca.code[z+2] [0] = (byte) 184;
        ca.code[z+2] [1] = (byte) ((enterindex >> 8) & 0xff);
        ca.code[z+2] [2] = (byte) (enterindex & 0xff);
        // And lastly, increase the CODE_LENGTH and
ATTRIBUTE_LENGTH
        // values.
        ca.code_length += 4;
        ca.attribute_length += 4;
        z += 1;
      }else if ((ca.code[z][0] & 0xff) == 195){   // Opcode for a
                                                  // MONITOREXIT
                                                  // instruction.
        changed = true;
        // Next, realign the code array, making room for the
        // insertions.
        byte[ ][ ] code2 = new byte[ca.code.length+2] [ ];
        System.arraycopy(ca.code, 0, code2, 0, z);
        code2[z+1] = ca.code[z];
        System.arraycopy(ca.code, z+1, code2, z+3,
          ca.code.length-(z+1));
        ca.code = code2;
        // Next, insert the DUP instruction.
        ca.code[z] = new byte[1];
        ca.code[z][0] = (byte) 89;
        // Finally, insert the INVOKESTATIC instruction.
        if (exitindex == -1){
          // This is the first time this class is encourtering
the
          // acquirelock instruction, so have to add it to the
          // constant pool.
          cp_info[ ] cpi = new cp_info[cf.constant_pool.length+6];
          System.arraycopy(cf.constant_pool, 0, cpi, 0,
            cf.constant_pool.length);
          cf.constant_pool = cpi;
          cf.constant_pool_count += 6;
          CONSTANT_Utf8_info u1 =
            new CONSTANT_Utf8_info ("LockClient");
          cf.constant_pool[cf.constant_pool.length-6] = u1;
          CONSTANT_Class_info c1 = new CONSTANT_Class_info(
            cf.constant_pool_count-6);
          cf.constant_pool[cf.constant_pool.length-5] = c1;
          u1 = new CONSTANT_Utf8_info("releaseLock");
          cf.constant_pool[cf.constant_pool.length-4] = u1;
          u1 = new CONSTANT_Utf8_info("(Ljava/lang/Object;)V");
          cf.constant_pool[cf.constant_pool.length-3] = u1;
          CONSTANT_NameAndType_info n1 =
            new CONSTANT_NameAndType_info(
              cf.constant_pool.length-4, cf.constant_pool.length-
3);
          cf.constant_pool[cf.constant_pool.length-2] = n1;
          CONSTANT_Methodref_info m1 = new
CONSTANT_Methodref_info(
            cf.constant_pool.length-5, cf.constant_pool.length-
2);
          cf.constant_pool[cf.constant_pool.length-1] = m1;
          exitindex = cf.constant_pool.length-1;
        }
        ca.code[z+2] = new byte[3];
        ca.code[z+2] [0] = (byte) 184;
        ca.code[z+2] [1] = (byte) ((exitindex >> 8) & 0xff);
        ca.code[z+2] [2] = (byte) (exitindex & 0xff);
        // And lastly, increase the CODE_LENGTH and
ATTRIBUTE_LENGTH
        // values.
        ca.code_length += 4;
        ca.attribute_length += 4;
        z += 1;
      }
    }
    // If we changed this method, then increase the stack size by
one.
    if (changed){
      ca.max_stack++;        // Just to make sure.
    }
  }
}
try{
  ByteArrayOutputStream out = new ByteArrayOutputStream( );
  cf.serialize(out);
  byte[ ] b = out.toByteArray( );
  return defineClass(name, b, 0, b.length);
}catch (Exception e){
  throw new ClassNotFoundException(name);
}
}
}
```

The invention claimed is:

1. In a multiple computer system including a plurality of single computers interconnected via a communications link, a method of operating an application program having code written to include a plurality of threads all intended to execute on and reference a single independent computer having a single central processing unit (CPU) or symmetric multiple processing units and a single independent local memory that is not shared with any other computer of said plurality of single computers, said method comprising the steps of:

(a) allocating said plurality of application program code threads amongst said plurality of interconnected single computers so that at least a portion of the application program including at least one first thread of said application program code is allocated a first particular one of said plurality of single computers for execution thereon and at least one second thread of said application program code is allocated a second particular one of said plurality of single computers for execution thereon;

(b) operating each single computer so that the memory locations of its single independent local memory are only addressable by the thread or threads allocated for execution thereon;

(c) executing said allocated application program code thread or threads by those single computers having an application program code thread or threads allocated thereto for execution;

(d) creating, either before or during said executing, a like plurality of memory locations each of the plurality of single computers and each having a name, wherein the initial memory location value contents of each of said named memory locations is the same when created;

(e) storing, during or after execution, by said single computer in its single independent local memory, an original version of each application memory value addressable by execution of said thread or threads allocated thereto;

(f) communicating an update via said communications link, a replica version of each new original version of each application memory value which has overwritten a previous corresponding application memory value as a consequence of execution of said thread or threads on any said single computer, to the single independent local memory of all other ones of said plurality of single computers; and (g) storing in said single independent local memory of all of said plurality of single computers said communicated updated replica version of each and every application memory value;

(h) locking memory locations in each said single computer wherein any single computer wishing to utilize a memory location therein acquires an authorizing lock within the multiple computer system which permits said utilization of said memory location and which prevents all the other of the single computers from utilizing their corresponding memory location until said authorizing lock is relinquished;

(i) the stored application memory values, including said original versions and said replica versions, of all said single computers thereby remaining, subject to a communications link updating transmission delay, identical without any of said single computers addressing the independent local memory of any other one of said plurality of single computers during execution of their allocated thread or threads; and (j) deleting all said original versions and replica versions of said identical memory locations collectively when all of said plurality of single computers no longer need to refer to their corresponding memory location.

2. The method as claimed in claim 1, comprising the further step of, if a portion of said application program running on one of said single computers creates a memory location in that single computer, then the created object is propagated to all of the other of said plurality of single computers via said communications network.

3. The method as claimed in claim 2 including the further step of:

modifying said application program before, during or after loading by inserting an initialization routine to modify each instance at which said application program creates a memory location, said initialization routine propagating every object created by one single computer to all said other single computers.

4. A method as claimed in claim 1, including the further step of:

providing each said single computer with a distributed run time means to communicate between said plurality of single computers via said communications network.

5. A method as claimed in claim 4 including the further step of:

providing a shared table accessible by each said distributed run time means and in which is stored the identity of any of said plurality of single computers which no longer requires to access a memory location, together with the identity of the memory location.

6. A method as claimed in claim 5 including the further step of:

associating a counter means with said shared table, said counter means storing a count of the number of said single computers which no longer require to access said memory location.

7. A method as claimed in claim 6 including the further step of:

providing an additional computer on which said shared program does not run and which hosts said shared table and counter, said additional computer being connected to said communications network.

8. A method as claimed in claim 4 including the further step of:

providing a shared table accessible by each said distributed run time means and in which is stored the identity of any or said single computers which currently has to access a memory location, together with the identity of the memory location.

9. A method as claimed in claim 8 including the further step of:

associating a counter means with said shared table, said counter means storing a count of the number of said single computers which seek access to said memory location.

10. A method as claimed in claim 9 including the further step of:

providing an additional computer on which said shared program does not run and which hosts said shared table and counter means storing said count, said additional computer being connected to said communications network.

11. The method as claimed in claim 1, wherein the communicating includes executing an updating propagation routine.

12. The method as claimed in claim 11, wherein executing the updating propagation routine includes communicating the identity of updated, changed, or manipulated memory location, and the updated, manipulated or changed value(s) or content(s) of the manipulated memory location.

13. The method as claimed in claim 12, wherein the updating communication is performed via a slow network communications link or path.

14. The method as claimed in claim 11, wherein each of said plurality of single computers receiving an update communication from the network, writes the memory location value(s) received to the local independent memory location corresponding to the identified memory location received.

15. The method as claimed in claim 13, wherein the communications link includes a communications link over the Internet.

16. The method as claimed in claim 13, wherein the slow network is a network having a communications speed of operation that is an order of magnitude slower than the speed of operation of the bus on the single computers.

17. The method as claimed in claim 11, wherein the communications between the single computers although routed through the single computer machine hardware are controlled by an individual distributed runtime (DRT) within each single computer, the distributed runtime coordinating particular communications between the plurality of single computers.

18. The method as claimed in claim 17, wherein the DRT coordinates communications between the single computers that is transport, protocol, and communications link independent.

19. The method as claimed in claim 11, wherein:
all reading of memory locations or data is satisfied locally from the single computer local independent memory because a current value of all (or some subset of all) memory locations is stored on the single computer carrying out the processing of the code threads which generates the demand to read from memory; and
all writing of memory locations or data is satisfied locally from the single computer local independent memory because a current value of all (or some subset of all) memory locations is stored on the single computer carrying out the processing of the code threads which generates the demand to write to memory;
wherein the demand to write or rewrite memory being relatively lower than the demand to read from memory, so that memory locations can be continually updated at a relatively low speed via a slow and inexpensive commodity network, yet this sufficient to meet the application program demand for writing to memory.

20. A multiple computer system comprising:
a plurality of single computers interconnected via a communications link;
each of said plurality of single computers: (a) has a single central processing unit (CPU) or symmetric multiple processing units, (b) a single independent local memory which is not shared with any other computer of said plurality of single computers, and (c) that is independent of the other ones of said plurality of single computers;
each one of said plurality of single computers is adapted to store and execute at least one thread of a similar copy of an application program having code written to operate only on a single computer system, the code including a plurality of threads all intended to execute in cooperation with a single memory;
each said single independent local memory has memory locations only addressable and accessible by the thread or threads of the corresponding single computer executing the corresponding copy of said application program code, and each said independent local memory has stored therein all application memory values arising from the execution of all said threads of all said plurality of computers;
(i) means for allocating or receiving an allocation of said plurality of threads of said stored application program code amongst said plurality of single computers so that at least a portion of the application program including at least one thread of said application program code is allocated to a corresponding one of said plurality of single computers for execution thereon by one or more threads of that one of said plurality of single computers;
(ii) means for executing said application program code thread or threads by those ones of said plurality of single computers having an application program code thread or threads allocated thereto;
(iii) a memory storage for storing in said single independent local memory of each said single computer a replica of each and every application memory value addressable by each and every said thread of each and every one of said plurality of computers;
(iv) means for communicating via said communications link each new application memory value which has overwritten a previous corresponding value as a consequence of execution of said application program code on any one of said single computers, to the single independent local memory of all other ones of said plurality of single computers, so that the values of said replica application memory values of all said single computers remain, subject to an updating transmission delay, identical;
(v) lock means applicable to each said single computer wherein any single computer wishing to utilize a memory location therein acquires an authorizing lock from said lock means which permits said utilization of said memory location and which prevents all the other of said single computers from utilizing their corresponding memory location until said authorizing lock is relinquished; and
(vi) means for collectively deleting all of said identical memory locations when each of said plurality of computers no longer needs to refer to their corresponding memory location.

21. The system as claimed in claim 20, wherein said lock means includes an acquire lock routine and a release lock routine, and both said routines are included in modifications made to said application program running on all said computers.

22. The system as claimed in claim 21 wherein said lock means further includes a shared table listing said named memory locations in use by any said computer, a lock status for each said memory location, and a queue of any pending lock acquisitions.

23. The system as claimed in claim 22 wherein said lock means is located within an additional computer not running said application program and connected to said communications network.

24. The system as claimed in claim 20, wherein each said computer includes a distributed run time means with the distributed run time means of each said computer able to communicate with all other computers so that if a portion of said application program(s) running on one of said computers creates a memory location in that computer then the created memory location is propagated by the distributed run time means of said one computer to all the other computers.

25. The system as claimed in claim 20, wherein each said computer includes a distributed run time means with the distributed run time means of each said computer able to communicate with all other computers so that if a portion of said application program(s) running on one of said computers no longer needs to refer to a memory location in that computer then the identity of the unreferenced memory location is transmitted by the distributed run time means of said one computer to a shared table accessible by all the other computers.

26. The system as claimed in claim 20, wherein each said application program is modified before, during, or after loading by inserting an initialization routine to modify each instance at which said application program creates a memory location, said initialization routine propagating every object newly created by one computer to all said other computers.

27. The system as claimed in claim 26 wherein the application program is modified in accordance with a procedure selected from the group of procedures consisting of re-compilation at loading, pre-compilation prior to loading, compilation prior to loading, just-in-time compilation, and re-compilation after loading and before execution of the relevant portion of application program.

28. The system as claimed in claim 26 wherein said modified application program is transferred to all said computers in accordance with a procedure selected from the group consisting of master/slave transfer, branched transfer and cascaded transfer.

29. The system as claimed in claim 20, wherein the local memory capacity allocated to the, or each, said application program is identical and the total memory capacity available to the, or each, said application program is said allocated memory capacity.

30. The system as claimed in claim 29 wherein all said computers include a distribution update means each of which communicates via said communications link at a data transfer rate which is less than the local memory read rate.

31. The system as claimed in claim 30 wherein at least some of said computers are manufactured by different manufacturers and/or have different operating systems.

32. The system as in claim 20, wherein the communications link comprises an Internet network communications link.

33. The system as claimed in claim 20, wherein the means for communicating includes means for executing an updating propagation routine.

34. The system as claimed in claim 33, wherein the means for executing the updating propagation routine includes means for communicating the identity of updated, changed, or manipulated memory location, and the updated, manipulated or changed value(s) or content(s) of the manipulated memory location.

35. The system as claimed in claim 34, wherein the means for updating communication is operative to perform the updating via a slow network communications link or path.

36. The system as claimed in claim 33, wherein each of said plurality of single computers receiving an update communication from the network, writes the memory location value(s) received to the local independent memory location corresponding to the identified memory location received.

37. The system as claimed in claim 35, wherein the communications link includes a communications link over the Internet.

38. The system as claimed in claim 35, wherein the slow network is a network having a communications speed of operation that is an order of magnitude slower than the speed of operation of the bus on the single computers.

39. The system as claimed in claim 33, wherein the communications between the single computers although routed through the single computer machine hardware are controlled by an individual distributed runtime (DRT) within each single computer, the distributed runtime coordinating particular communications between the plurality of single computers.

40. The system as claimed in claim 39, wherein the DRT coordinates communications between the single computers that is transport, protocol, and communications link independent.

41. The multiple computer system as claimed in claim 33, wherein:

all reading of memory locations or data is satisfied locally from the single computer local independent memory because a current value of all (or some subset of all) memory locations is stored on the single computer carrying out the processing of the code threads which generates the demand to read from memory; and all writing of memory locations or data is satisfied locally from the single computer local independent memory because a current value of all (or some subset of all) memory locations is stored on the single computer carrying out the processing of the code threads which generates the demand to write to memory;

wherein the demand to write or rewrite memory being relatively lower than the demand to read from memory, so that memory locations can be continually updated at a relatively low speed via a slow and inexpensive commodity network, yet this sufficient to meet the application program demand for writing to memory.

42. A computer program product stored on a tangible machine-readable medium and including executable instructions for, in a multiple computer system including a plurality of single computers interconnected via a communications link, implementing a method of operating an application program having code written to include a plurality of threads all intended to execute on and reference a single independent computer having a single central processing unit (CPU) or symmetric multiple processing units and a single independent local memory that is not shared with any other computer of said plurality of single computers, said executable instruction performing a method comprising:

(a) allocating said plurality of application program code threads amongst said plurality of interconnected single computers so that at least a portion of the application program including at least one first thread of said application program code is allocated a first particular one of said plurality of single computers for execution thereon and at least one second thread of said application program code is allocated a second particular one of said plurality of single computers for execution thereon;

(b) operating each single computer so that the memory locations of its single independent local memory are only addressable by the thread or threads allocated for execution thereon;

(c) executing said allocated application program code thread or threads by those single computers having an application program code thread or threads allocated thereto for execution;

(d) creating, either before or during said executing, a like plurality of memory locations each of the plurality of single computers and each having a name, wherein the initial memory location value contents of each of said identically named memory locations is the same when created;

(e) storing, during or after execution, by said single computer in its single independent local memory, an original version of each application memory value addressable by execution of said thread or threads allocated thereto;

(f) communicating an update via said communications link, a replica version of each new original version of each application memory value which has overwritten a previous corresponding application memory value as a consequence of execution of said thread or threads on any said single computer, to the single independent local memory of all other ones of said plurality of single computers; and (g) storing in said single independent local memory of all of said plurality of single computers said communicated updated replica version of each and every application memory value;

(h) locking memory locations in each said single computer wherein any single computer wishing to utilize a memory location therein acquires an authorizing lock within the multiple computer system which permits said utilization of said memory location and which prevents all the other of the single computers from utilizing their corresponding memory location until said authorizing lock is relinquished; and (i) the stored application memory values, including said original versions and said replica versions, of all said single computers thereby remaining, subject to a communications link updating transmission delay, identical without any of said single computers addressing the independent local memory of any other one of said plurality of single computers during execution of their allocated thread or threads; and (j) deleting all said original versions and replica versions of said memory locations collectively when all of said plurality of single computers no longer need to refer to their corresponding memory location.

43. The computer program product as claimed in claim 42, wherein:

the communicating includes executing an updating propagation routine, executing the updating propagation routine includes communicating the identity of updated, changed, or manipulated memory location, and the updated, manipulated or changed value(s) or content(s) of the manipulated memory location, and the updating communication is performed via a slow Internet network communications link or path having a communications speed of operation that is an order of magnitude slower than the speed of operation of the bus on the single computers;

each of said plurality of single computers receiving an update communication from the network, writes the memory location value(s) received to the local independent memory location corresponding to the identified memory location received;

the communications between the single computers although routed through the single computer machine hardware are controlled by an individual distributed runtime (DRT) within each single computer, the distributed runtime coordinating particular communications between the plurality of single computers, and the DRT coordinates communications between the single computers that is transport, protocol, and communications link independent;

all reading of memory locations or data is satisfied locally from the single computer local independent memory because a current value of all (or some subset of all) memory locations is stored on the single computer carrying out the processing of the code threads which generates the demand to read from memory; and all writing of memory locations or data is satisfied locally from the single computer local independent memory because a current value of all (or some subset of all) memory locations is stored on the single computer carrying out the processing of the code threads which generates the demand to write to memory; and wherein the demand to write or rewrite memory being relatively lower than the demand to read from memory, so that memory locations can be continually updated at a relatively low speed via a slow and inexpensive commodity network, yet this sufficient to meet the application program demand for writing to memory.

44. The computer program product as claimed in claim 42, wherein: the code is written to include a plurality of threads all intended to execute on and reference a single independent computer having a single central processing unit (CPU) or symmetric multiple processing units and a single independent local memory that is not shared with any other computer of said plurality of single computers.

* * * * *